United States Patent
Kim et al.

(10) Patent No.: US 11,523,415 B2
(45) Date of Patent: Dec. 6, 2022

(54) METHOD AND APPARATUS FOR UPLINK TRANSMISSION IN COMMUNICATION SYSTEM

(71) Applicant: ELECTRONICS AND TELECOMMUNICATIONS RESEARCH INSTITUTE, Daejeon (KR)

(72) Inventors: Cheul Soon Kim, Daejeon (KR); Gi Yoon Park, Daejeon (KR); Seung Kwon Baek, Daejeon (KR); Young Jo Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 31 days.

(21) Appl. No.: 17/165,311

(22) Filed: Feb. 2, 2021

(65) Prior Publication Data

US 2021/0160903 A1    May 27, 2021

Related U.S. Application Data

(62) Division of application No. 17/043,758, filed as application No. PCT/KR2019/003970 on Apr. 4, 2019.

(30) Foreign Application Priority Data

Apr. 5, 2018  (KR) .................. 10-2018-0039988
May 9, 2018  (KR) .................. 10-2018-0053243
(Continued)

(51) Int. Cl.
*H04W 4/00* (2018.01)
*H04W 72/12* (2009.01)
*H04W 72/04* (2009.01)

(52) U.S. Cl.
CPC ... *H04W 72/1268* (2013.01); *H04W 72/0446* (2013.01)

(58) Field of Classification Search
None
See application file for complete search history.

(56) References Cited

U.S. PATENT DOCUMENTS 11,057,914 B2 * 7/2021 You ...................... H04L 5/0053
2015/0223213 A1  8/2015 Moon et al.
(Continued)

FOREIGN PATENT DOCUMENTS

EP         3547766 A1     10/2019
KR     20170131807 A     11/2017
(Continued)

OTHER PUBLICATIONS

Vivo, "Remaining issues on multiplexing data with different transmission durations", 3GPP TSG RAN WG1 Meeting 91, R1-1719798, Reno, USA, Nov. 27-Dec. 1, 2017.
(Continued)

*Primary Examiner* — Zewdu A Beyen
(74) *Attorney, Agent, or Firm* — LRK Patent Law Firm

(57) ABSTRACT

A method and an apparatus for uplink transmission in a communication system. An operation method of a terminal includes: receiving, from a base station, first SFI information indicating n flexible symbol(s); receiving, from the base station, second SFI information re-indicating m symbol(s) of the n flexible symbol(s) as uplink (UL) symbol(s); and transmitting an SRS to the base station through the m symbol(s) re-indicated as a UL symbol among the n flexible symbol(s) indicated as a flexible symbol. Therefore, performance of the communication system can be improved.

19 Claims, 30 Drawing Sheets

(30) Foreign Application Priority Data

| | | | |
|---|---|---|---|
| Nov. 2, 2018 | (KR) | ......................... | 10-2018-0133877 |
| Jan. 11, 2019 | (KR) | ......................... | 10-2019-0003913 |
| Feb. 28, 2019 | (KR) | ......................... | 10-2019-0024376 |
| Mar. 28, 2019 | (KR) | ......................... | 10-2019-0036313 |
| Apr. 3, 2019 | (KR) | ......................... | 10-2019-0039015 |

(56) References Cited

U.S. PATENT DOCUMENTS

| | | |
|---|---|---|
| 2016/0183294 A1 | 6/2016 | Noh et al. |
| 2017/0251464 A1 | 8/2017 | Mukherjee |
| 2017/0288832 A1 | 10/2017 | Islam et al. |
| 2018/0026744 A1 | 1/2018 | Lyu et al. |
| 2018/0145818 A1 | 5/2018 | Choi et al. |
| 2018/0367289 A1 | 12/2018 | Kim et al. |
| 2019/0149269 A1* | 5/2019 | Chatterjee ............. H04L 5/0083 370/329 |
| 2019/0327755 A1* | 10/2019 | Xiong .................. H04L 5/0055 |

FOREIGN PATENT DOCUMENTS

| | | |
|---|---|---|
| WO | 2018062961 A1 | 4/2018 |
| WO | 2018/174962 A1 | 9/2018 |
| WO | 2018174962 A1 | 9/2018 |
| WO | 2019/051096 A1 | 3/2019 |
| WO | 2019051096 A1 | 3/2019 |

OTHER PUBLICATIONS

Vivo, "Multiplexing data with different transmission durations", 3GPP TSG RAN WG1 Meeting AH 1801, R1-1800205, Vancouver, Canada, Jan. 22-26, 2018.

Vivo, "Discussion on handling UL multiplexing of transmissions with different reliability requirements", 3GPP TSG RAN WG1 Meeting #92, R1-1801550, Athens, Greece, Feb. 26-Mar. 2, 2018.

Search Report, dated Aug. 6, 2019, for International Application No. PCT/KR2019/003970.

Written Opinion, dated Aug. 6, 2019, for International Application No. PCT/KR2019/003970.

Catt, "Remaining issues on PDCCH search space", 3GPP TSG RANWG1 Meeting AH 1801, R1-1800249, Vancouver, Canada, Jan. 22-26, 2018.

Qualcomm Incorporated, "Offline discussions on GC-PDCCH carrying SFI", 3GPP TSG RAN WG1 NR AH 1801, R1-1801082, Vancouver, Canada, Jan. 22-26, 2018.

Qualcomm Incorporated, "Remaining issues for slot format indication", 3GPP TSG RAN WG1 #92, R1-1802835, Athens, Greece, Feb. 26-Mar. 2, 2018.

Samsung, "On UE-Group Common PDCCH", 3GPP TSG RAN WG1 Meeting NR#3, R1-1715981, Nagoya, Japan, Sep. 18-25, 2017.

* cited by examiner

METHOD AND APPARATUS FOR UPLINK TRANSMISSION IN COMMUNICATION SYSTEM

CROSS-REFERENCE TO RELATED APPLICATIONS

The present application is a division of U.S. patent application Ser. No. 17/043,758, filed Sep. 30, 2020, which is a U.S. National Phase entry from International Application No. PCT/KR2019/003970, filed Apr. 4, 2019, which claims priority to Korean Patent Application Nos. 10-2018-0039988, filed Apr. 5, 2018, 10-2018-0053243, May 9, 2018, 10-2018-0133877, filed Nov. 2, 2018, 10-2019-0003913, Jan. 11, 2019, 10-2019-0024376, Feb. 28, 2019, 10-2019-0036313, Mar. 28, 2019, and 10-2019-0039015, Apr. 3, 2019, the disclosure of which is incorporated by reference herein in their entirety.

BACKGROUND OF THE INVENTION

1. Technical Field

The present invention relates to techniques for uplink transmission, and more particularly, to techniques for uplink transmission satisfying reliability requirements in a communication system.

2. Description of Related Art

With the development of information and communication technology, various wireless communication technologies are being developed. Typical wireless communication technologies include long term evolution (LTE), new radio (NR), etc. defined in the $3^{rd}$ generation partnership project (3GPP) standard. The LTE may be one of fourth generation (4G) wireless communication technologies, and the NR may be one of fifth generation (5G) wireless communication technologies.

The 5G communication system (hereinafter, a NR communication system) using a higher frequency band (e.g., a frequency band of 6 GHz or higher) than a frequency band (e.g., a frequency band lower below 6 GHz) of the 4G communication system is being considered for processing of soaring wireless data after commercialization of the 4G communication system (e.g., communication system supporting the LTE). The 5G communication system may support enhanced Mobile BroadBand (eMBB), Ultra Reliable Low Latency Communication (URLLC), massive Machine Type Communication (mMTC), and the like.

Meanwhile, when a first physical uplink shared channel (PUSCH) indicated by first resource allocation information for a first transport block is determined to be used for another purpose after a first DCI (i.e., downlink control channel) including the first resource allocation information is transmitted, a method for stopping transmission of the first transport block in the first PUSCH is needed.

SUMMARY

The present invention is directed to providing a method and an apparatus for uplink transmission according to reliability requirements in a communication system.

An operation method of a terminal, according to a first embodiment of the present invention for achieving the above-described objective, may comprise receiving from a base station first SFI information indicating n flexible symbol(s); receiving from the base station an SRS configuration message configuring to transmit an SRS to the base station; receiving from the base station second SFI information re-indicating m symbol(s) among the n flexible symbol(s) as uplink symbol(s); and transmitting the SRS to the base station through the m symbol(s) re-indicated as UL symbols among the n flexible symbol(s) indicated as flexible symbol(s), wherein each of n and m is a natural number.

Here, k symbols among symbols constituting a slot configured based on the first SFI information and the second SFI information may be configured for transmission of the SRS, the SRS may be transmitted through the m symbol(s) re-indicated as the UL symbol(s) among the k symbols, the SRS may not be transmitted in the flexible symbol among the k symbols, and k may be an integer equal to or greater than 2.

Here, the second SFI information may re-indicate remaining symbol(s) excluding the m symbol(s) among the n flexible symbol(s) as downlink (DL) symbol(s) or flexible symbol(s).

Here, the second SFI information may be received in a downlink control information (DCI) format 2_0.

Here, information elements required for receiving the DCI format 2_0 may be received from the base station through a higher layer message, and the information elements may include information on a control resource set (CORESET) and a search space for the DCI format 2_0.

Here, the SRS configuration message may include information indicating a first symbol in which the SRS is transmitted in a slot, and information indicating a number of symbols in which the SRS is transmitted in the slot.

An operation method of a base station, according to a second embodiment of the present invention for achieving the above-described objective, may comprise transmitting to a terminal first SFI information indicating n flexible symbol(s); transmitting to the terminal an SRS configuration message configuring to transmit an SRS to the base station; transmitting to the terminal second SFI information re-indicating m symbol(s) among the n flexible symbol(s) as uplink symbol(s); and receiving the SRS from the terminal through the m symbol(s) re-indicated as UL symbols among the n flexible symbol(s) indicated as flexible symbol(s), wherein each of n and m is a natural number.

Here, k symbols among symbols constituting a slot configured based on the first SFI information and the second SFI information may be configured for transmission of the SRS, the SRS may be transmitted through the m symbol(s) re-indicated as the UL symbol(s) among the k symbols, the SRS may not be transmitted in the flexible symbol among the k symbols, and k may be an integer equal to or greater than 2.

Here, the second SFI information may re-indicate remaining symbol(s) excluding the m symbol(s) among the n flexible symbol(s) as downlink (DL) symbol(s) or flexible symbol(s).

Here, information elements required for receiving the DCI format 2_0 may be transmitted to the terminal through a higher layer message, and the information elements may include information on a control resource set (CORESET) and a search space for the DCI format 2_0.

Here, the SRS configuration message may include information indicating a first symbol in which the SRS is transmitted in a slot, and information indicating a number of symbols in which the SRS is transmitted in the slot.

An operation method of a terminal, according to a third embodiment of the present invention for achieving the above-described objective, may comprise receiving from a base station a first DCI including first resource allocation information for a first transport block; receiving from the base station a second DCI including second resource allocation information for the first transport block; and transmitting the first transport block to the base station through a second PUSCH indicated by the second resource allocation information, wherein resources occupied by a first PUSCH indicated by the first resource allocation information are different from resources occupied by the second PUSCH.

Here, when the first PUSCH is allocated for transmission of uplink control information (UCI), the first PUSCH may not be transmitted.

Here, when the first PUSCH is allocated for transmission of UCI, the UCI may be transmitted through a physical uplink control channel (PUCCH) instead of the first PUSCH.

Here, when the first PUSCH may be allocated for transmission of UCI, the UCI is transmitted through the second PUSCH instead of the first PUSCH.

Here, when a first code block for the first transport block is generated based on the first DCI, the first code block may be mapped to the second PUSCH indicated by the second DCI instead of the first PUSCH.

Here, each of a hybrid automatic repeat request (HARQ) process identifier and a new data indicator (NDI) included in the first DCI may be equal to each of an HARQ process identifier and an NDI included in the second DCI.

Here, when time resources occupied by the first PUSCH are identical to time resources occupied by the second PUSCH, the second resource allocation information may include an offset between a starting frequency resource of the first PUSCH and a starting frequency resource of the second PUSCH.

Here, when frequency resources occupied by the first PUSCH are identical to frequency resources occupied by the second PUSCH, the second resource allocation information may include an offset between a starting time resource of the first PUSCH and a starting time resource of the second PUSCH.

Here, the first PUSCH may be used for another purpose instead of transmission of the first transport block.

Advantageous Effects

According to the present invention, after a first downlink control channel (DCI) including first resource allocation information for a first transport block is transmitted, if a first physical uplink shared channel (PUSCH) indicated by the first resource allocation information is determined to be used for another purpose, the base station may transmit to the terminal a second DCI including second resource allocation information for the first transport block. The resources occupied by a second PUSCH indicated by the second resource allocation information may be different from the resources occupied by the first PUSCH. The terminal may receive the first DCI and the second DCI from the base station, and perform UL transmission based on information included in the last second DCI among the first DCI and the second DCI. In this case, since the first PUSCH is not used for UL transmission, it may be used for another purpose. Therefore, the performance of the communication system can be improved.

DETAILED DESCRIPTION OF THE INVENTION

Figure 1:
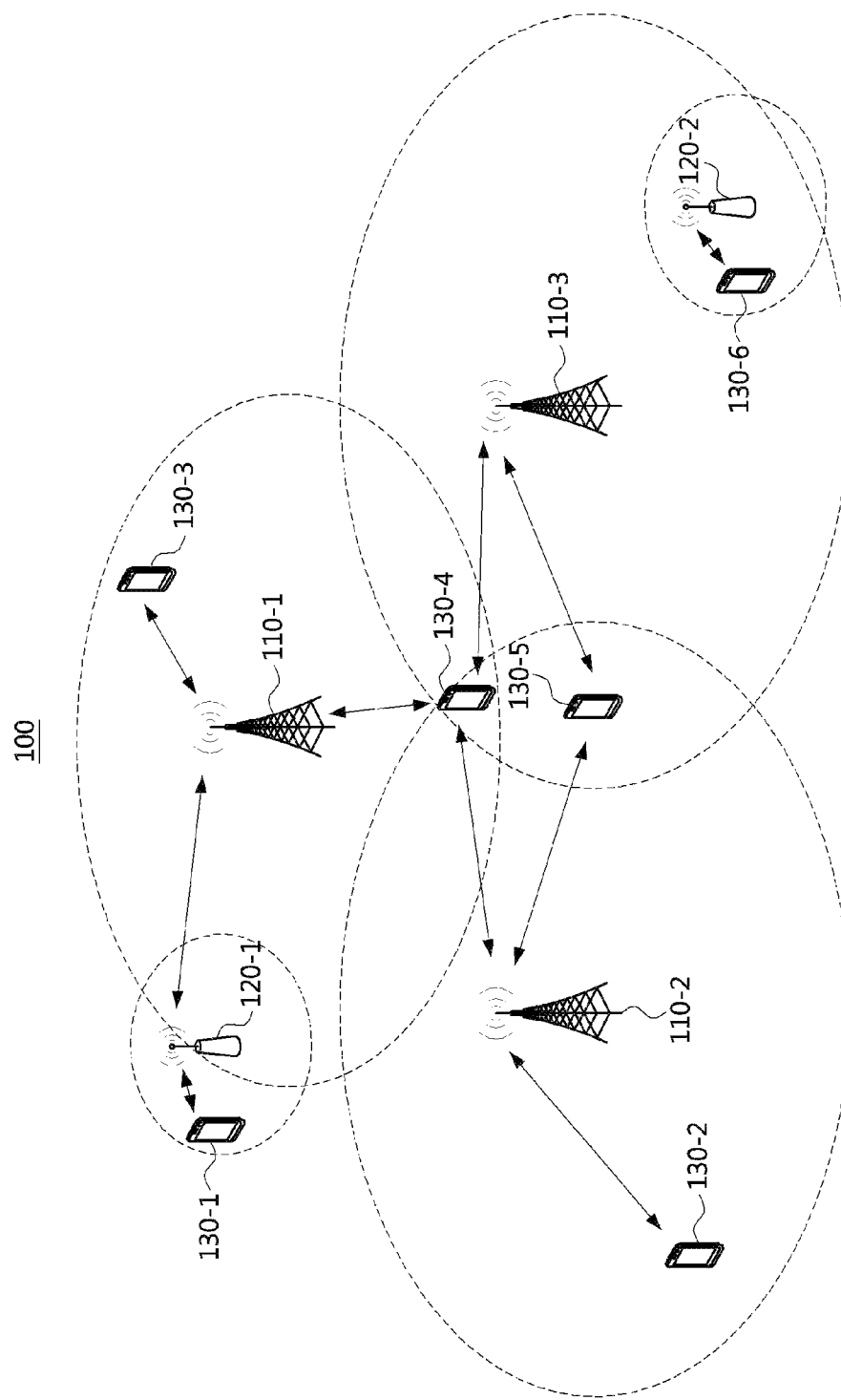
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A communication system to which embodiments according to the present disclosure will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4G communication (e.g., long term evolution (LTE), LTE-advanced (LTE-A)), 5G communication (e.g., new radio (NR)), or the like. The 4G communication may be performed in a frequency band below 6 GHz, and the 5G communication may be performed in a frequency band above 6 GHz as well as the frequency band below 6 GHz.

For example, for the 4G communication and the 5G communication, the plurality of communication nodes may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like.

Also, the communication system 100 may further comprise a core network. When the communication system supports the 4G communication, the core network may include a serving gateway (S-GW), a packet data network (PDN) gateway (P-GW), a mobility management entity (MME), and the like. When the communication system 100 supports the 5G communication, the core network may include an access and mobility management function (AMF), a user plane function (UPF), a session management function (SMF), and the like.

Meanwhile each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
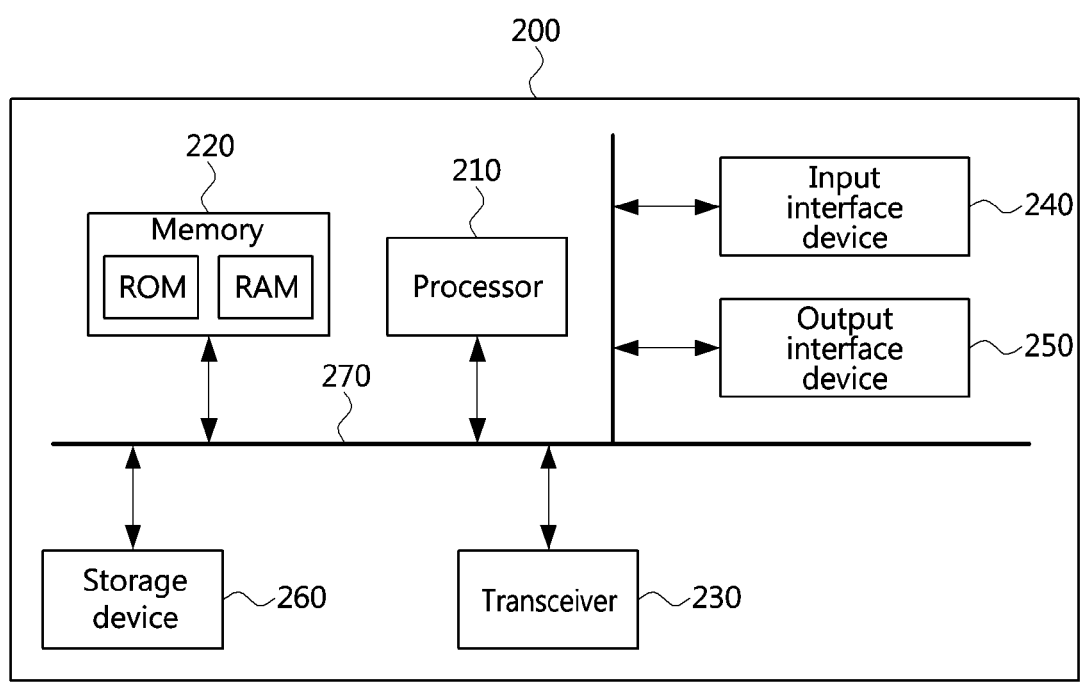
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, uplink (UL) transmission methods in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

■ Dynamic multiplexing of Ultra-Reliable and Low-Latency Communication (URLLC) physical uplink shared channel (PUSCH) and enhanced Mobile BroadBand (eMBB) PUSCH The URLLC PUSCH may be a PUSCH used for the URLLC service. For example, URLLC data may be transmitted through the URLLC PUSCH. The URLLC data may be data transmitted according to the requirements of the URLLC service. The eMBB PUSCH may be a PUSCH used for the eMBB service. For example, eMBB data may be transmitted through the eMBB PUSCH. The eMBB data may be data transmitted according to the requirements of the eMBB service.

√ Uplink (UL) Re-Grant

Methods proposed below may be applied to a scenario for transmitting a UL data channel (e.g., PUSCH) based on information (e.g., downlink control information (DCI) included in a downlink (DL) control channel (e.g., a physical downlink control channel (PDCCH)).

The terminal may determine the size of a resource block based on the size of resource elements available for the UL data channel. Here, the transport block may include UL data. The terminal may assign a hybrid automatic repeat request (HARQ) process identifier to the transport block. The HARQ process identifier may indicate a retransmission transport block. For example, the retransmission transport block may be indicated by the HARQ process identifier and a new data indicator (NDI).

The base station may configure the terminal to support transmission of two or more data (e.g., URLLC data and eMBB data) having different requirements. The requirements may include one or more of an error rate, a transmission rate, and a latency. The priorities of data (e.g., URLLC data and eMBB data) may be determined based on the requirements. The base station may transmit a higher layer message (e.g. a radio resource control (RRC) message) including information indicating the priority of the data to the terminal. The terminal may receive the higher layer message from the base station, and identify the priority of the data based on the information included in the higher layer message. Alternatively, the priority of the data may be defined in the technical specification known to the base station and the terminal.

The proposed methods may be applied to DL transmission as well as UL transmission. In the proposed methods, when a DL control channel including resource allocation information of the same transport block is received more than once, the terminal may perform UL transmission based on information (e.g., DCI) included in the last DL control channel among the received DL control channels. The terminal may not process instructions according to the DL control channels other than the last DL control channel among the received DL control channels.

In the following description, methods for the base station to indicate one transport block will be described. The HARQ process identifier and the NDI may be used to indicate the same transport block. In this case, the base station may transmit a DL control channel (e.g., DCI) including the HARQ process identifier and the NDI indicating the same transport block to the terminal. In a retransmission procedure of a code block group (CBG), the HARQ process identifier, the NDI, CBG transmit indicator (CBTGI), and CBG flush information (CBGFI) may be used to indicate the same transport block. In this case, the base station may transmit to the terminal a DL control channel (e.g., DCI) including the HARQ process identifier, the NDI, the CBGTI, and the CBGFI indicating the same transport block.

Meanwhile, the terminal may receive a DL control channel #1 including resource allocation information (e.g., resource allocation information of a transport block) from the base station, and map a transport block indicated by the DL control channel #1 to a UL data channel #1. After receiving the DL control channel #1, the terminal may receive a DL control channel #2 including resource allocation information (e.g., resource allocation information of a transport block) from the base station. When the transport block indicated by the DL control channel #2 is the same as the transport block indicated by the DL control channel #1 (e.g., when the HARQ process identifier and the NDI included in the DL control channel #1 are the same as the HARQ process identifier and the NDI included in the DL control channel #2), the terminal may map the transport block to a UL data channel #2 based on the information (e.g., DCI) included in the DL control channel #2. That is, the terminal may not process the instruction according to the DL control channel #1. Here, the information included in the DL control channel #1 may be the same as the information included in the DL control channel #2, and the size (e.g., the number of CCEs) of the DL control channel #1 may be the same as the size (e.g., the number of CCEs) of the DL control channel #2. Alternatively, the size of the DL control channel #1 may be different from the size of the DL control channel #2.

The above-described methods may be applied to slot-based transmission and non-slot based transmission. The DL control channel #2 may instruct the transport block to be mapped to other resources than the UL data channel #1. Alternatively, DL control channel #2 may indicate the UL data channel #2 so that the transport block is transmitted in a slot or symbols different from those of the UL data channel #1.

The above-described methods may be applied to a scenario in which the terminal transmits and receives multiple layers. For example, multiple layers may be allocated to the terminal by one DL control channel, and accordingly one or more transport blocks may be allocated to the terminal. In this case, the terminal may operate according to the indication of the last DL control channel among the received DL control channels.

Figure 3:
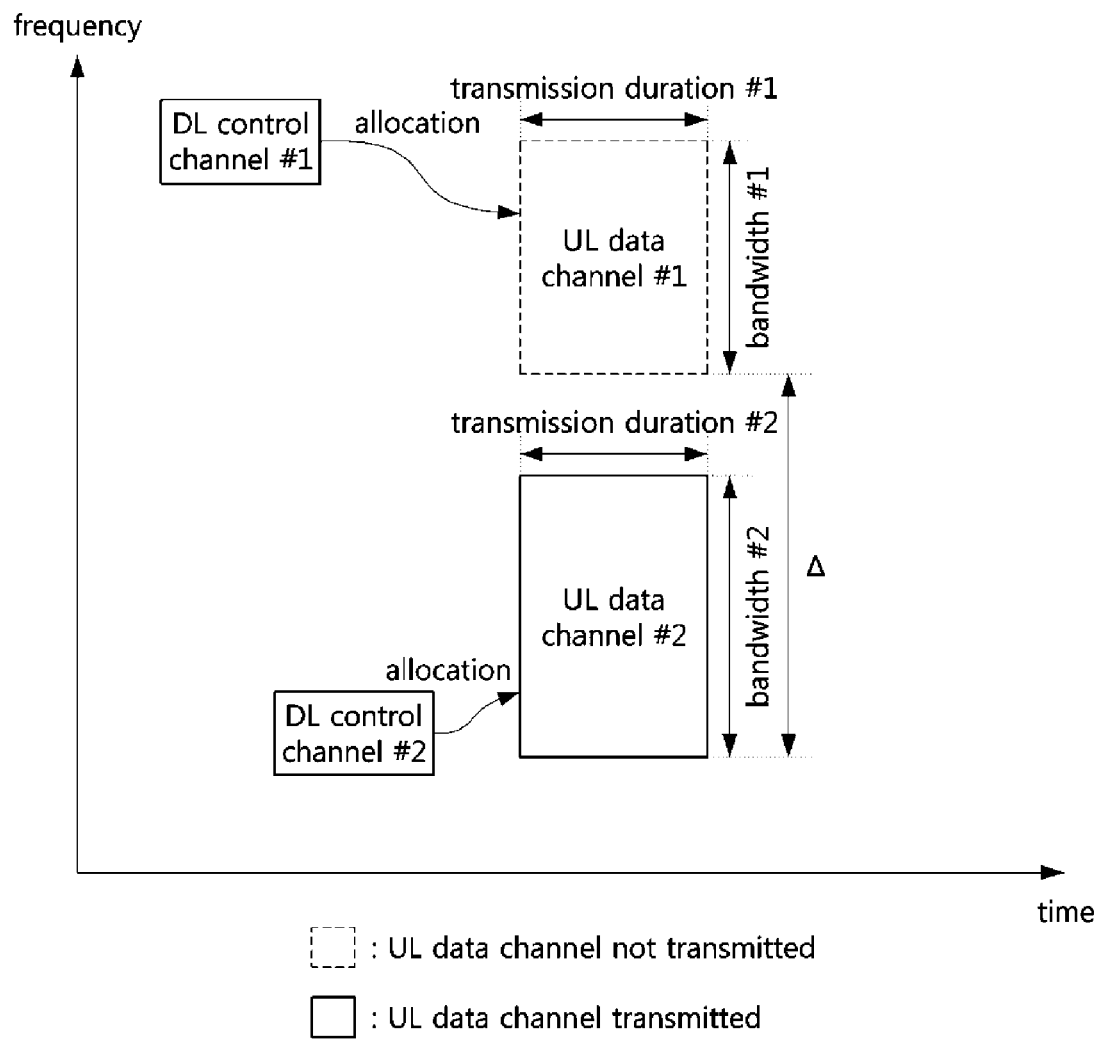
FIG. 3 is a conceptual diagram illustrating a first embodiment of a UL transmission method in a communication system.

FIG. 3 is a conceptual diagram illustrating a first embodiment of a UL transmission method in a communication system.

Referring to FIG. 3, the base station may transmit a DL control channel #1 (e.g., DCI) including resource allocation information for a transport block to the terminal. The DL control channel #1 may indicate a UL data channel #1. After transmitting the DL control channel #1, when the UL data channel #1 is determined to be used for another purpose, the base station may transmit a DL control channel #2 (e.g., DCI) including resource allocation information for the same transport block indicated by the DL control channel #1 to the terminal. The DL control channel #2 may indicate a UL data channel #2 instead of the UL data channel #1. In this case, the DL control channel #2 may be used to stop transmission of the UL data channel #1. The HARQ process identifier and the NDI included in the DL control channel #2 may be the same as the HARQ process identifier and the NDI included in the DL control channel #1. Alternatively, when CBGs are used, the HARQ process identifier, the NDI, the CBGTI, and the CBGFI included in the DL control channel #2 may be the same as the HARQ process identifier, the NDI, the CBGTI, and the CBGFI included in the DL control channel #1. Alternatively, each of the CBGTI and the CBGFI included in DL control channel #2 may not be the same as each of the CBGTI and the CBGFI included in DL control channel #1.

The terminal may receive the DL control channels #1 and #2 including the resource allocation information of the same transport block from the base station. The DL control channel #1 may indicate the UL data channel #1 to which the transport block is mapped, and the DL control channel #2 may indicate the UL data channel #2 to which the transport block is mapped. In this case, frequency resources through which the UL data channel is transmitted may be changed. For example, an offset between a starting frequency resource (e.g., starting subcarrier or starting resource block) of the UL data channel #1 and a starting frequency resource (e.g., starting subcarrier or starting resource block) of the UL data channel #2 may be Δ. The DL control channel #2 may inform the terminal of the offset Δ. The base station may utilize the corresponding frequency resources (e.g., a bandwidth #1) for another purpose by changing the frequency resources of the UL data channel. For example, the base station may allocate the corresponding frequency resources to other terminal(s).

The terminal may transmit the UL data channel #2 according to the indication of the last DL control channel #2 among the DL control channels #1 and #2. That is, the UL data channel #1 allocated by the DL control channel #1 may not be used. Here, a transmission duration #1 of the UL data channel #1 may be the same as a transmission duration #2 of the UL data channel #2. Alternatively, the transmission duration #1 of the UL data channel #1 may be different from the transmission duration #2 of the UL data channel #2. The bandwidth #1 of the UL data channel #1 may be the same as a bandwidth #2 of the UL data channel #2. Alternatively, the bandwidth #1 of the UL data channel #1 may be different from the bandwidth #2 of the UL data channel #2.

Figure 4:
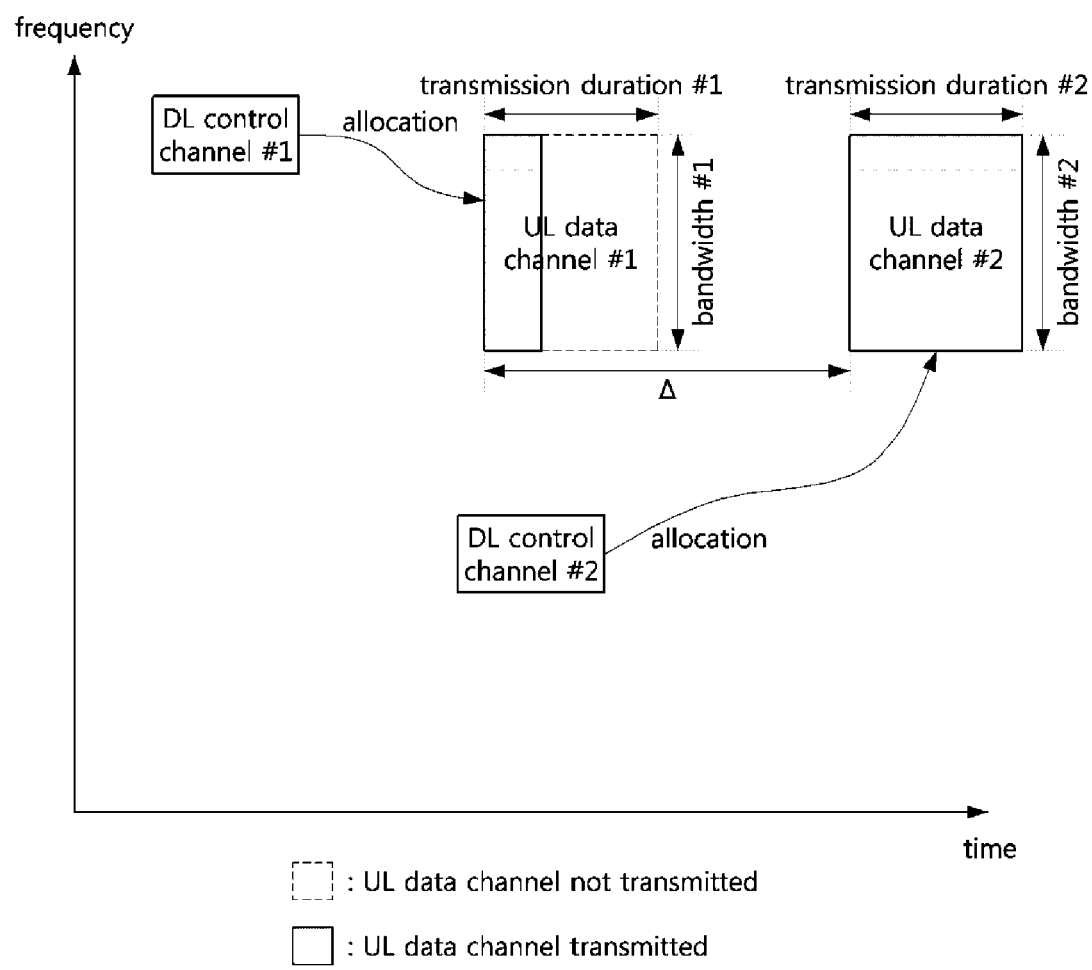
FIG. 4 is a conceptual diagram illustrating a second embodiment of a UL transmission method in a communication system.

FIG. 4 is a conceptual diagram illustrating a second embodiment of a UL transmission method in a communication system.

Referring to FIG. 4, the base station may transmit a DL control channel #1 (e.g., DCI) including resource allocation information for a transport block to the terminal. The DL control channel #1 may indicate a UL data channel #1. After transmitting the DL control channel #1, when the UL data channel #1 is determined to be used for another purpose (e.g., the UL data channel #1 is assigned to other terminal(s)), the base station may transmit a DL control channel #2 including resource allocation information (e.g., DCI) for the same transport block indicated by DL control channel #1 to the terminal. The DL control channel #2 may indicate a UL data channel #2 instead of the UL data channel #1. In this case, the DL control channel #2 may be used to stop transmission of the UL data channel #1. The HARQ process identifier and the NDI included in the DL control channel #2 may be the same as the HARQ process identifier and the NDI included in the DL control channel #1. Alternatively, when CBGs are used, the HARQ process identifier, the NDI, the CBGTI, and the CBGFI included in the DL control channel #2 may be the same as the HARQ process identifier, the NDI, the CBGTI, and the CBGFI included in the DL control channel #1. Alternatively, each of the CBGTI and the CBGFI included in DL control channel #2 may not be the same as each of the CBGTI and the CBGFI included in DL control channel #1.

Meanwhile, the size of the transport block mapped to the UL data channel may vary according to the number of resource elements allocated by the DL control channel #1. For example, the size of a transport block to which discrete Fourier transform (DFT) precoded UL data channel is mapped may be determined as a function of the number of resource elements allocated by a DL control channel and parameters indicated by an RRC message. Therefore, when the base station allocates different numbers of resource elements through the DL control channel #1 and the DL control channel #2, the size of the transport block to be included in the UL data channel #1 may be configured to be different from the size of the transport block to be included in the UL data channel #2.

In order for the terminal to transmit the same transport block to the base station, the sizes of the transport blocks to be included in the UL data channel #1 and the UL data channel #2 are preferably kept to be the same. In order to inform the terminal that the size of the transport block to be mapped to the UL data channel #2 is the same as the size of the transport block to be mapped to the UL data channel #1, the base station may configure an MCS index (e.g., $I_{MCS}$) included in the DL control channel #2 within a range of MCS indexes for retransmission instead of a range of MCS indexes for initial transmission. Here, the range of MCS indexes for initial transmission may be 0, 1, . . . , and 27 when 256 quadrature amplitude modulation (256QAM) is used and may be 0, 1, . . . , and 28 when 256QAM is not used. Here, the range of MCS indexes for retransmission may be 28, 29, 30 and 31 when 256QAM is used and may be 29, 30 and 31 when 256QAM is not used. However, the corresponding transport block (e.g., the transport block indicated by the DL control channel #2) may be an initial transport block or a retransmission transport block transmitted from the base station to the terminal.

The terminal may receive the DL control channels #1 and #2 including the resource allocation information of the same transport block from the base station. The DL control channel #1 may indicate the UL data channel #1 to which the transport block is mapped, and the DL control channel #2 may indicate the UL data channel #2 to which the transport block is mapped. In this case, time resources through which the UL data channel is transmitted may be changed. For example, an offset between a starting time resource (e.g., starting symbol or starting slot) of the UL data channel #1 and a starting time resource (e.g., starting symbol or starting slot) of the UL data channel #2 may be Δ. The DL control channel #2 may inform the terminal of the offset Δ. The base station may utilize the corresponding time resources for another purpose by changing the time resources of the UL data channel. For example, the base station may allocate the corresponding time resources to other terminal(s).

The terminal may transmit the UL data channel #2 according to the indication of the last DL control channel #2 among the DL control channels #1 and #2. For example, if a decoding operation of the DL control channel #2 is completed before transmission of the UL data channel #1, the terminal may transmit the UL data channel #2 without transmitting the UL data channel #1. Also, a time for performing the transmission operation of the UL data channel #1 may be required. Alternatively, the terminal may receive the DL control channel #2 while transmitting the UL data channel #1. When a part of the UL data channel #1 is transmitted before completion of a decoding operation of the DL control channel #2, the terminal may not transmit the remainder of the UL data channel #1. Thereafter, the terminal may transmit the UL data channel #2 indicated by the DL control channel #2.

When the DL control channel #2 includes resource allocation information of a retransmission transport block, the resources of the UL data channel #2 may be allocated without restriction. Since the resources of the UL data channel may be adaptively reallocated by the base station, the embodiments described above may be effectively applied to dynamic resource allocation schemes (e.g., dynamic time division duplex (TDD) allocation schemes) and the URLLC services. In addition, both time and frequency resources of the UL data channel #2 may be changed.

In the process of mapping the same transport block to the UL data channel #2 after the transport block is mapped to the UL data channel #1, the terminal may not be able to reuse a result already performed in the mapping process of the UL data channel #1. If the size (e.g., the number of CCEs) of the DL control channel #1 is equal to the size of the DL control channel #2, the DL control channel #2 may include a part of the entire resource allocation information. If the transport block can be mapped equally to the UL data channels #1 and #2, a time available for UL transmission at the terminal may be further secured. Therefore, the transmission latency of the transport block can be reduced.

The base station may transmit to the terminal information indicated by a common field (e.g., field indicating common information) included in the DL control channels used for transmission of resource allocation information of the same transport block by using a higher layer signaling. Alternatively, the common field included in the DL control channels used for transmission of the resource allocation information of the same transport block may be defined in the technical specification known to the base station and the terminal.

When the DL control channels #1 and #2 include resource allocation information of the same transport block and the DL control channels #1 and #2 are successfully received, the terminal may decode the DL control channel #1 and the DL control channel #2 together. For example, a decoding result of the DL control channel #2 may be combined with a decoding result of the DL control channel #1. On the other hand, when the DL control channels #1 and #2 include resource allocation information of the same transport block and the DL control channel #1 is not successfully received, the terminal may decode only the DL control channel #2.

For example, as in the embodiment shown in FIG. 3, only the frequency resources of the UL data channel may be changed and the remaining resources (e.g., time resources) of the UL data channel may be allocated identically. As in the embodiment shown in FIG. 4, only the time resources of the UL data channel may be changed and the remaining resources (e.g., frequency resources) of the UL data channel may be allocated identically.

When the sizes of the transport blocks are the same and the modulation and coding schemes (MCSs) for the transport blocks are the same, the size of the time resources and the size of the frequency resources occupied by the UL data channel #2 may be the same as the size of the time resources and the size of the frequency resources occupied by the UL data channel #1. In this case, the starting time resource (e.g., starting symbol or starting slot) of the UL data channel #2 may be configured differently from the starting time resource (e.g., starting symbol or starting slot) of the UL data channel #1. Alternatively, the starting frequency resource (e.g., starting subcarrier or starting resource block) of the UL data channel #2 may be configured differently from the starting frequency resource (e.g., starting subcarrier or starting RB) of the UL data channel #1. In this case, the terminal may not re-encode the transport block, perform a scrambling operation (e.g., time-domain scrambling operation) on the already-generated code block, and map the scrambled code block to the UL data channel #2.

In the procedure of generating the DL control channel #2, the base station may assume that the DL control channel #1 has been successfully received at the terminal, and generate the DL control channel #2 including information changed from the information included in the DL control channel #1. Accordingly, the size of the information (e.g. codeword) included in the DL control channel #2 may be reduced, so that the code rate of the DL control channel #2 can be reduced, and the reception reliability of the DL control channel #2 can be improved. For example, when the DL control channels #1 and #2 include resource allocation information for the same transport block, the base station may transmit the DL control channel #2 including time resource information (e.g., transmission time point) of the UL data channel #2. In this case, since the size of the information included in the DL control channel #2 is smaller than that of the DL control channel #1, the format of the DL control channel #2 may be different from the format of the DL control channel #1.

The above-described methods may be applied not only to transmission of DL control channels including resource allocation information for the same transport block, but also to transmission of DL control channels including resource allocation information for different transport blocks.

Transmission of Uplink Control Information (UCI) Through PUSCH

The terminal may transmit a UL data channel in a slot configured for transmission of UL control information (UCI). The base station may transmit information elements needed for the transmission of the UL control channel through a higher layer signaling or a DL control channel. In case that a starting symbol of the UL control channel is the same as a starting symbol of the UL data channel, the terminal may transmit the UL control information using the UL data channel instead of the UL control channel. In this case, the UL data channel may include both the transport block (e.g., UL data) and the UL control information.

In the following, methods for transmitting a UL data channel including UL control information will be described. The terminal may receive a DL control channel #1 including resource allocation information for UL transmission, and map a transport block and UL control information to a UL data channel #1 based on the information included in the DL control channel #1. That is, the UL data channel #1 including the transport block and the UL control information may be transmitted. Here, the transport block mapped to the UL data channel may also refer to a code block generated based on the transport block, and the UL control information mapped to the UL data channel may refer to the coded UL control information.

When the DL control channel #1 including resource allocation information for UL transmission is received and a DL control channel #2 including resource allocation information for UL (re)transmission is received, the terminal may perform the UL (re)transmission based on the information included in the DL control channel #2 instead of the DL control channel #1. For example, the terminal may map the transport block (or, transport block and UL control information) to a UL data channel #2 indicated by the DL control channel #2. That is, the terminal may transmit the UL data channel #2 instead of the UL data channel #1 indicated by the DL control channel #1.

Figure 5:
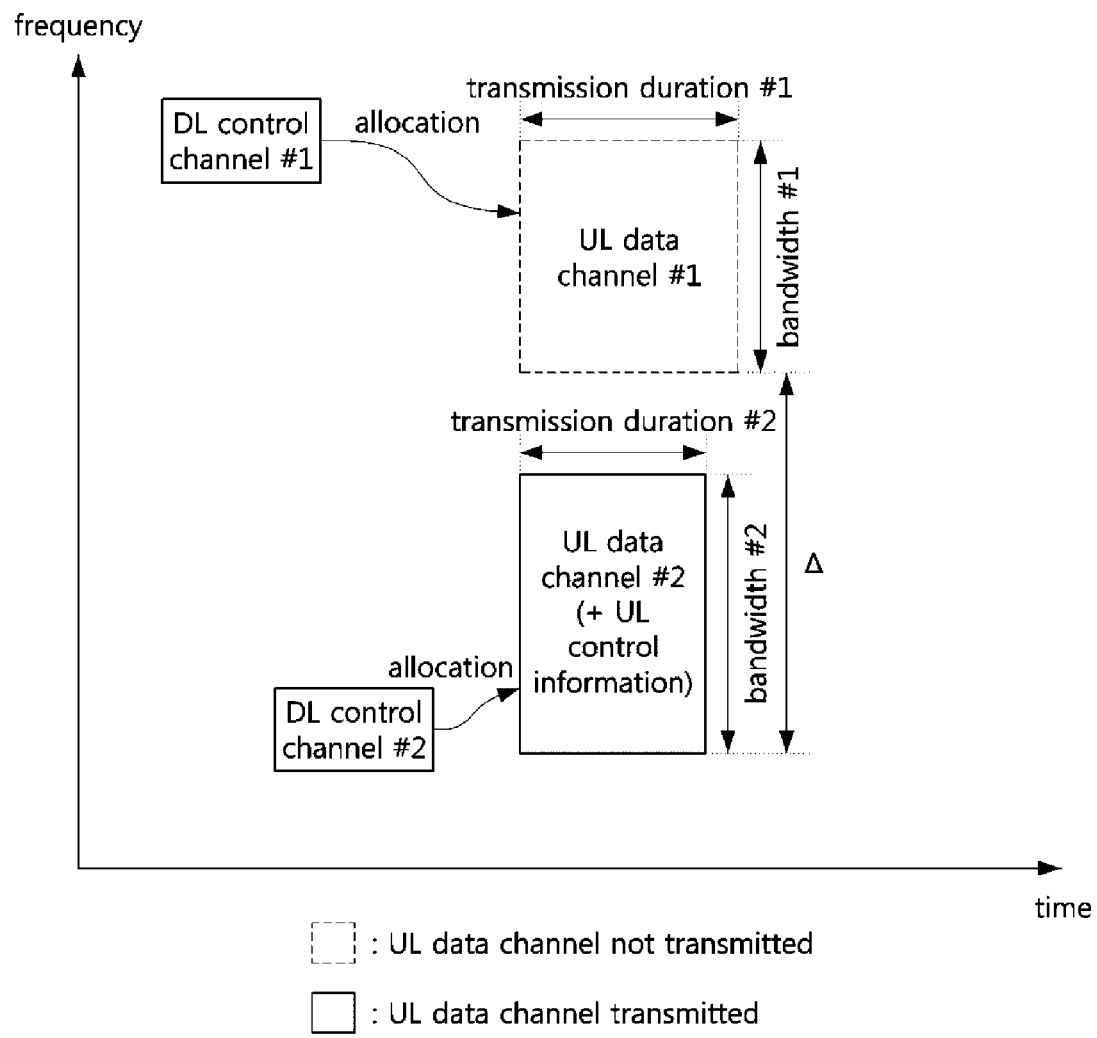
FIG. 5 is a conceptual diagram illustrating a third embodiment of a UL transmission method in a communication system.

FIG. 5 is a conceptual diagram illustrating a third embodiment of a UL transmission method in a communication system.

Referring to FIG. 5, the DL control channel #1 may indicate the UL data channel #1 (e.g., UL data channel #1 for transmission of UL control information), and the DL control channel #2 may indicate the UL data channel #2 (e.g., UL data channel #2 for transmission of a transport block). Some time resources among the time resources of the UL data channel #2 may be the same as the time resources of the UL data channel #1. Also, the starting time resource of the UL data channel #2 may be the same as the starting time resource of the UL data channel #1.

The terminal may receive the DL control channels #1 and #2 (e.g., DCI #1 and DCI #2) from the base station, and may perform UL transmission based on the information included in the DL control channel #2 instead of the DL control channel #1. For example, the terminal may map the transport block and the UL control information to the UL data channel #2 indicated by the DL control channel #2.

Meanwhile, the base station may transmit the DL control channel #1 including resource allocation information (e.g., resource allocation information indicating the UL data channel #1) for UL control information, and transmit the DL control channel #2 including resource allocation information indicating the UL data channel #2 having time resources (e.g., starting symbol or starting slot) different from those of the UL data channel #1. In this case, the terminal may not be able to map the UL control information to the UL data channel #2. This is because the transmission time point of the UL data channel #2 is different from the transmission time point of the UL data channel #1. That is, since the base station expects to receive the UL control information during the time resources of the UL data channel #1, the base station may not be able to receive the UL control information when the UL control information is transmitted through the UL data channel #2. Therefore, the terminal may not transmit both the UL data channel #1 and the UL control information.

In order for the UL control information to be fed back earlier than a time configured by the base station, a processing time at the terminal should be shortened. On the other hand, if the UL control information is fed back later than the time configured by the base station, a transmission latency of data may increase. Thus, the UL control information may be preferably fed back at the time configured by the base station. In the proposed methods, the terminal may generate a UL control channel, map UL control information to the UL control channel, and transmit the UL control channel including the UL control information instead of a UL data channel.

Figure 6:
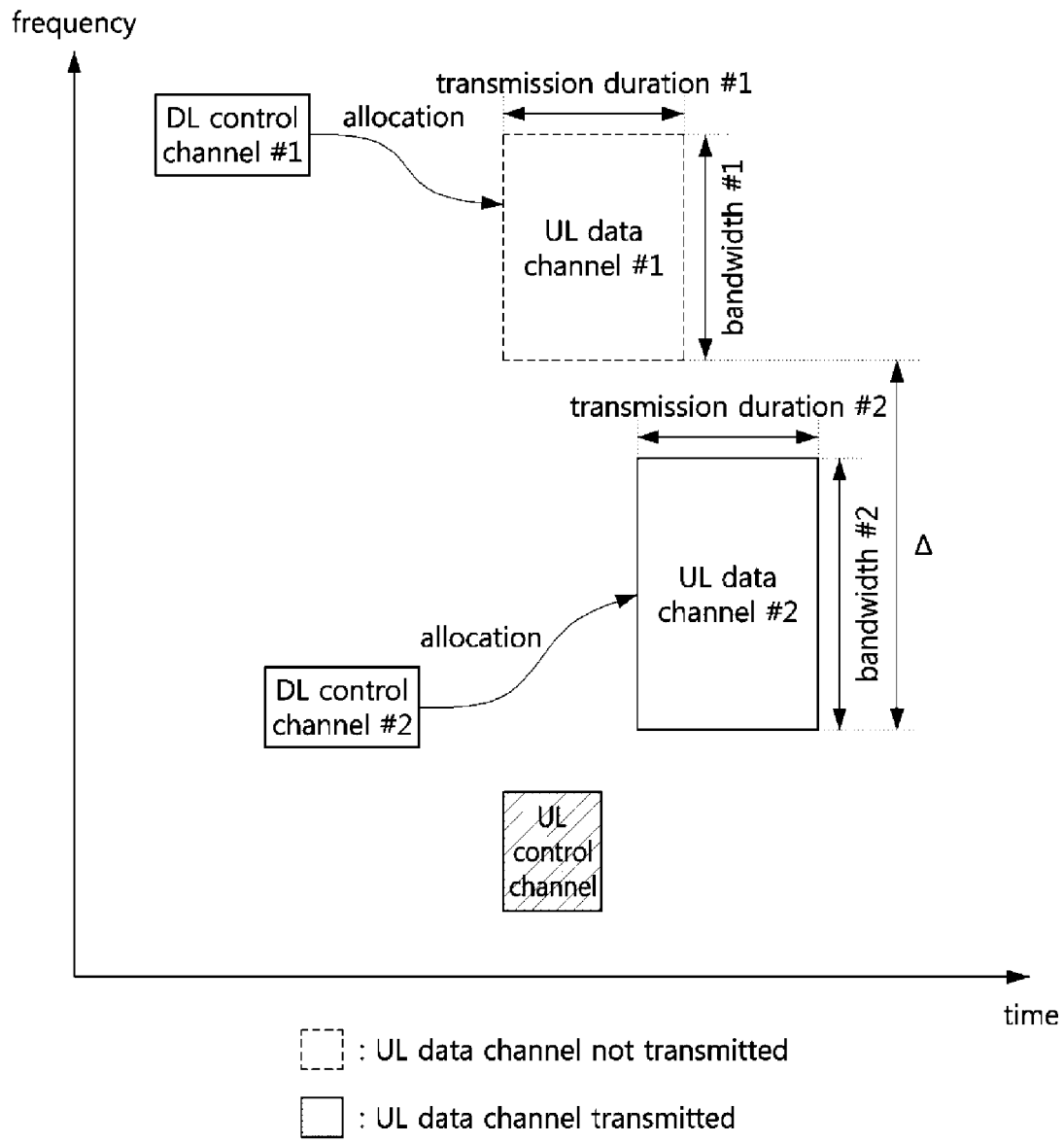
FIG. 6 is a conceptual diagram illustrating a fourth embodiment of a UL transmission method in a communication system.
Figure 7:
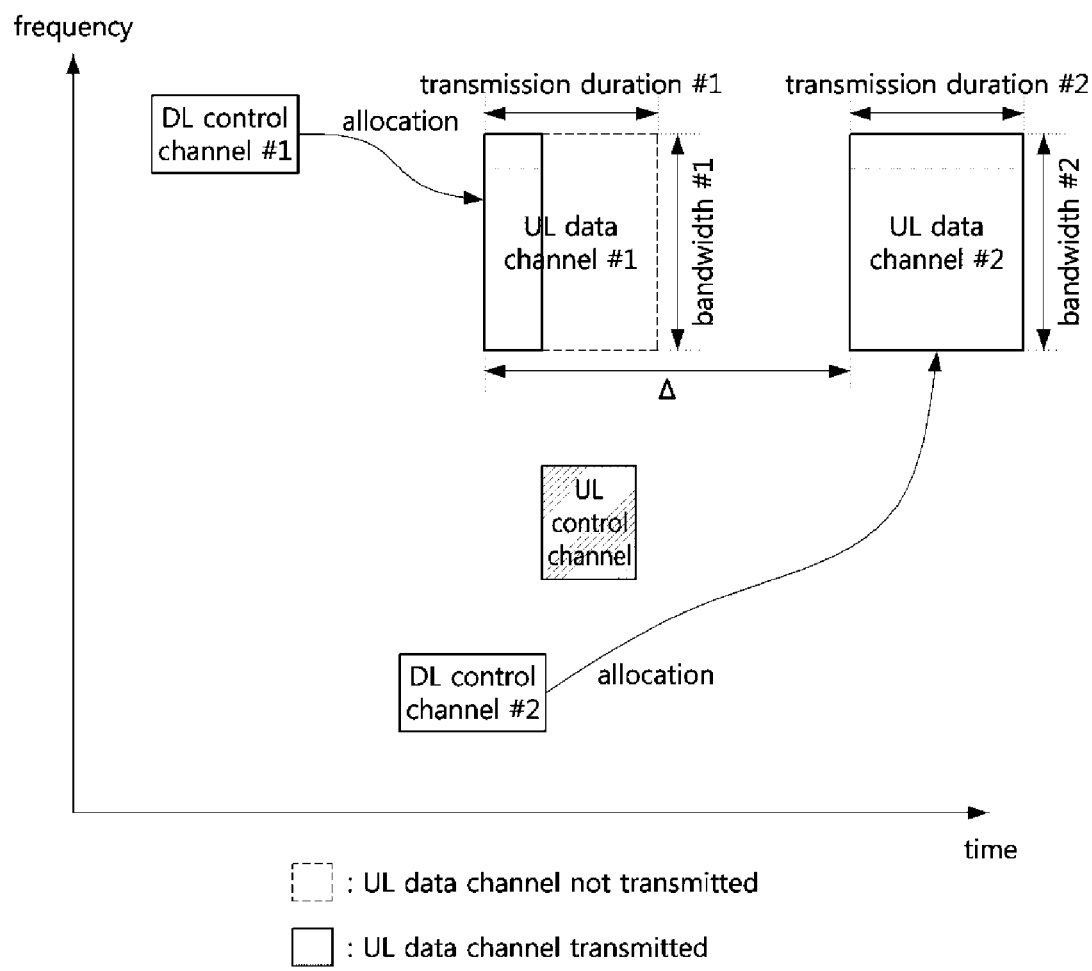
FIG. 7 is a conceptual diagram illustrating a fifth embodiment of a UL transmission method in a communication system.

FIG. 6 is a conceptual diagram illustrating a fourth embodiment of a UL transmission method in a communication system, and FIG. 7 is a conceptual diagram illustrating a fifth embodiment of a UL transmission method in a communication system.

Referring to FIG. 6 and FIG. 7, the time resources of the UL data channel #2 may be different from the time resources of the UL data channel #1. For example, the starting symbol or starting slot of the UL data channel #2 may be different from the starting symbol or starting slot of the UL data channel #1. In this case, the terminal may not map the UL control information to the UL data channel #2. The terminal may map the UL control information to a separate UL control channel instead of the UL data channel #2 and may transmit the UL control channel. The time resources used for transmission of the UL control channel may belong to the time resources of the UL data channel #1. For example, the starting symbol or starting slot of the UL control channel may be the same as the starting symbol or starting slot of UL data channel #1. In the embodiment shown in FIG. 6, the UL data channel #1 may not be transmitted, and in the embodiment shown in FIG. 7, a part of the UL data channel #1 may be transmitted.

In order to determine the resources (e.g., starting symbol, duration of symbols, starting slot, location of frequency resources, bandwidth, and sequence information) of the UL control channel, the terminal may use a control channel element (CCE), an acknowledgment resource indicator (ARI), an ACK/NACK resource indicator, or a PUCCH resource indicator which is associated with the most-recently received DL control channel. Also, the terminal may determine the resources of the UL control channel by using information configured by the higher layer signaling as well as the DL control channel. Alternatively, the terminal may determine the resources of the UL control channel using only the information configured by the higher layer signaling.

In the proposed methods, the terminal may newly calculate the size of the UL control information (e.g., the number of resource elements) and map the corresponding UL control information to the UL data channel. When the number of resource elements of the UL data channel #2 is greater than the number of resource elements of the UL data channel #1, the size of UL control information mapped to the UL data channel #2 may be larger than the size of UL control information mapped to the UL data channel #1. Therefore, when the UL control information is transmitted through the UL data channel #2, the terminal may increase the size of the UL control information within a range where the coding rate configured by the base station is maintained. For example, when channel state information part 2 (e.g., channel state information (CSI) part 2) that cannot be mapped to the UL data channel #1 is mapped to the UL data channel #2, if a reference coding rate $C_T$ configured by the base station is satisfied, the terminal may map the channel state information part 2 to the UL data channel #2. In the methods described above, since the size of the channel state information part 2 should be assumed differently depending on the presence or absence of the DL control channel #2, the terminal may not discard the calculated result after calculating the size of the channel state information part 2.

On the other hand, when the number of resource elements of the UL data channel #2 is smaller than the number of resource elements of the UL data channel #1, the size of UL control information mapped to the UL data channel #2 may be smaller than the size of UL control information mapped to the UL data channel #1. Therefore, when the UL control information is transmitted through the UL data channel #2, the terminal may decrease the size of the UL control information within a range where the coding rate configured by the base station is maintained. For example, when a part of channel state information part 2 (e.g., CSI part 2) that can be mapped to the UL data channel #1 is mapped to the UL data channel #2, if the reference coding rate $C_T$ configured by the base station is not satisfied, the terminal may not map a part of the channel state information part 2 to the UL data channel #2.

In another proposed method, when it is determined that the UL control information is transmitted through the UL data channel #2 instead of the UL data channel #1 after the size of the UL control information to be transmitted through the UL data channel #1 is determined, the terminal may map the UL control information having the already-determined size to the UL data channel #2 and transmit the UL data channel #2 to which the UL control information is mapped. This scheme may be usefully applied when the processing time for transmission of the UL data channel #2 is insufficient. That is, the terminal may omit the operation of newly encoding the UL control information and the mapping operation of the encoded UL control information. Alternatively, the terminal may omit the operation of re-mapping the already-encoded UL control information.

In case that the UL data channel is transmitted in a frequency hopping manner and the UL control information is classified by type, the terminal may map a part of the UL control information (e.g., first type of UL control information) to a UL data channel corresponding to a first frequency hop, and may map another part of the UL control information (e.g., second type of UL control information) to a UL data channel corresponding to a second frequency hop. When the size of the channel state information part 2 is changed, the terminal may map UL data to the UL data channel in consideration of the changed size of the channel state information part 2.

The base station and the terminal may calculate the size of the UL control information based on a mathematical equation defined in the technical specification. The reference coding rate may be different for each type of UL control information. For example, in the NR communication system, when the UL control information is HARQ ACK, the terminal may calculate the size of UL control information (e.g., the number of resource elements to which the UL control information is mapped) using Equation 1 below.

$$Q'_{ACK} = \min\left(\left\lceil \frac{A}{B} \cdot C \right\rceil, \lceil \alpha \cdot D \rceil\right), \text{ where}$$
$$A = (O+L) \cdot \beta, B = \sum_r K_r, C = \sum_s M(s), D = \sum_s N(s)$$

[Equation 1]

The size of other UL control information (e.g., CSI part 1, CSI part 2) excluding HARQ ACK may be calculated based on a scheme similar to Equation 1. Each of $M(s)$ and $N(s)$ may indicate the number of subcarriers in the s-th symbol. When the number of resource elements of the UL data channel #2 is different from the number of resource elements of the UL data channel #1, the terminal may re-calculate $Q_{ACK}$. Also, when the number of resource elements of the UL data channel #2 is different from the number of resource elements of the UL data channel #1, the terminal may re-calculate $Q'_{CSI-1}$ and $Q'_{CSI-2}$. $Q'_{CSI-1}$ may be the number of resource elements to which the CSI part 1 is mapped, and $Q'_{CSI-2}$ may be the number of resource elements to which the CSI part 2 is mapped. The coding rate matching operation (e.g., rate matching operation) of the UL data channel may be performed after the resource elements that the UL control information does not occupy are determined. The coding rate matching operation of the UL control information may be performed using the re-calculated $Q'_{ACK}$, $Q'_{CSI-1}$, and $Q'_{CSI-2}$.

Alternatively, the terminal may not newly calculate the size of the UL control information (e.g., the number of resource elements), and map the encoded UL control information generated in the mapping procedure of the UL data channel #1 to the UL data channel #2. That is, the UL control information may be encoded based on the information indicated by the UL data channel #1 instead of the information indicated by the UL data channel #2.

For example, C in Equation 1 may be determined based on the UL data channel #1. That is, the coding rate of the HARQ ACK may be determined based on the UL data channel #1. D used to determine the maximum value of $Q'_{ACK}$ may be determined based on the UL data channel #1 or #2. Further, $Q'_{CSI-1}$ and $Q'_{CSI-2}$ may be determined based on the above scheme.

In case that D is calculated using the resource allocation information of the UL data channel #1, the terminal may not newly encode the UL control information, and map the encoded UL control information generated in the mapping procedure of the UL data channel #1 to the UL data channel #2. However, when the resources occupied by the UL data channel are changed, D calculated based on the DL control channel #1 may be different from D calculated based on the DL control channel #2. In this case, the UL control information may be mapped to too many resource elements among the resource elements for the UL data channel #2. Therefore, when D is calculated using the resource allocation information of the UL data channel #2, resource elements occupied by the transport block (e.g., UL data) among the resource elements for the UL data channel #2 may be guaranteed.

When D of $Q'_{ACK}$ changes, the terminal may newly encode the UL control information. The channel state information part 2 (e.g., some or all of the channel state information part 2) may not be mapped to the UL data channel #1 but may be mapped to the UL data channel #2 according to D of $Q'_{CSI-2}$. Alternatively, The channel state information part 2 (e.g., some or all of the channel state information part 2) may not be mapped to the UL data channel #2 but may be mapped to the UL data channel #1 according to D of $Q'_{CSI-2}$.

The terminal may map the transport block to the UL data channel #2 based on the information included in the UL control channel #2. The base station may allocate resources of sufficient size (e.g., the number of resource elements) for the UL data channel #2. Therefore, when the transport block and the UL control information are mapped to the UL data channel #2, an appropriate coding rate may be used.

The above-described schemes may be applied to the case where only UL control information is mapped to the DL control channel #1. The amount of UL control information may be determined based on a mathematical equation defined in the technical specifications. The number of resource elements for the UL data channel #2 may be equal to the number of resource elements for the UL data channel #1. Alternatively, the number of resource elements for the UL data channel #2 may be different from the number of resource elements for the UL data channel #1.

Processing Time

In order to apply the methods described above, a processing time for UL transmission at the terminal may be required. The processing time may include a time for decoding the DL control channel, a time for encoding the transport block, and the like. In case that the base station allocates a time that is too short to the terminal, the terminal may not be able to perform all the procedures according to its processing capability. The following methods may be applied to a UL transmission procedures with the methods described above. Alternatively, only the following methods may be applied to the UL transmission procedure.

The (re)allocation procedure of the transport block may not be performed earlier than a time known to the base station and the terminal. The time shared by the base station and the terminal may be determined based on the processing capability of the terminal exchanged in an initial access procedure of the terminal.

Alternatively, the (re)allocation procedure of the transport block may be performed earlier than the time shared by the base station and the terminal. The base station may perform an initial access procedure with the terminal, and may identify the processing capability of the terminal in the initial access procedure. For example, the minimum time required for processing operations based on the DL control channel may be determined based on the processing capability of the terminal. The required minimum time may be expressed differently and determined for each subcarrier spacing. Also, the minimum required time may be configured in units of symbols or slots.

When the base station transmits two or more DL control channels including resource allocation information of the same transport block, the terminal that has received two or more DL control channels may not perform all the processing operations since the two or more DL control channels include the resource allocation information of the same transport block. That is, some operations (e.g., coding rate matching operation) may not be performed by the terminal. Therefore, the minimum time required for processing operations based on the DL control channel for reallocation of the same transport block may be configured to be different from the minimum time required for processing operations based on the DL control channel for allocation of the transport block.

When the DL control channel #1 indicates multiplexing of the UL control information and the transport block (e.g., UL data), the terminal may receive a new DL control channel #2. In this case, the terminal may map the UL control information and the transport block to different physical channels (e.g., UL control channel and UL data channel). Alternatively, the terminal may transmit a UL data channel including only the transport block without transmitting the UL control information. Since the time required for each of the processing operations is different, the time required for each processing operation needs to be distinguished.

The time required for the processing of the UL control information may be distinguished from the time required for the processing of the transport block. When the terminal secures the time required for processing the UL control information, the terminal may map the UL control information to the UL control channel. Alternatively, the terminal may multiplex the UL control information and the transport block on the UL data channel.

The procedure for mapping the UL control information to the UL control channel may be different from the procedure for mapping the UL control information to the UL data channel. Here, the required time may be a long time among the processing time of the UL control information in the mapping procedure of the UL control channel and the processing time of the UL control information in the mapping procedure of the UL data channel. However, it may be assumed that the processing time of the UL control information in the mapping procedure of the UL control channel is the same as the processing time of the UL control information in the mapping procedure of the UL data channel.

The processing time of the UL control information in the mapping procedure of the UL control channel may be different from the processing time of the UL control information in the mapping procedure of the UL data channel. This is because the terminal may multiplex the UL control information and the transport block in the UL data channel #2 indicated by the DL control channel #1 or the terminal may map the transport block to a new UL control channel after the multiplexing operation of the UL control information is started in the UL data channel #1 indicated by the DL control channel #1. When the UL control information is transmitted through the UL data channel, the terminal may reuse the encoded UL control information and the rate-matched UL control information. On the other hand, when the UL control information is transmitted through the UL control channel, the terminal may newly perform a coding operation and a coding rate matching operation (e.g., rate matching operation) for the UL control information.

PUSCH Bundling

The UL data channel may be repeatedly transmitted. The base station may transmit information indicating the number of repeated transmissions of UL data using one or more of a higher layer message, a DL control channel, and a MAC control element (CE). The terminal may identify the number of repeated transmissions of the UL data by receiving at least one of the higher layer message, the DL control channel, and the MAC CE. The base station may transmit a DL control channel including resource allocation information of the UL data channel. The terminal may receive the DL control channel from the base station, and may repeatedly transmit the UL data channel based on the information included in the DL control channel. Here, the UL data channel may be transmitted using the same resources (e.g., resource blocks, starting symbol, number of symbols, transmit power, HARQ process identifier).

The terminal may receive a DL control channel #1 including resource allocation information of a transport block (e.g., UL data) from the base station, and may receive a DL control channel #2 from the base station after receiving the DL control channel #1. The DL control channels #1 and #2 may include resource allocation information of the same transport block. The proposed methods may be applied to not only a communication procedure using the DL control channels #1 and #2 including resource allocation information of the same transport block but also a communication procedure using DL control channels #1 and #2 including resource allocation information of different transport blocks.

After the transmission of the UL data channel #1 is completed, the terminal may complete a decoding operation for the DL control channel #2. Alternatively, the terminal may complete the decoding operation for the DL control channel #2 during the transmission of the UL data channel #1. When the DL control channel #2 is received, the terminal may perform the decoding operation for the DL control channel #2 for a time according to its processing capability.

When the base station allocates the UL data channels #1 and #2, the number of repeated transmissions may be a sum of the number of repeated transmissions of the UL data channel #1 and the number of repeated transmissions of the UL data channel #2. Alternatively, the number of repeated transmissions may be increased when the UL data channels #1 and #2 are all transmitted. The terminal may transmit the UL data channels #1 and #2 by the number of repeated transmissions configured by the base station.

If the transmission of the UL data channel #1 is not completed even after the decoding of the DL control channel #2 is completed, the terminal may not transmit the UL data channel #1. In this case, the terminal may not consider the UL data channel #1 as transmitted. The base station may estimate a completion time of the decoding operation for the DL control channel #2 at the terminal, and may determine which UL data channel (e.g., UL data channel #1 or #2) is transmitted. The base station may perform a monitoring operation of the UL data channel #1 and a monitoring operation of the UL data channel #2 in one or more slots. It may not be easy to predict the UL data channel transmitted from the terminal since the transmission timing (e.g., timing advance (TA)) as well as the processing time of the terminal should be considered.

CBG

When one transport block is divided into two or more CBGs, the base station may transmit to the terminal a higher layer message including information instructing to transmit an HARQ response for two or more CBGs instead of one transport block. The base station may transmit a DL control channel #1 including resource allocation information of a UL data channel #1, and the terminal receiving the DL control channel #1 may transmit the UL data channel #1 based on the information included in the DL control channel #1.

Since all the transport blocks are reallocated in a transport block reallocation procedure, the size of resources occupied by a UL data channel #2 to which all the transport blocks are mapped may be large. However, when the terminal is allowed to transmit only some CBGs, the size of the resources occupied by the UL data channel #2 may decrease. When one transport block is divided into K CBGs, the terminal may transmit some CBGs among the K CBGs through the UL data channel #1, and transmit the remaining CBGs among the K CBGs through the UL data channel #2. K may be an integer equal to or greater than 2. Here, the terminal may assume that a CBG for which is not directed to be transmitted or a CBG which is not reallocated does not exist.

Figure 8:
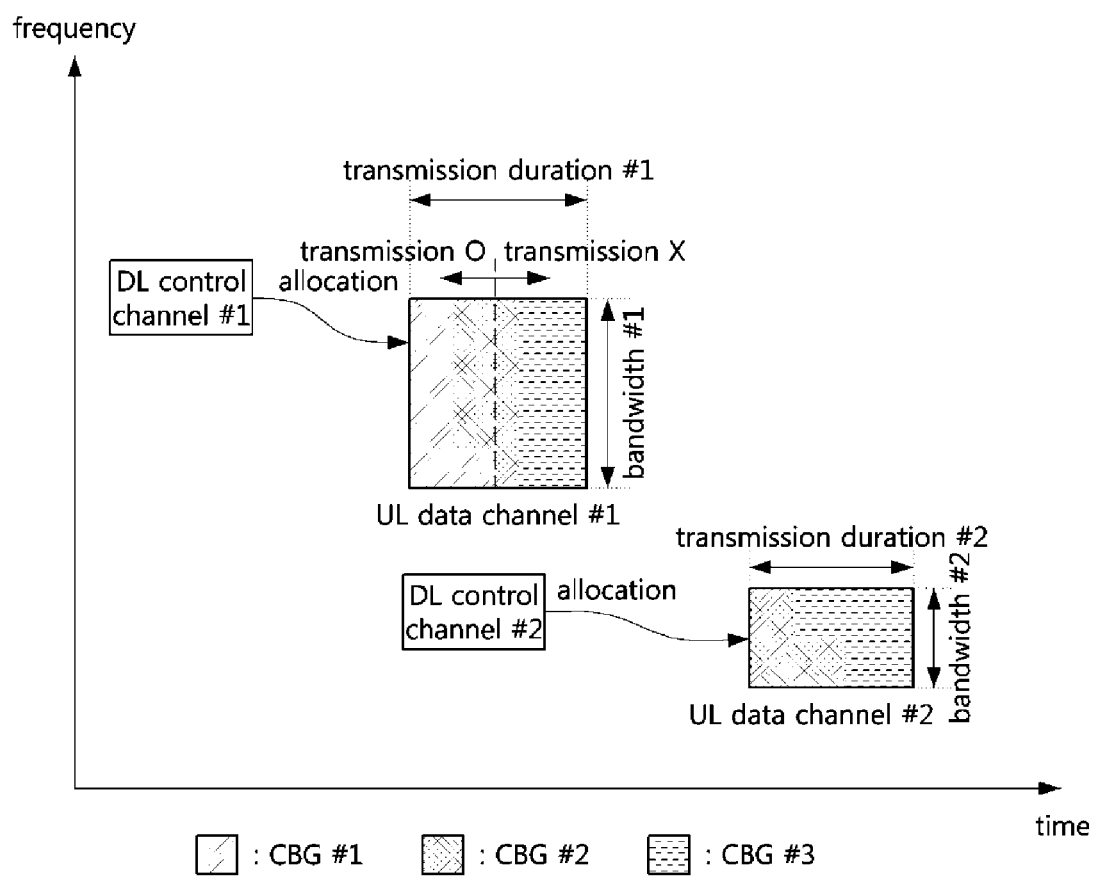
FIG. 8 is a conceptual diagram illustrating a sixth embodiment of a UL transmission method in a communication system.

FIG. 8 is a conceptual diagram illustrating a sixth embodiment of a UL transmission method in a communication system.

Referring to FIG. 8, one transport block may be divided into 3 CBGs. A reference signal is not shown for convenience of explanation. The base station may transmit a DL control channel #1 including resource allocation information for a transport block (e.g., CBGs #1 to #3 constituting the transport block), and may transmit a DL control channel #2 including resource allocation information for the CBGs #2 to #3 among the CBGs #1 to #3.

When the transport block is initially transmitted in a UL data channel #1 indicated by the DL control channel #1, the DL control channel #1 may include resource allocation information for all the CBGs constituting the transport block. On the other hand, when the transport block is retransmitted in the UL data channel #1 indicated by the DL control channel #1, the DL control channel #1 may include resource allocation information of all the CBGs constituting the transport block or resource allocation information of some CBGs.

The terminal may receive the DL control channels #1 and #2, may transmit the UL data channel #1 based on the information included in the DL control channel #1, and may transmit a UL data channel #2 based on the information included in the DL control channel #2. In the transmission procedure of the UL data channel #1, the terminal may transmit the CBG #1 that is not indicated by the DL control channel #2 among all the CBGs #1 to #3 constituting the transport block.

The DL control channel #1 may include information indicating that one transport block is divided into 3 CBGs (i.e., the CBGs #1 to #3) and/or information instructing to map the 3 CBGs to the UL data channel #1. The DL control channel #2 may include information instructing to map the CBGs #2 to #3 to the UL data channel #2. Since information for transmission of the CBG #1 is not included in the DL control channel #2, the terminal may transmit the CBG #1 based on the information included in DL control channel #1. In this case, the CBG #1 may be transmitted through UL data channel #1. Since the information for transmission of the CBGs #2 to #3 is included in the DL control channel #2, the terminal may transmit the CBGs #2 to #3 based on the information included in the DL control channel #2 instead of the DL control channel #1. In this case, the CBGs #2 to #3 may be transmitted through the UL data channel #2. Here, the time and frequency resources of the UL data channel #1 may be different from the time and frequency resources of the UL data channel #2.

In case that transmission of only some CBGs is allowed, the terminal may transmit all the symbols to which the some CBGs are mapped. In the UL data channel #1, the CBGs #1 to #2 may be mapped to the same symbols. In this case, the terminal may map a part of the CBG #2, null values or values (e.g., a specific sequence) preconfigured between the base station and the terminal to resources for the CBG #2 mapped to the same symbols as the symbols to which the CBG #1 is mapped. In this case, data may be mapped to all subcarriers in the symbols to which the CBG #1 is mapped. When the CBGs #1 to #2 are configured to be mapped to the same symbol and only the CBG #1 is transmitted in the corresponding symbol, there may occur a problem that a power control is different for each symbol. In this case, it may be difficult to generate the UL data channel #1 having a waveform of a proper quality.

The base station may transmit to the terminal the DL control channel #2 including information instructing not to transmit the CBG mapped after a specific symbol in the UL data channel #1. The base station may transmit the DL control channel #1 including information instructing to map the CBGs #1 and #3 to the UL data channel #1 and information instructing to map the CBG #2 to the UL data channel #2. The terminal may receive the DL control channels #1 and #2, and may perform UL transmission based on the information included in DL control channels #1 and #2. In this case, a transmission power may be 0 in some symbols belonging to a transmission duration #1 in which the UL data channel #1 is transmitted, and the transmission power may be larger than 0 in the remaining symbols except the some symbols in the transmission duration #1. Therefore, it may be difficult to generate the UL data channel #1 having a waveform of a proper quality.

In order to solve this problem, the base station may configure a specific time in the UL data channel #1, and a transmission region (e.g., transmission symbols) and a non-transmission region (e.g., non-transmission symbols) may be distinguished based on the specific time. The base station may transmit the DL control channel #2 including information instructing to map the CBG to the transmission region in the UL data channel #1. The terminal may receive the DL control channel #2 from the base station, and may operate based on the information included in the DL control channel #2. For example, the terminal may map the CBG to the transmission region in the UL data channel #1 and may not map the CBG to the non-transmission region in the UL data channel #1.

Also, the terminal may transmit a reference signal in the transmission region in the UL data channel #1 and not transmit reference signals in the non-transmission region in the UL data channel #1. For example, the base station may transmit a higher layer message to the terminal, the higher layer message including configuration information of a reference signal (e.g., front-loaded demodulation-reference signal (DM-RS) to be transmitted in the first symbol of the UL data channel #1 and a reference signal (e.g., additional DM-RS) to be transmitted in the n-th symbol of the UL data channel #1). Here, n may be an integer of 2 or more. The terminal may obtain the configuration information of the reference signals (e.g., front-loaded DM-RS and additional DM-RS) to be transmitted in the UL data channel #1 by receiving the higher layer message from the base station. Accordingly, the terminal may transmit the DM-RS in the first symbol of the UL data channel #1. However, when the n-th symbol belongs to the non-transmission region of the UL data channel #1, the terminal may not transmit the DM-RS in the n-th symbol of the UL data channel #1.

The base station may transmit a higher layer message including configuration information of a frequency hopping for the UL data channel to the terminal. The terminal may obtain the configuration information of the frequency hopping for the UL data channel by receiving the higher layer message from the base station. One CBG may be included in UL data channels corresponding to two frequency hops. For example, all CBGs may be included in a UL data channel (e.g., UL data channel #1) corresponding to the first frequency hop. Here, when the DL control channel #2 is generated as including information indicating transmission of a CBG to be mapped to the non-transmission region in the UL data channel #1 through the UL data channel #2, it may be preferable that all the CBGs are reallocated. This method may be the same as the reallocation method in units of transport blocks.

For example, UL control information may be mapped to the UL data channel #1. When the UL data channel #1 is transmitted without frequency hopping, all UL control information may be mapped to front symbols in the UL data channel #1. In this case, the transport block or the CBG may be mapped to the remaining symbols (e.g., symbols located in a rear region of the UL data channel #1) other than the symbols to which the UL control information is mapped among the symbols constituting the UL data channel #1. The UL control information and the transport block (or CBG) may be mapped to the UL data channel #1 according to the same rule, irrespective of whether the additional reference signal (e.g., additional DM-RS) is mapped in the UL data channel #1. When the DL control channel #2 is received as including resource allocation information of the entire transport block or all the CBGs, the terminal may transmit the UL control information by using the UL control channel instead of UL data channel #1.

Alternatively, the terminal may map the reference signal and the UL control information to the UL data channel #1 (e.g., symbols constituting the UL data channel #1), and transmit the reference signal and the UL control information mapped to the symbols. In this case, among the subcarriers constituting the UL data channel #1, there may be remaining subcarriers that are not used for transmission of the reference signal and the UL control information. The terminal may map arbitrary values, a transport block, a CBG, or information preconfigured (e.g., a specific sequence) between the terminal and the base station to the remaining subcarriers.

√ UL Preemption Indication (PI) or Dynamic Resource Reservation

Figure 9:
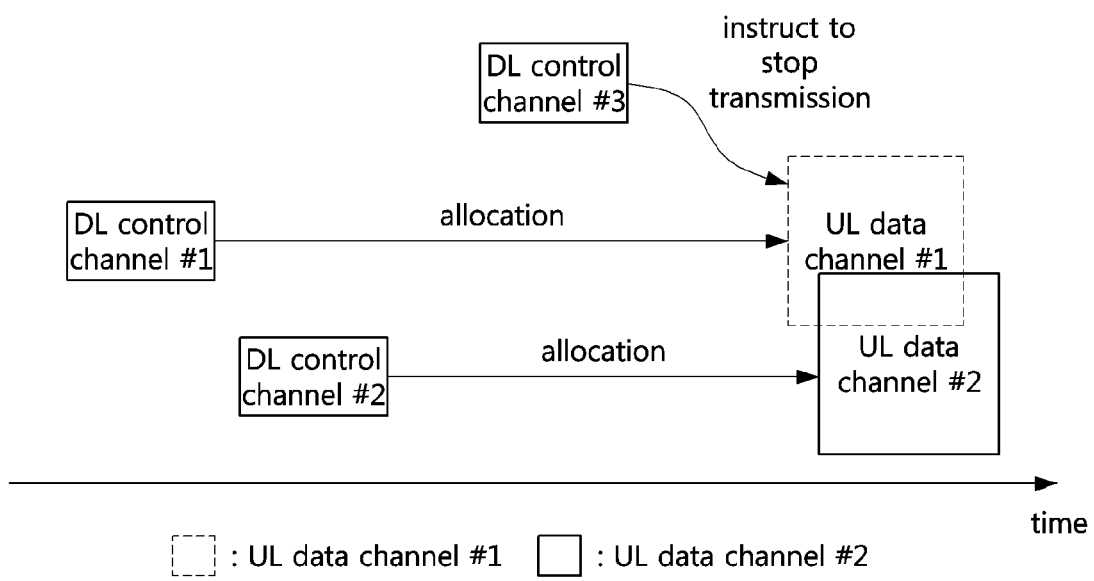
FIG. 9 is a conceptual diagram illustrating a seventh embodiment of a UL transmission method in a communication system.

FIG. 9 is a conceptual diagram illustrating a seventh embodiment of a UL transmission method in a communication system.

Referring to FIG. 9, the terminal may transmit data having two or more requirements (e.g., latency and error rate) using UL data channels. For example, data #1 may be eMBB data, and data #2 may be URLLC data. It may happen that a terminal #1 or a terminal #2 has to transmit the data #2 through a UL data channel #2 while the terminal #1 is transmitting a UL data channel #1 including the data #1. Some or all of the UL data channel #1 may overlap with the UL data channel #2.

In this case, in order to minimize interference of the UL data channel #2, the base station may control the UL data channel #1 not to be transmitted. For example, the base station may transmit to the terminal #1 a UL control channel #3 including information instructing the terminal not to transmit the UL data channel #1. The terminal #1 may receive the DL control channel #3, and may not transmit the UL data channel #1 based on the information included in the DL control channel #3. Alternatively, when a part of UL data channel #1 is transmitted before completion of a decoding operation for the DL control channel #3, the terminal #1 may not transmit the remaining part of the UL data channel #1.

During transmission of DL data channel(s), the base station may transmit the DL control channel #3 including a bitmap indicating unused time and frequency resources among time and frequency resources constituting the UL data channel #1. Each bit included in the bitmap may correspond to a UL reference resource. The terminal #1 may receive the DL control channel #3, and may not transmit the UL data channel #1 in resources indicated by the bitmap included in the DL control channel #3.

In order to inform the terminals transmitting the UL data channel #1 of the bitmap, the base station may transmit the DL control channel #3 to the terminals by using identification information common to the terminals (e.g., slot format indicator (SFI)-radio network temporary identifier (SFI-RNTI), interruption RNTI (INT-RNTI), or a commonly-applied RNTI) instead of identification information for a specific terminal (e.g., cell-radio RNTI (C-RNTI)). For example, a CRC value of downlink control information (DCI) included in the DL control channel #3 may be scrambled by an SFI-RNTI, an INT-RNTI, or a common RNTI. In this case, the base station may inform the terminals of a format of some slots using a special format of the DL control channel (e.g., group common PDCCH).

Application of a Conventional UL Carrier or a Supplementary UL Carrier

The DL control channel may include not only resource allocation information of the UL data channel but also information indicating a carrier (e.g., conventional UL carrier or SUL carrier) through which the UL data channel is transmitted. For example, a bitmap indicating UL reference resources belonging to the conventional UL carrier (e.g., a bitmap indicating resources through which the UL data channel is not transmitted) may be transmitted through the DL control channel #1, and a bitmap indicating UL reference resources belonging to the SUL carrier may be transmitted through the DL control channel #2. The carrier through which the DL control channel #1 is transmitted may be different from the carrier through which the DL control channel #2 is transmitted. In this case, the terminal may receive the DL control channel (e.g., DL control channels #1 and #2) for each carrier, and may determine whether to transmit the UL data channel based on the bitmap included in the DL control channel.

Alternatively, the DL control channel may include a bitmap #1 indicating UL reference resources belonging to the conventional UL carrier and a bitmap #2 indicating UL reference resources belonging to the SUL carrier. In this case, the terminal may identify the bitmaps #1 and #2 by receiving one DL control channel, and may determine whether to transmit the UL data channel based on the bitmaps #1 and #2.

The bitmap #1 for the conventional UL carrier and the bitmap #2 for the SUL carrier may be included in one DL control channel #3. Which carrier (e.g., the conventional UL carrier or the SUL carrier) the bitmap included in the DL control channel #3 corresponds to may be indicated by a higher layer signaling. For example, the terminal may know to which carrier the bitmap should be applied at a specific location of the DL control channel #3. Therefore, the base station may transmit the same DL control channel to several terminal(s), and each terminal may decode the bitmap at a specific location in the received DL control channel.

√ UL PI by SFI

Each of symbols constituting a slot may be a DL symbol, a UL symbol, or a flexible symbol (or, unknown symbol). The base station may transmit an SFI indicating a slot format using a higher layer message, a DL control channel, or a MAC CE. For example, the base station may transmit system information or a higher layer message including the SFI. Alternatively, the base station may transmit a DCI including the SFI through a DL control channel. The UE terminal may obtain the SFI by receiving the higher layer message, the DL control channel, or the MAC CE. For example, the terminal may receive the DL control channel in resources (e.g., time and frequency resources) configured by the higher layer signaling of the base station, and may identify the SFI included in the DL control channel.

Referring again to FIG. 9, the base station may transmit the DL control channel #3 including information indicating flexible symbols or DL symbols among the symbols constituting the UL data channel #1 allocated by the DL control channel #1. For example, among the symbols constituting the UL data channel #1, the symbol configured as a UL symbol by the higher layer signaling or the DL control channel #1 may be overridden by the DL control channel #3 to be a flexible symbol or a DL symbol. The terminal may receive the DL control channel #3 from the base station, and identify the flexible symbol or the DL symbol among the symbols constituting the UL data channel #1 based on the information included in the DL control channel #3.

In this case, the terminal may not transmit the UL data channel #1. Alternatively, in the UL data channel #1, the flexible symbol or the DL symbol may not be used for UL transmission. For example, when a CBG is mapped to the UL data channel #1, the terminal may use the remaining symbols excluding the symbols configured as the flexible symbol or the DL symbol by the DL control channel #3 among the symbols constituting the UL data channel #1 to perform UL transmission. Alternatively, when a transport block is mapped to the UL data channel #1, the terminal may not transmit the UL data channel #1.

Since the DL control channel #3 indicates symbols not used for UL transmission within the UL data channel #1, the terminal may not transmit the UL data channel #1 in the entire bandwidth. When some resource blocks in the UL data channel #1 are used for UL transmission and the transmission of the UL data channel #1 is does not interfere with transmission of the UL data channel #2, many resources may be occupied by the method described above.

In one example, information about the SFI and information about an UL PI may be concatenated in one DCI. The base station may indicate information (e.g., an index or a bitmap) indicating a location of the SFI and a location of the UL PI within one DCI to the terminal through a higher layer signaling. The base station may transmit the corresponding DC in one DL control channel, and the terminal(s) receiving the DCI may obtain the necessary information (e.g., SFI and/or UL PI) at a specific location in the DCI. The identification information (e.g., RNTI) for decoding the DCI may be an SFI-RNTI, an INT-RNTI, or another RNTI, and the base station may use a higher layer signaling to transmit the identification information for decoding the DCI to one or more terminals.

√ UL PI by DL PI

Resources constituting a slot may be divided into a plurality of DL reference resources, and time and frequency resources (e.g., DL reference resources) for one or more slots may be indicated by a plurality of bits. A bitmap (e.g., DL PI) comprised of a plurality of bits may be transmitted through a DCI in a specific format. The terminal may receive the DCI through a DL control channel and may not receive a DL control channel or a DL data channel in the DL reference resources indicated by the bitmap included in the DCI. One bit included in the bitmap may indicate whether to receive a DL control channel or a DL data channel in a specific time and frequency resource (e.g., a specific DL reference resource).

UL reference resources may be defined similarly to the DL reference resources. The base station may generate a DCI including a bitmap (e.g., UL PI) indicating whether to transmit a UL control channel or a UL data channel in time and frequency resources (e.g., UL reference resources), and transmit the DCI through a DL control channel. Here, the bitmap may indicate UL reference resources for one or more slots. The terminal may receive the DCI through the DL control channel and may not transmit a UL control channel or a UL data channel in the UL reference resources indicated by the bitmap included in the DCI.

In the proposed method, the DL PI and the UL PI may be included in the same DL control channel (e.g., the same DCI). When the DL PI has bitmaps indicating DL reference resources for 2 slots, a bitmap #1 may indicate DL reference resources for one DL slot, and a bitmap #2 may indicate UL reference resources for one UL slot. In this case, the UL reference resource may be a conventional UL carrier or a SUL carrier. The base station may transmit to the terminal a higher layer message including information indicating whether the UL reference resource is a conventional UL carrier or a SUL carrier. The terminal may receive the higher layer message from the base station, and may determine whether the UL reference resource is a conventional UL carrier or a SUL carrier based on the information included in the higher layer message. Alternatively, the bitmap(s) for DL reference resources and the bitmap(s) for UL reference resources may be concatenated in one DCI. The base station may transmit to the terminal a higher layer message including information indicating location of the bitmap(s) for DL reference resources and location of the bitmap(s) for UL reference resources in the DCI. The terminal may receive the higher layer message from the base station, and may determine the location of the bitmap(s) for DL reference resources and the location of the bitmap(s) for UL reference resources in the DCI. For example, the terminal may identify at which position in the DCI the bitmap for DL reference resources corresponds to the DL carrier, and may identify at which position in the DCI the bitmap for UL reference resources corresponds to the UL carrier (e.g., conventional UL carrier or SUL carrier).

In another proposed method, a DL control channel in which the DL PI is included may be different from a UL control channel in which the UL PI is included. The DL PI may be configured according to the conventional method. The UL PI for the SUL carrier may be generated independently of the UL PI for the conventional UL carrier. In this case, the base station may transmit to the terminal a higher layer message including information necessary for reception of the UL PI for the SUL carrier. The terminal may receive the higher layer message from the base station, and receive the UL PI for the SUL carrier based on the information included in the higher layer message. For example, the terminal may detect the UL PI in a specific search space for the DL control channel. That is, the terminal that knows search spaces may perform blind detection (e.g., blind decoding) based on CCEs.

In the proposed method, identification information for the UL PI may not be separately configured, and the conventional identification information (e.g., INT-RNTI) may be used as the identification information for the UL PI. When a higher layer message including information instructing to detect the UL PI is received from the base station, the terminal may use the identification information configured by the base station to perform a detection operation in the specific search space for the DL control channel in order to obtain the UL PI. When a higher layer message including information instructing to detect the DL PI and the UL PI is received from the base station, the terminal may perform a detection operation by using one identification information in the specific search space for the DL control channel to obtain the DL PI and the UL PI. Here, the DL PI and the UL PI may be included in the same DCI (e.g., DCI having the same format). In this case, the terminal may obtain the DL PI and UL PI using one identification information.

In another proposed method, the identification information for the UL PI may be different from the identification information for the DL PI. The terminal may perform blind detection to obtain the DCI including the UL PI in the search space for the DL control channel, and may perform blind detection to obtain the DCI including the DL PI in the search space for the DL control channel. A format of the DCI including the UL PI may be different from a format of the DCI including the DL PI. Information indicating the size of the UL PI may be transmitted from the base station to the terminal through a higher layer message. The base station may configure candidate(s) of CCE aggregation levels for the DL control channel so that the terminal can decode the DCI. In this case, the number of search spaces may increase. To reduce the reception complexity of the terminal, a method may be needed that does not increase the number and size of search spaces.

In the proposed method, the number of search spaces for the UL PI may be configured to be equal to or less than the preconfigured number of search spaces (e.g., the maximum number of search spaces). For example, the number of search spaces for the UL PI may be one or two. Alternatively, the base station may transmit to the terminal a higher layer message including information indicating the number of search spaces for the UL PI. Alternatively, the terminal may estimate the number of search spaces for the UL PI using parameters configured by a higher layer signaling. The locations of the search spaces for the UL PI may be determined by the CCE aggregation level. The terminal may identify the search spaces for the UL PI based on the methods described above, and obtain the UL PI by performing detection operations in the identified search spaces.

In the proposed method, the search space for the UL PI (e.g., control resource set (CORESET) to which the search space belongs) may be the same as the search space for the DL PI (e.g., CORESET to which the search space belongs). In this case, the number of search spaces in which the terminal performs the detection operation may be reduced.

Figure 10:
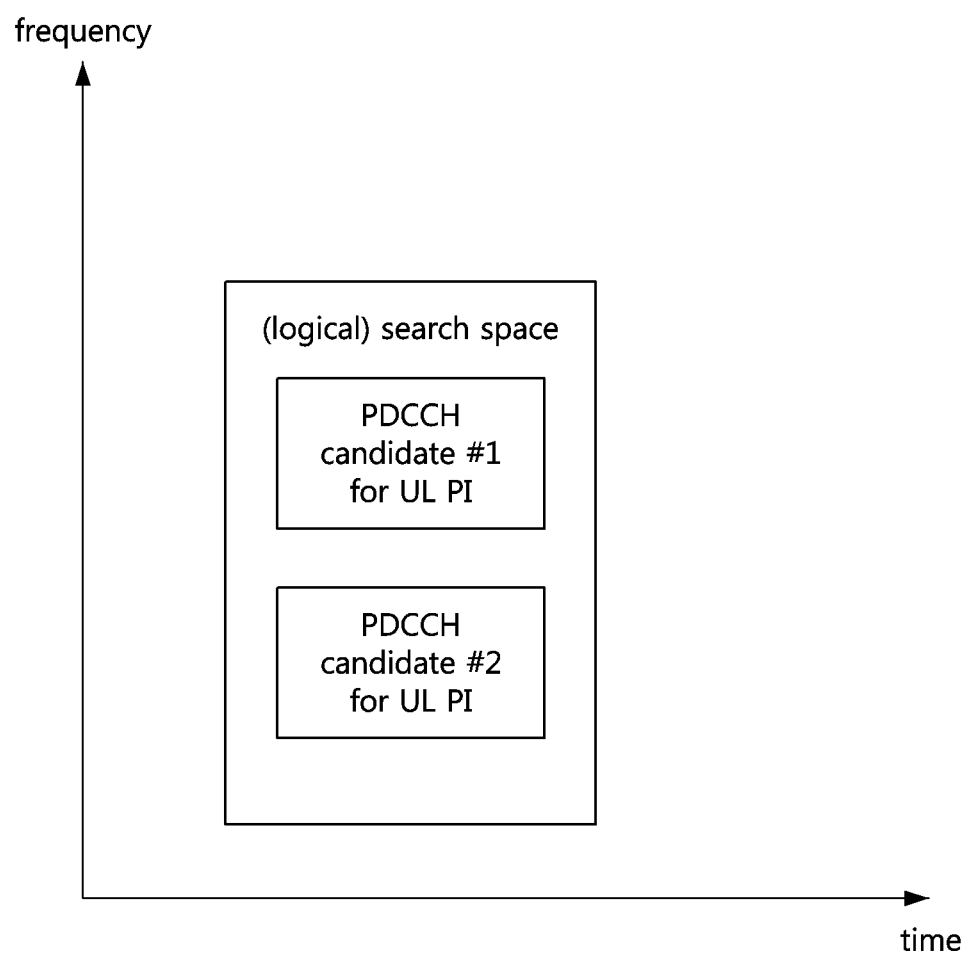
FIG. 10 is a conceptual diagram illustrating a first embodiment of a search space (e.g., logical search space) of a DL control channel in a communication system.
Figure 11:
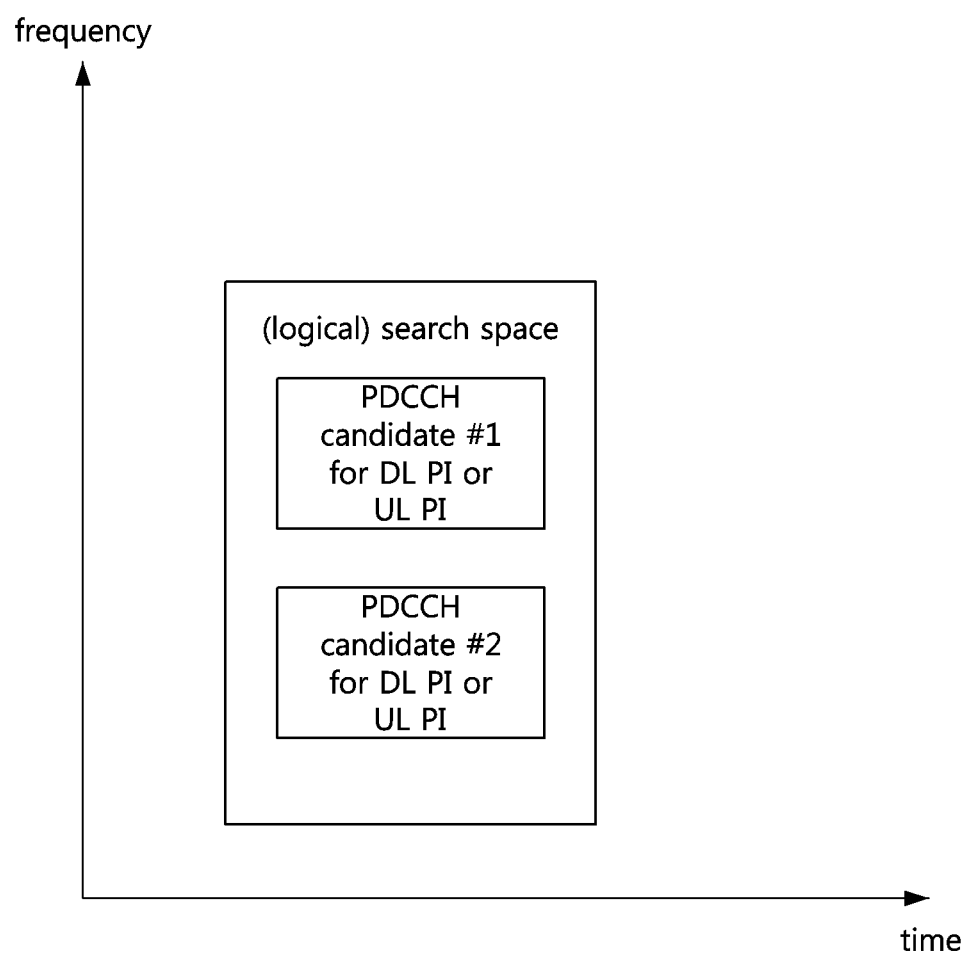
FIG. 11 is a conceptual diagram illustrating a second embodiment of a search space (e.g., logical search space) of a DL control channel in a communication system.

FIG. 10 is a conceptual diagram illustrating a first embodiment of a search space (e.g., logical search space) of a DL control channel in a communication system, and FIG. 11 is a conceptual diagram illustrating a second embodiment of a search space (e.g., logical search space) of a DL control channel in a communication system.

Referring to FIG. 10, when a higher layer message including configuration information for detecting the UL PI is received and a higher layer message including configuration information for detecting the DL PI is not received, the terminal may perform a detection operation for detecting the UL PI. For example, the terminal may perform the detection operation in the PDCCH candidates #1 and #2 included in the search space. That is, a detection operation for obtaining the DL PI may not be performed.

Referring to FIG. 11, a higher layer message including configuration information for detecting the UL PI and the DL PI may be received, and the search space of the UL PI and the search space of the DL PI may belong to the same CORESET. The terminal may obtain the DL PI by performing the detection operation on the PDCCH candidates #1 and #2, and may perform the detection operation on the PDCCH candidate other than the PDCCH candidate from which the DL PI is obtained among the PDCCH candidates #1 and #2. In this case, a separate search space for the UL PI (e.g. CORESET to which the search space belongs) may not be configured. Since the UL PI is transmitted through the PDDCH candidate in which the DL PI is not transmitted, the number of times of performing the blind detection may be reduced.

Bitmap

The UL PI may be configured as a bitmap. Each bit included in the bitmap may indicate a UL reference resource (e.g., time and frequency domain). The UL reference resource may belong to an active bandwidth part (BWP) of the terminal, and may be composed of B resource blocks and T symbols. B and T may be configured by the base station. Each of B and T may be an integer equal to or greater than 1. The DL PI may indicate a DL reference resource according to two schemes (e.g., schemes #1 and #2). The base station may transmit to the terminal a higher layer message including information indicating one of the two schemes. The terminal may receive the higher layer message from the base station, and interpret the DL PI according to the scheme indicated by the higher layer message.

When the higher layer message indicates the scheme #1, the resource blocks constituting the active BWP may be divided into 2 sets, DL symbols belonging to a transmission duration according to a transmission periodicity of the DL PI may be divided into 7 sets, and each set (e.g., 14 sets) may be a DL reference resource. When the higher layer message indicates the scheme #2, the resource blocks constituting the active BWP may belong to one set, DL symbols belonging to a transmission duration according to a transmission periodicity of the DL PI may be divided into 14 sets, and each set (e.g., 14 sets) may be a DL reference resource. One bit included in the bitmap may indicate whether or not data is to be transmitted in the DL reference resource corresponding to the corresponding bit.

The method described above may be suitable for a scenario in which specific DL data is transmitted through resources consisting of a relatively large bandwidth and a relatively small number of symbols. Also, the above-described method may be applied to a scenario in which interference occurs between transmissions of different DL data scheduled by the base station, or a scenario in which a resource allocated for transmission of DL data #1 is reallocated for transmission of DL data #2.

In a proposed method, the UL reference resource may be indicated to the terminal in the same manner as the DL reference resource. Unlike the DL reference resource that represents past resources in the bitmap, the UL reference resource may represent future resources in the bitmap, and the terminal may indicate whether data is to be transmitted or not in the future symbol(s) and frequency resources corresponding to the respective bits in the bitmap.

Further, in a proposed method, the UL reference resource indicated by the UL PI may be composed of a small number of symbols (e.g., short time) and a wide bandwidth. The reason for using such the UL reference resource is that when the terminal transmitting URLLC UL data is located at a place adjacent to the base station, the terminal is able to transmit the URLLC UL data through resources constituted by the short time and the wide bandwidth using a sufficient power. Therefore, the bitmap indicating the UL reference resource to the terminal may have a characteristic similar to the DL PI. That is, for the configuration of the UL reference resource, the active BWP configured for the terminal may be divided into one or two, and the corresponding slot may be divided into one or two symbol units.

Since the UL PI includes a fixed-size bitmap, a product of the number dividing the frequency domain (e.g., active BWP) and the number dividing the time domain (e.g., slots belonging to a period of the UL PI) may be constant. Also, the bitmap included in the UL PI may be applied to one or more slots, and the base station may inform the terminal of the number of slots to which the bitmap included in the UL PI is applied by using a higher layer signaling. The number of slots to which the bitmap is applied may be the same as a monitoring periodicity of the UL PI.

On the other hand, since a resource allocation scheme for UL data may be different from a resource allocation scheme for DL data, the method described above may not be applied to a transmission scenario of UL data. The UL data may be transmitted according to a UL transmission power of the terminal, and a reception quality of the UL data in the base station may be determined according to a UL transmission power. Therefore, for UL transmission satisfying the requirements of low latency and high quality, the base station may allocate resources for the UL data. The terminal may transmit the UL data through a UL data channel, which is composed of a narrow bandwidth and an appropriate number of symbols. Based on this feature, the UL reference resource indicated by the UL PI may be designed.

In a proposed method, the frequency domain of the UL reference resource may be finely divided, and the time domain of the UL reference resource may be roughly divided. In order to represent the time resource of the UL reference resource, the base station may transmit to the terminal a higher layer message including information indicating a detection periodicity (e.g., a transmission periodicity) of the UL PI. For example, the detection periodicity of the UL PI may be one, two, or four slots. The UL symbols belonging to the duration according to the detection periodicity of the UL PI may be divided into A sets. A may be an integer equal to or greater than 1. In order to represent frequency resources of the UL reference resource, an active BWP (e.g., active UL BWP) may be divided into B sets. B may be 7 or 14. B may be greater than A. The UL PI may be a bitmap consisting of A×B bits. Each bit included in the bitmap may indicate whether UL data is transmitted in the UL reference resource corresponding to the bit.

In a proposed method, A×B may be limited to a specific value(s). The base station may transmit a higher layer message including the specific value(s) to the terminal, and the terminal may identify the specific value(s) by receiving the higher layer message from the base station. Alternatively, the specific value(s) may be defined in a technical specification known to the base station and the terminal. For example, A×B may be set to 14. According to this scheme, the size of the UL PI may be configured to be equal to the size of the DL PI. Therefore, the size of the DL control channel searched for the UL PI may be the same as the size of the DL control channel searched for the DL PI. In this case, the reception complexity of the DL control channel in the terminal can be reduced.

Figure 12:
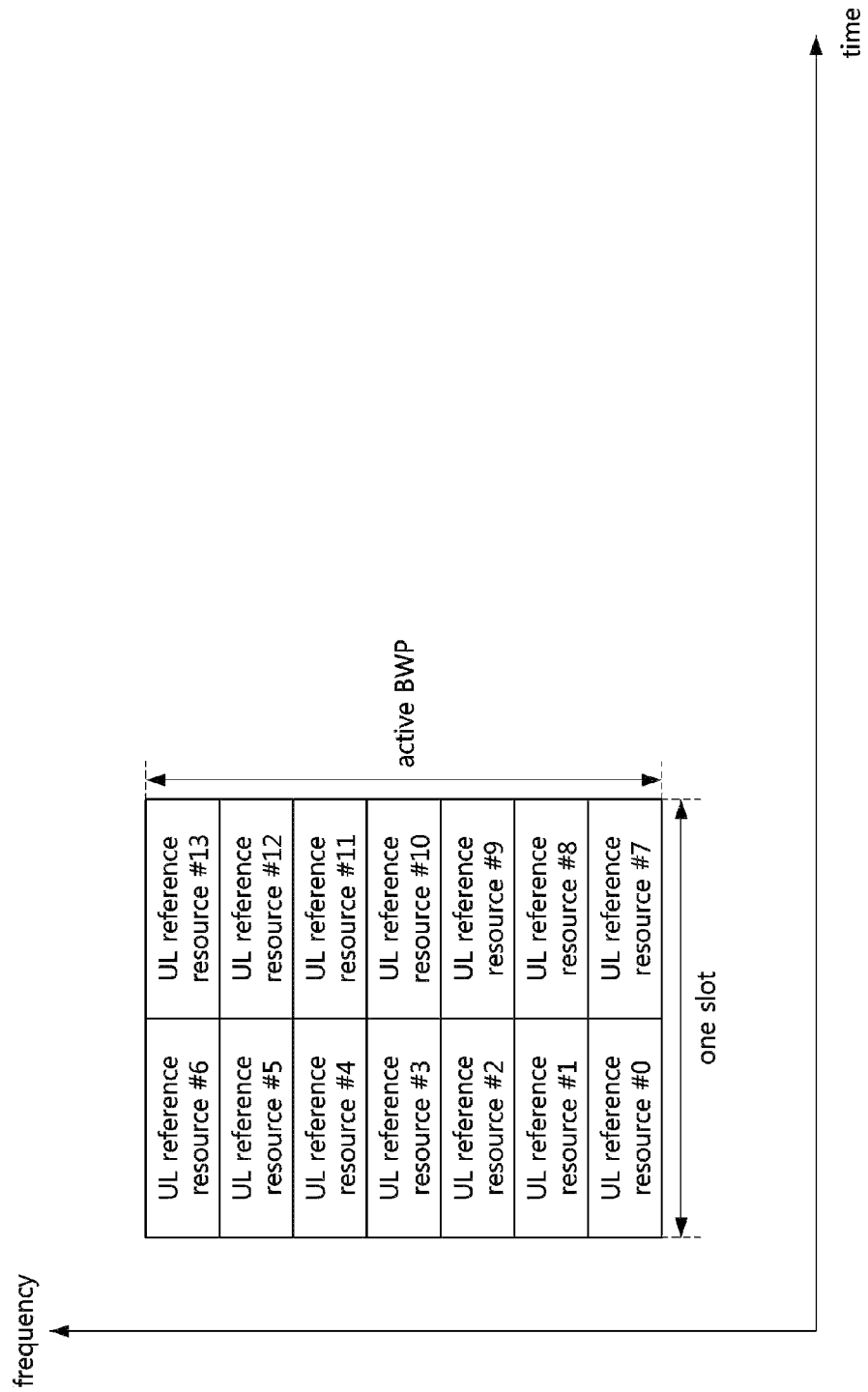
FIG. 12 is a conceptual diagram illustrating a first embodiment of UL reference resources in a communication system.
Figure 13:
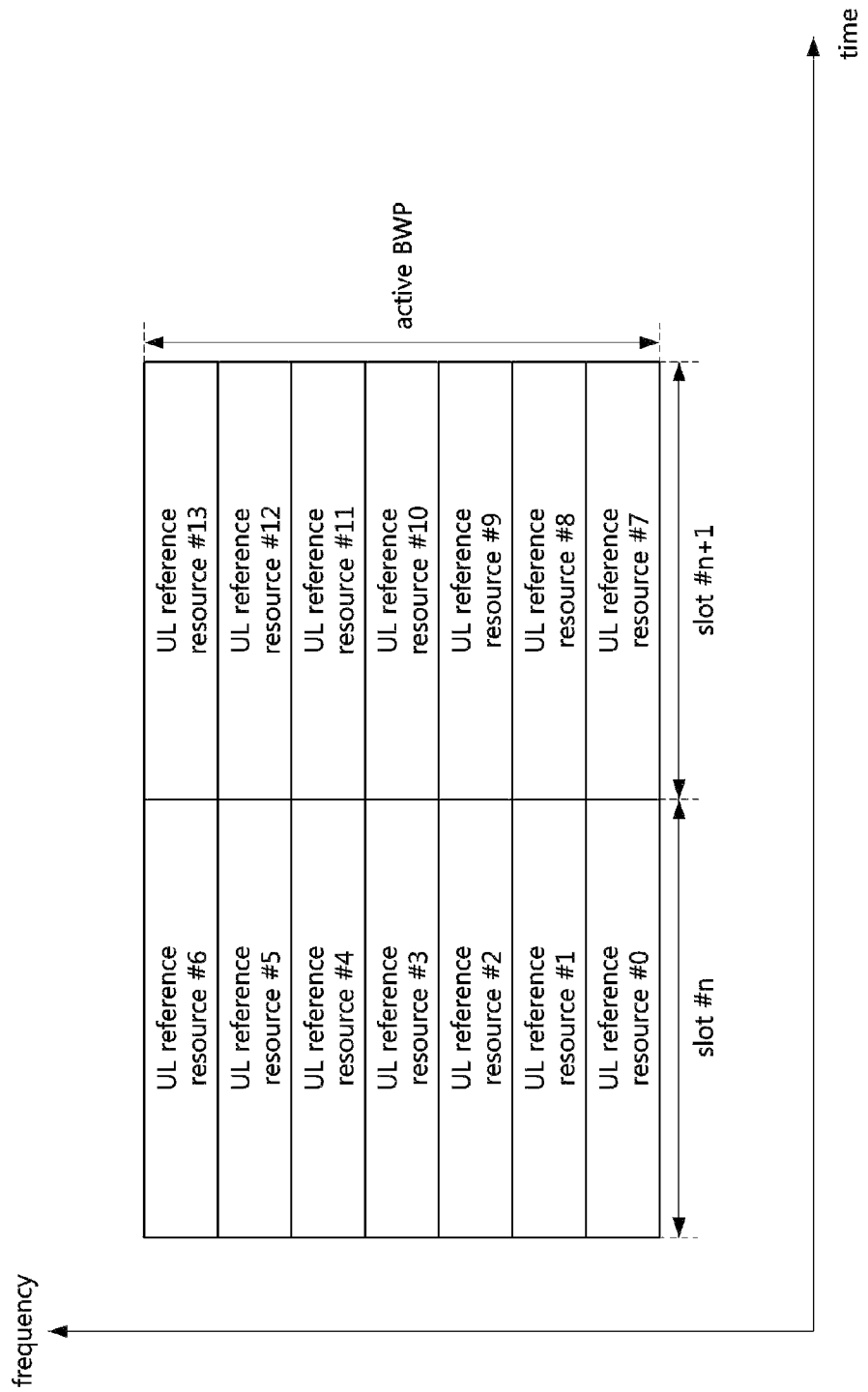
FIG. 13 is a conceptual diagram illustrating a second embodiment of UL reference resources in a communication system.

FIG. 12 is a conceptual diagram illustrating a first embodiment of UL reference resources in a communication system, and FIG. 13 is a conceptual diagram illustrating a second embodiment of UL reference resources in a communication system.

Referring to FIG. 12, the UL PI may indicate UL reference resources that are configured in resources consisting of one slot and an active BWP. Symbols (e.g., 14 symbols) included in one slot may be divided into 2 sets. That is, A may be 2. In this case, one UL reference resource may include 7 symbols. The active BWP may be divided into 7 sets. That is, B may be 7. Therefore, the size of the UL PI may be 14 bits.

Referring to FIG. 13, the UL PI may indicate UL reference resources that are configured in resources consisting of 2 slots and an active BWP. Symbols (e.g., 28 symbols) included in 2 slots may be divided into 2 sets. That is, A may be 2. In this case, one UL reference resource may include 14 symbols. The active BWP may be divided into 7 sets. That is, B may be 7. Therefore, the size of the UL PI may be 14 bits. A×B in the embodiment of FIG. 13 may be kept the same as A×B in the embodiment of FIG. 12. Each of A and B may be adjusted according to the transmission periodicity of the UL PI.

The reception quality of the DL PI may be different from the reception quality of the UL PI. When the DL PI is not received at the terminal, the base station may perform a retransmission operation for the terminal, and accordingly the terminal may decode necessary data. The terminal that has not received the UL PI may transmit an unnecessary UL data channel (e.g., a UL data channel indicated by the UL PI). In this case, the unnecessary UL data channel may cause interference to a UL data channel transmitted by another terminal, so that the base station may not successfully receive the UL data channel. In order to solve such the problem, the aggregation level of the DL control channel including the UL PI may be configured to be different from the aggregation level of the DL control channel including the DL PI.

In a proposed method, the UL PI may be configured to indicate UL reference resources configured in one slot. In this case, the size of the UL PI may be C bits. The terminal may assume that transmission states of the UL reference resources indicated by the UL PI are the same not only in the current slot but also in the slot(s) after the current slot. In order to improve the reception quality, the base station may transmit to the terminal a higher layer message including information instructing repeated transmissions of the UL data channel.

The terminal may receive the higher layer message from the base station, and determine that the repeated transmissions of the UL data channel are requested based on the information included in the higher layer message. In this case, the terminal receiving the UL PI may determine that the UL PI is applied to the slots belonging to the duration according to the transmission periodicity of the UL PI. The size of the UL PI can be reduced since one UL PI can indicate the transmission of the UL data channel in a plurality of slots. However, since the base station should uniformly schedule UL transmissions in the plurality of slots to which the UL PI is applied, the scheduling flexibility for the UL transmission may be reduced.

Figure 14:
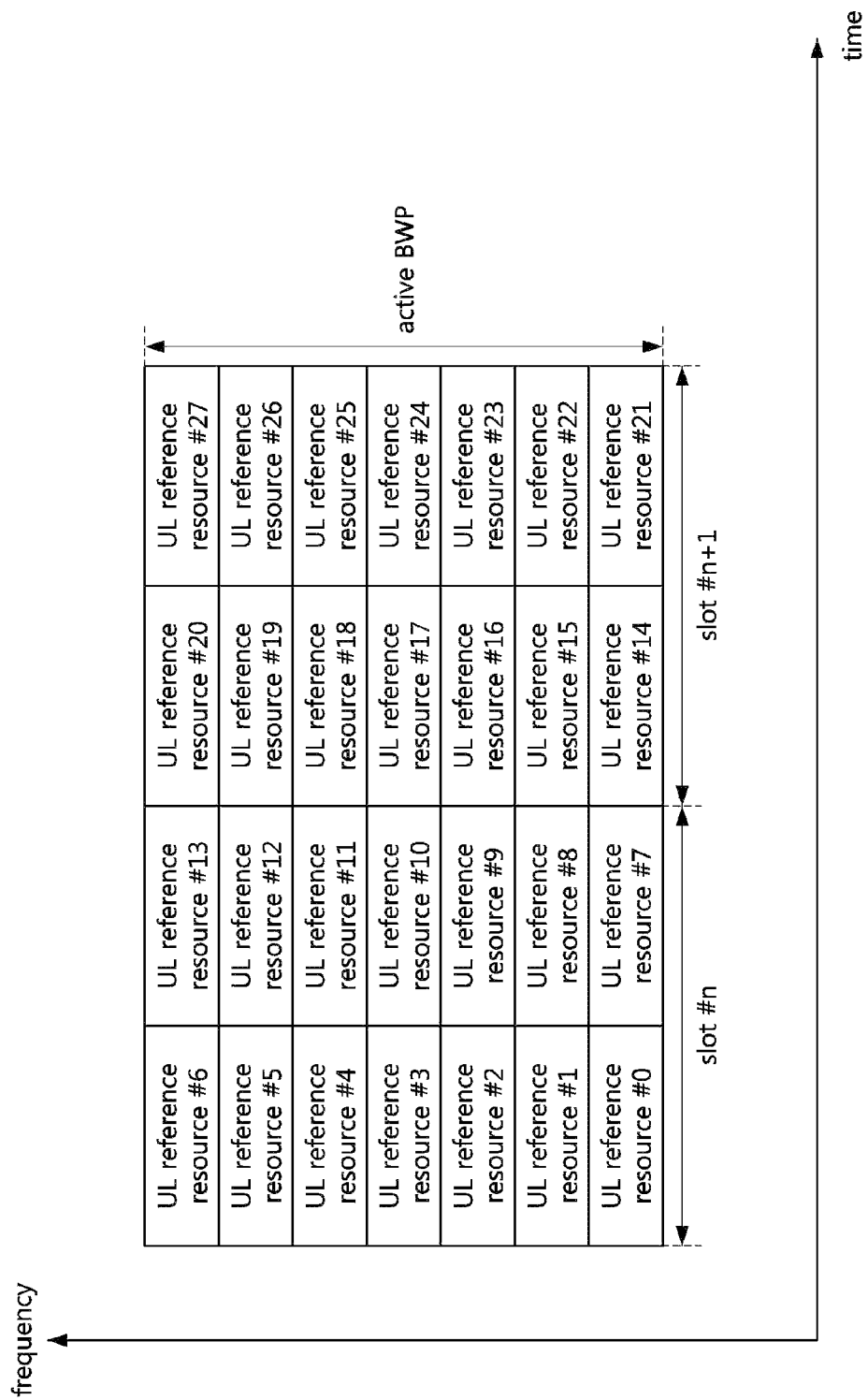
FIG. 14 is a conceptual diagram illustrating a third embodiment of UL reference resources in a communication system.

FIG. 14 is a conceptual diagram illustrating a third embodiment of UL reference resources in a communication system.

Referring to FIG. 14, the UL PI may indicate UL reference resources that are configured in resources consisting of 2 slots and an active BWP. Symbols (e.g., 28 symbols) included in 2 slots may be divided into 4 sets. That is, A may be 4. In this case, one UL reference resource may include 7 symbols. The active BWP may be divided into 7 sets. That is, B may be 7. Therefore, the size of the UL PI may be 28 bits. The size (i.e., 28 bits) of the UL PI in the embodiment of FIG. 14 may be twice the size (i.e., 14 bits) of the UL PI in the embodiment of FIG. 12 or FIG. 13. When one UL PI is applied to 2 consecutive slots, the size of the UL PI may be maintained to be 14 bits.

■ URLLC PUCCH power control method
√ Power Control Method Considering a Payload

Each of the base station and the terminal may determine a transmission power of a UL control channel based on a predetermined rule. The base station may transmit a higher layer message, a DL control channel, or a MAC CE to the terminal, including parameters required to determine the transmission power of the UL control channel. The terminal may identify the parameters required for determining the transmission power of the UL control channel by receiving the higher layer message, the DL control channel, or the MAC CE from the base station. The terminal may derive a part of parameters required for determining the transmission power of the UL control channel based on a signal received from the base station (e.g., synchronization signal/physical broadcast channel (SS/PBCH) block, reference signal (CSI-RS), phase tracking RS (PT-RS), DM-RS, etc.).

Proposed power control methods may be applied to a UL data channel and the transmission power may be adjusted according to the size of a transport block included in the UL data channel. When the UL data channel does not include UL control information, only a function according to the size of the transport block (e.g., UL data) may be used to determine the transmission power. On the other hand, when the UL data channel includes both the UL control information and the transport block, a function according to the size of the UL control information may be used as well as the function according to the size of the transport block to determine the transmission power.

For example, when the UL data channel includes the transport block, the transmission power $P_c(i)$ applied to a resource element corresponding to a carrier #c of a slot #i may be determined based on Equation 2 below.

$$P_c(i) = P_{O,c} + \alpha_c \cdot PL_c + \Gamma_c(i) + 10 \cdot \log_{10}(2^{\mu} \cdot M_c(i)) + f_c(i) \quad \text{[Equation 2]}$$

Here, $\Gamma_c(i)$ may be defined with a function of bits $O_{TB}(i)$ which the transport block has and the size $N_{RE}(i)$ of resource elements mapped to the resource block in the UL data channel. For example, $\Gamma_c(i)$ may be $10 \cdot \log_{10}(2^{\gamma \cdot BPRB(i)} - 1)$. BPRE(i) may be defined as $O_{TB}(i)/N_{RE}(i)$.

Alternatively, a rule of a transmission power for transmitting both the transport block and the UL control information may be expressed by Equation 3 below. In Equation 3, the transmission power applied to the UL data channel in the carrier #c of the slot #i may be defined as $P_c(i)$.

$$P_c(i) = P_{O,c} + \alpha_c \cdot PL_c + \Gamma_c(i) + \Delta_c(i) + 10 \cdot \log_{10}(2^{\mu} \cdot M_c(i)) + f_c(i) \quad \text{[Equation 3]}$$

Here, $\Delta_c(i)$ may be with a function of bits $O_{UCI}(i)$ which the UL control information has and the size $L_{RE}(i)$ of resource elements mapped to the resource block in the UL data channel. For example, $\Delta_c(i)$ may be $10 \cdot \log_{10}(2^{k \cdot BPRE(i)} - 1)$. BPRE(i) may be defined as $O_{UCI}(i)/L_{RE}(i)$.

Alternatively, the base station may not inform the terminal of the transmission power depending on the size of the UL data. For example, the base station may transmit a higher layer message including a constant applied to $\Delta_c(i)$ to the terminal, and the terminal may identify the constant applied to $\Delta_c(i)$ by receiving the higher layer message from the base station. Through the configuration of the constant applied to $\Delta_c(i)$, the size of the UL control information may be configured to be balanced with the size of UL data. In this case, the transmission power applied to the UL data channel may be indicated through a separate configuration variable (e.g., $\delta_C$) as shown in Equation 4 or 5 below.

$\delta_C$ may be set to one of a plurality of values including 0 and 1. The base station may transmit a higher layer message including the value set for $\delta_C$ to the terminal. The terminal may identify the value set for $\delta_C$ by receiving the higher layer message from the base station.

$$P_c(i) = P_{O,c} + \alpha_c \cdot PL_c + \Gamma_c(i) + \delta_C \cdot \Delta_c(i) + 10 \cdot \log_{10}(2^{\mu} \cdot M_c(i)) + f_c(i) \quad \text{[Equation 4]}$$

$$P_c(i) = P_{O,c} + \alpha_c \cdot PL_c + \delta_C \cdot \Gamma_c(i) + \Delta_c(i) + 10 \cdot \log_{10}(2^{\mu} \cdot M_c(i)) + f_c(i) \quad \text{[Equation 5]}$$

The terminal may report a power headroom PH to the base station. For example, the terminal may periodically report PH to the base station. Alternatively, when a message requesting to report PH is received from the base station, the terminal may report PH to the base station. Alternatively, the terminal may transmit PH to the base station together with the data. The UE terminal may derive PH considering the size of the transport block, and transmit to the base station PH to which a separate type is applied according to a higher layer signaling of the base station.

■ URLLC UCI Transmission Through On-Going PUCCH
√ PUCCH Format 3/4 for Additional UCI (e.g., URLLC UCI Having a Size of 1 or 2 Bits)

For transmission of DL data (e.g., eMBB data and URLLC data) having different latency requirements, even after UL control information is coded, the terminal may further transmit other UL control information (e.g., URLLC UCI) using a UL control channel to which the coded UL control information (e.g., eMBB UCI) is mapped.

Figure 15:
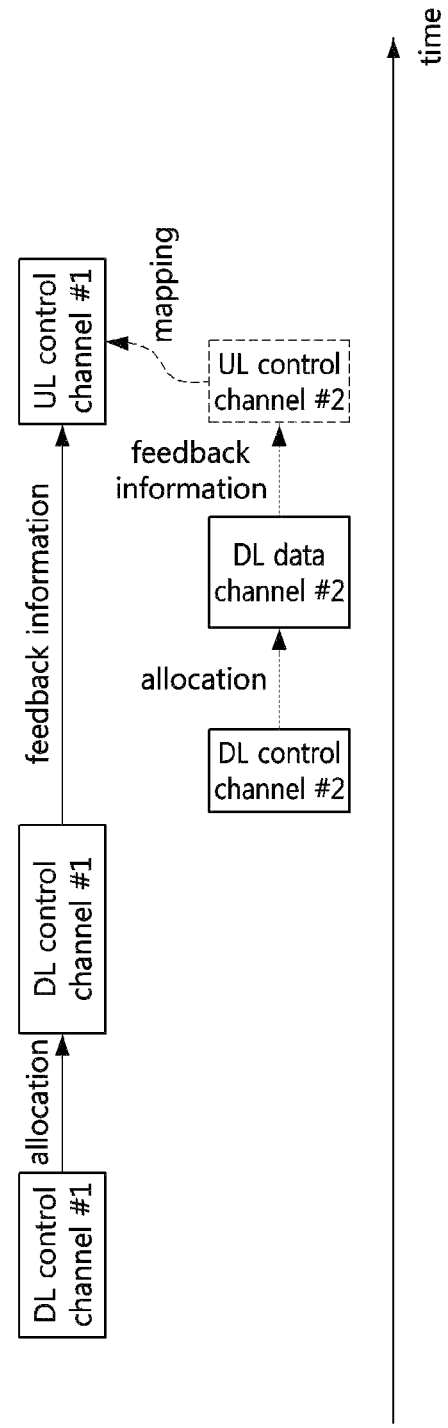
FIG. 15 is a conceptual diagram illustrating an eighth embodiment of a UL transmission method in a communication system.

FIG. 15 is a conceptual diagram illustrating an eighth embodiment of a UL transmission method in a communication system.

Referring to FIG. 15, the base station may transmit a DL control channel #1 including resource allocation information of a DL data channel #1 to the terminal, and an HARQ response (e.g., HARQ-ACK) for the DL data channel #1 may be transmitted from the terminal to the base station through a UL control channel #1 (e.g., UL control channel #1 indicated by DL control channel #1). Also, the base station may transmit a DL control channel #2 including resource allocation information of a DL data channel #2 to the terminal, and an HARQ response for the DL data channel #2 may be transmitted from the terminal to the base station through a UL control channel #2 (e.g., UL control channel #2 indicated by DL control channel #2).

Here, an interval (e.g., transmission latency) between a reception time point of the DL data channel #1 and a transmission time point of the UL control channel #1 may be larger than an interval between a reception time point of the DL data channel #2 and a transmission time point of the UL control channel #2.

The terminal may obtain the resource allocation information for the UL control channel #2 from the DL control channel #2 received later among the DL control channels #1 and #2. The terminal may transmit the UL control channel #2 including UL control information (e.g., HARQ response) for the DL data channel #1 and UL control information (e.g., HARQ response) for the DL data channel #2. However, the above method may be difficult to apply when the interval between the reception time point of the DL data channel #2 and the transmission time point of the UL control channel #2 is very small. This is because the terminal performs the following operations in order to transmit the UL control channel #2, thereby increasing the processing time in the terminal.

Operation for demodulating and decoding the DL data channel #2

Operation for generating HARQ response for the DL data channel #2

Operation for coding the HARQ response for the DL data channel #2 together with the HARQ response for the DL data channel #1

Operation for mapping the coded HARQ response to the UL control channel #2

In a proposed method, the HARQ response for the DL data channel #2 may be transmitted through the UL control channel #2, and the UL control channel #1 to which the HARQ response for the DL data channel #1 is mapped may not be transmitted. The base station may instruct the terminal to perform a separate signaling to receive the HARQ response for the DL data channel #1.

In another proposed method, the HARQ response for the DL data channel #2 and the HARQ response for the DL data channel #1 may be transmitted through the UL control channel #1 instead of the UL control channel #2. In this case, the HARQ response for the DL data channel #2 may be transmitted quickly. For example, in the NR communications system, a format of the UL control channel #1 (e.g., PUCCH format) may be one of 1 to 4, and the UL control channel #1 may include the HARQ response for the DL data channel #2.

In order to transmit the HARQ response for the DL data channel #2 through the UL control channel #1, an operation considering UL control information #2 (e.g., HARQ response for the DL data channel #2) in the coding and mapping procedure of UL control information #1 (e.g., HARQ response for the DL data channel #1) may be required. When the maximum size of the UL control information #2 is limited to a specific value, the terminal may estimate the number of symbols to which the encoded UL control information #2 is mapped. In this case, the terminal may identify a modulation rate and/or a coding rate of the UL control information #2 based on a variable configured by a higher layer signaling of the base station or a variable defined in a technical specification known to the terminal.

The base station may transmit a higher layer message including information indicating a modulation rate and/or a coding rate of the UL control information #1 to the terminal. The terminal may identify the modulation rate and/or the coding rate of the UL control information #1 by receiving the higher layer message from the base station. For example, the modulation rate and/or the coding rate of the UL control information #2 may be configured regardless of the modulation rate and/or the coding rate of the UL control information #1. Alternatively, the modulation rate and/or the coding rate of the UL control information #2 may be configured to a value relative to the modulation rate and/or the coding rate of the UL control information #1.

In a proposed method, the terminal may substitute a part of the UL Control information #1 (e.g., HARQ response and/or channel state information part 1) with the UL control information #2. For example, the terminal may map the UL control information #2 to the UL control channel #1 based on a puncturing scheme.

When the UL control information #1 includes the HARQ response, the terminal may map the coded HARQ response for the DL data channel #1 to the UL control channel #1 regardless of the presence of the UL control information #2. When the UL control information #1 includes the channel state information part, the terminal may separately encode the channel state information part 1 (e.g., CSI part 1) and channel state information part 2 (e.g., CSI part 2). When the UL control information #1 includes the HARQ response and the channel state information part, the terminal may encode the HARQ response and the channel state information part 1 together, and independently encode the channel state information part 2.

In a proposed method, a part of the UL control information #1 may not be transmitted. A part of the UL control information #1 that is not transmitted may be control information with relatively low importance. For example, when the UL control information #1 includes the HARQ response, the channel state information part 1, and the channel state information part 2, some or all of the channel state information part 2 may not be transmitted.

In a proposed method, the terminal may transmit UL control information #1 including the HARQ response, the channel state information part 1, and the channel state information part 2. In this case, the terminal may not map the UL control information #2 to resource elements to which the HARQ response and the channel state information part are mapped among resource elements constituting the UL control channel #1.

In order to know the size of the channel state information part 2 belonging to the UL control information #1, the base station may decode the channel state information part 1 belonging to the UL control information #1. The position of the resource elements (e.g., starting resource element) to which the channel state information part 2 is first mapped may not be fixed.

In order for the base station to obtain the UL control information #2 from the UL control channel #1, it may be preferable that the base station knows the position of the UL control information #1 and the position of the UL control information #2 in the UL control channel #1. In this case, the reception complexity of the UL control channel #1 may be reduced at the base station.

In a proposed method, the terminal may determine the position (e.g., mapping position) of the UL control information #2 regardless of presence or absence of the channel state information part 2 in the UL control information #1. The terminal may change the position of the resource elements to which the UL control information #1 is first mapped in the UL control channel #1, and may map the encoded UL control information #1 to the changed resource elements.

The UL control information #2 may be coded to be mapped to a specific number of resource elements. The terminal may map the encoded UL control information #2 to preconfigured resource elements (e.g., remappable resource elements) among the resource elements constituting the UL control channel #1. Since the base station and the terminal know the preconfigured resource elements (e.g., remappable resource elements), the encoded UL control information #2 may be mapped to resource elements configured between the base station and the terminal.

Figure 16:
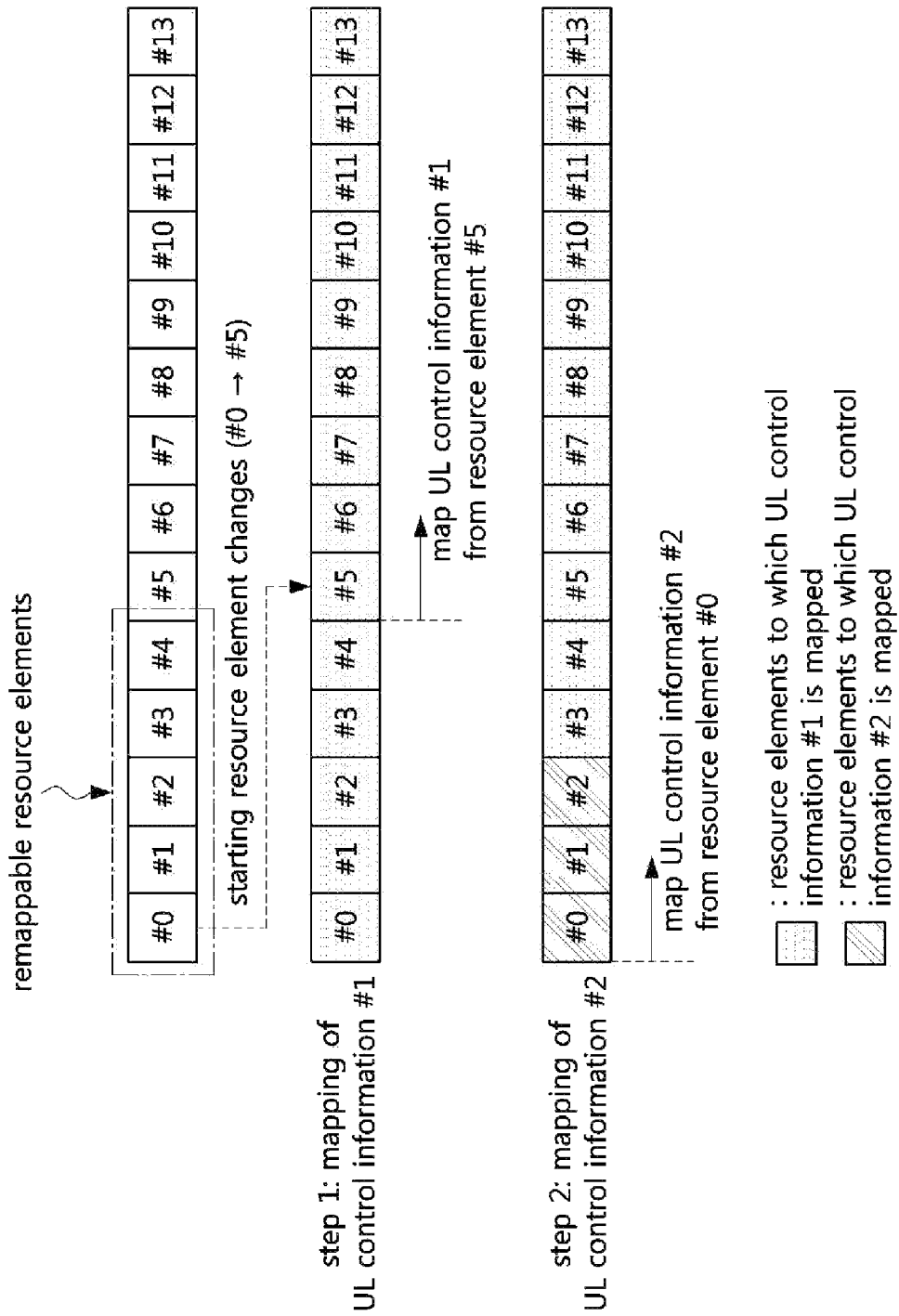
FIG. 16 is a conceptual diagram illustrating a first embodiment of a method of mapping UL control information in a communication system.

FIG. 16 is a conceptual diagram illustrating a first embodiment of a method of mapping UL control information in a communication system.

Referring to FIG. 16, the terminal may map UL control information to remaining resource elements (e.g., 14 resource elements) excluding resource elements to which reference signals are mapped among resource elements constituting a UL control channel (e.g., UL control channel #1 shown in FIG. 15). The UL control information may be mapped according to the index order of the resource elements. For example, the resource element to which the UL control information is first mapped may be a resource element #0. That is, the resource element #0 may be a starting resource element to which the UL control information is mapped.

When the number of remappable resource elements is 5, the terminal may change the starting resource element to which the UL control information #1 is mapped from the resource element #0 to a resource element #5, and the UL control information #1 may be mapped to from the resource element #5. After the mapping of the UL control information #1 to the resource elements #5 to #13 is completed, the remaining UL control information #1 may be mapped to from the resource element #0.

When UL control information #2 to be mapped to the UL control channel #1 exists, the terminal may map the UL control information #2 from the resource element #0. In this case, the UL control information #2 may be mapped to the UL control channel #1 instead of the UL control information #1. Here, the UL control information #2 may be continuously mapped to the remappable resource elements. Alternatively, the UL control information #2 may be mapped to the remappable resource elements according to a preconfigured interval.

PUCCH Format 3

When PUCCH format 3 is used, the terminal may map the UL control information #1 and #2 to the UL control channel #1 as follows. Here, the UL control information #1 may be the UL control information #1 described with reference to FIG. 15, the UL control information #2 may be the UL control information #2 described with reference to FIG. 15, and the UL control channel #1 may be the UL control channel #1 shown in FIG. 15.

Figure 17:
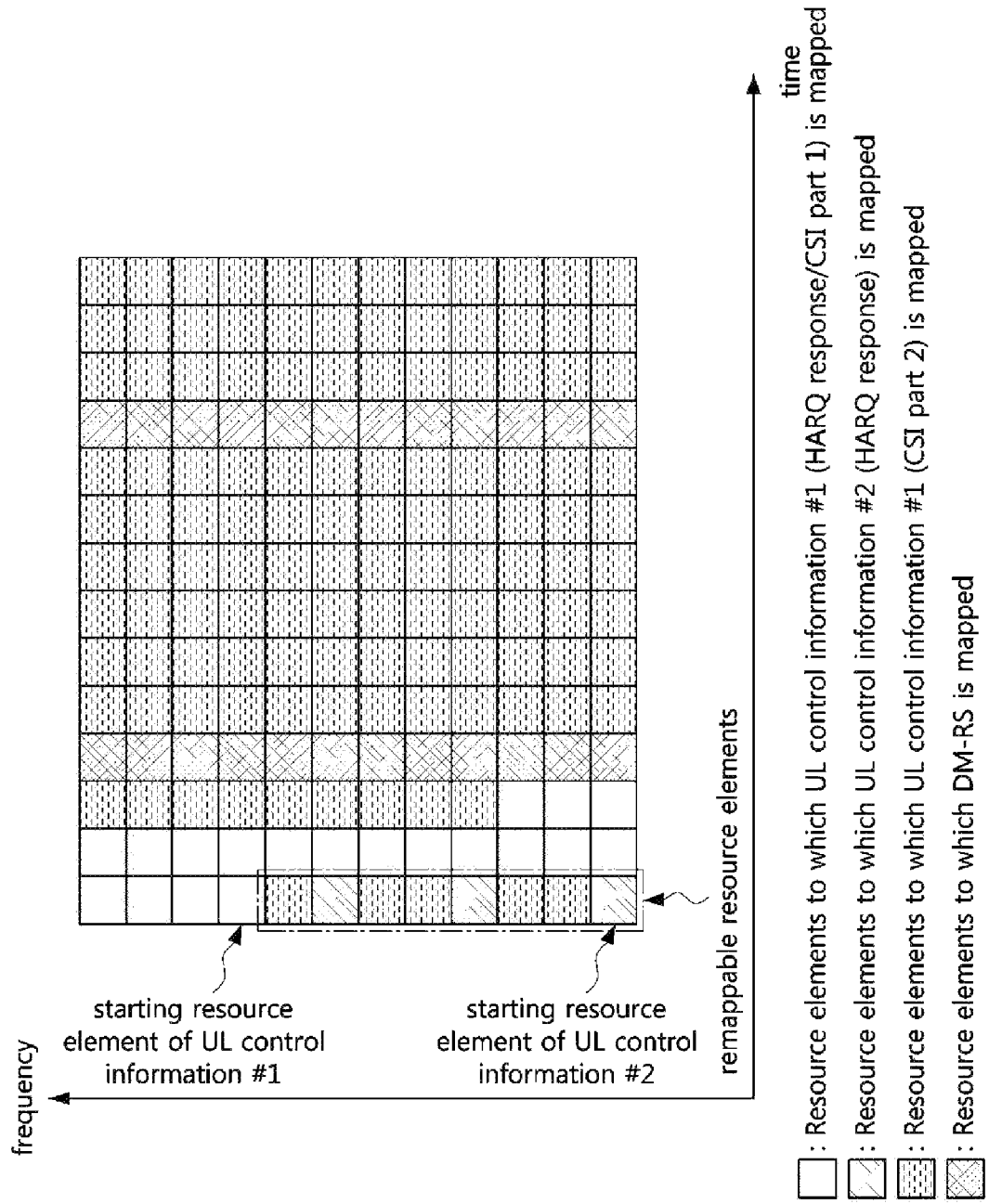
FIG. 17 is a conceptual diagram illustrating a second embodiment of a method of mapping UL control information in a communication system.

FIG. 17 is a conceptual diagram illustrating a second embodiment of a method of mapping UL control information in a communication system.

Referring to FIG. 17, a mapping scheme of the UL control information #1 including an HARQ response may be different from a mapping scheme of the UL control information #1 including an HARQ response and channel information. The embodiment shown in FIG. 17 may be applied not only to a scenario supporting frequency hopping but also a scenario not supporting frequency hopping.

Since the channel information is periodically transmitted or transmitted at the request of the base station, the terminal may know a slot to which the channel information is mapped. The embodiment shown in FIG. 17 may be applied to a slot used for transmission of channel information. On the other hand, the embodiment shown in FIG. 17 may not be applied to a slot not used for transmission of channel information. Alternatively, the embodiment shown in FIG. 17 may be applied not only to a slot used for transmission of channel information but also to a slot not used for transmission of channel information.

When the UL control information #1 and #2 are transmitted through the UL control channel #1, the terminal may first map the UL control information #1 to the UL control channel #1. If the number of remappable resource elements (e.g., resource elements #0 to #7) in the UL control channel #1 is 8, the terminal may map the UL control information #1 from the resource element #8 of the first symbol. That is, the starting resource element of the UL control information #1 may be the resource element #8 of the first symbol. When the UL control information #1 includes the HARQ response and the channel state information part (e.g., the CSI parts 1 and 2), the terminal may encode the CSI part 1 together with the HARQ response, and may map the encoded HARQ response and CSI part 1 from the resource element #8 of the first symbol. After the mapping of the encoded HARQ response and CSI part 1 is completed, the terminal may map the encoded CSI part 2 to the remaining resource elements. In this case, the encoded CSI part 2 may also be mapped to the remappable resource elements (e.g., resource elements #0 to #7).

When the mapping of the UL control information #1 is completed, the terminal may map the UL control information #2 (e.g., HARQ response) to the UL control channel #1. The starting resource element of the UL control information #2 may be the resource element #0 of the first symbol. Therefore, the terminal may map the UL control information #2 to the resource elements #0, #3, and #6 of the first symbol. In this case, the UL control information #2 may be mapped to the resource elements #0, #3, and #6 of the first symbol instead of the UL control information #1 (e.g., CSI part 2).

PUCCH Format 4

When PUCCH format 4 is used, the terminal may map the UL control information #1 and #2 to the UL control channel #1 as follows. Here, the UL control information #1 may be the UL control information #1 described with reference to FIG. 15, the UL control information #2 may be the UL control information #2 described with reference to FIG. 15, and the UL control channel #1 may be the UL control channel #1 shown in FIG. 15.

Figure 18:
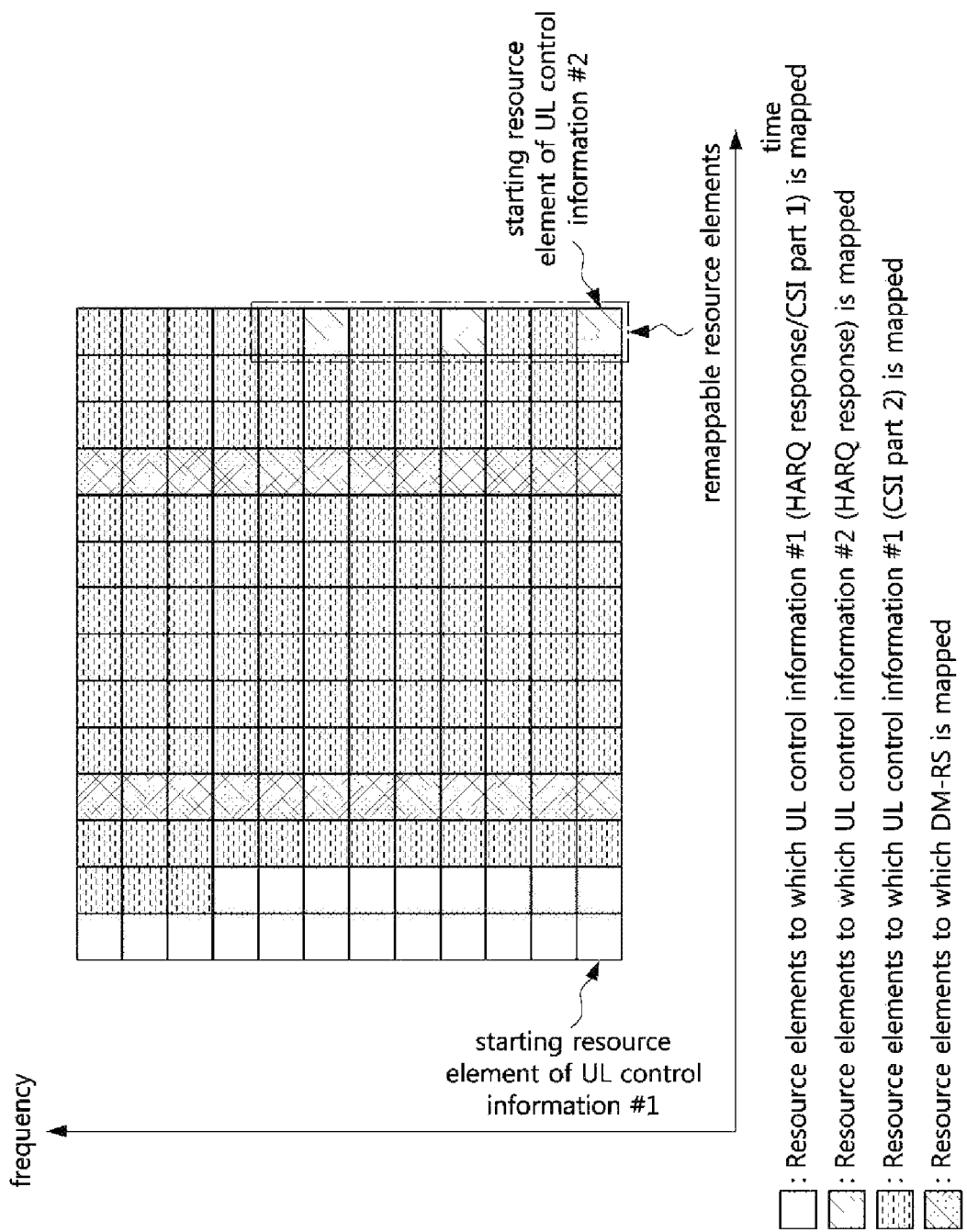
FIG. 18 is a conceptual diagram illustrating a third embodiment of a method of mapping UL control information in a communication system.

FIG. 18 is a conceptual diagram illustrating a third embodiment of a method of mapping UL control information in a communication system.

Referring to FIG. 18, the resource elements (e.g., remappable resource elements) to which the UL control information #2 is mapped may be located in the rear region of the UL control channel. The embodiment shown in FIG. 18 may be applied not only to a scenario in which a frequency hopping scheme is used but also to a scenario in which a frequency hopping scheme is not used. When the UL control channel #1 is transmitted based on the frequency hopping scheme, the terminal may map the UL control information #2 to the last symbol in the UL control channel #1 corresponding to the first frequency hop. Some of the resource elements to which the UL control information #1 is mapped may be used for transmission of the UL control information #2. According to the proposed method, the reception of the UL control information #2 at the base station may be delayed. However, the terminal may map the UL control information #1 to the UL control channel #1 regardless of the size of the UL control information #2, and the mapping order of the UL control information #1 may not be changed.

For example, the terminal may first map the UL control information #1 to the UL control channel #1. Since there are remappable resource elements in the last symbol in the UL control channel #1, the terminal may map the UL control information #1 from the first symbol in the UL control channel #1 without changing the mapping order of the UL control information #1. That is, the starting resource element of the UL control information #1 may be the resource element #0 of the first symbol. When the UL control information #1 includes the HARQ response and the channel state information part (e.g., the CSI parts 1 and 2), the terminal may encode the CSI part 1 together with the HARQ response, and may map the encoded HARQ response and CSI part 1 from the resource element #0 of the first symbol. After the mapping of the encoded HARQ response and CSI part 1 is completed, the terminal may map the encoded CSI part 2 to the remaining resource elements. In this case, the encoded CSI part 2 may also be mapped to the remappable resource elements.

When the mapping of the UL control information #1 is completed, the terminal may map the UL control information #2 (e.g., HARQ response) to the remapping resource elements located in the last symbol in UL control channel #1. In this case, the UL control information #2 instead of some (e.g., CSI part 2) of the UL control information #1 may be remapped to the remappable resource elements.

Meanwhile, the terminal may map the UL control information to the UL control channel based on a spreading code scheme. When PUCCH format 3 or 4 is used, the remappable resource elements may be configured in units of an application unit of spreading code. Before applying the spreading code, the terminal may replace the coded UL control information #1 with the coded UL control information #2, and may map the coded UL control information #1 and #2 to the UL control channel #1 by using a spreading code. Alternatively, the terminal may map the coded UL control information #1 to the UL control channel #1 using a spreading code, and then map the coded UL control information #2 to the UL control channel #1 using a spreading code. In this case, the UL control information #2 may be remapped to some of the remappable resource elements instead of the UL control information #1.

The embodiments shown in FIGS. 19 and 20 below may show a method of mapping UL control information based on a spreading code scheme. The embodiments shown in FIGS. 19 and 20 may be applied not only to a scenario in which frequency hopping is applied but also to a scenario in which frequency hopping is not applied. In the embodiments shown in FIGS. 19 and 20, PUCCH format 4 may be used. Here, the UL control information #1 may be the UL control information #1 described with reference to FIG. 15, the UL control information #2 may be the UL control information #2 described with reference to FIG. 15, and the UL control channel #1 may be the UL control channel #1 shown in FIG. 15.

Figure 19:
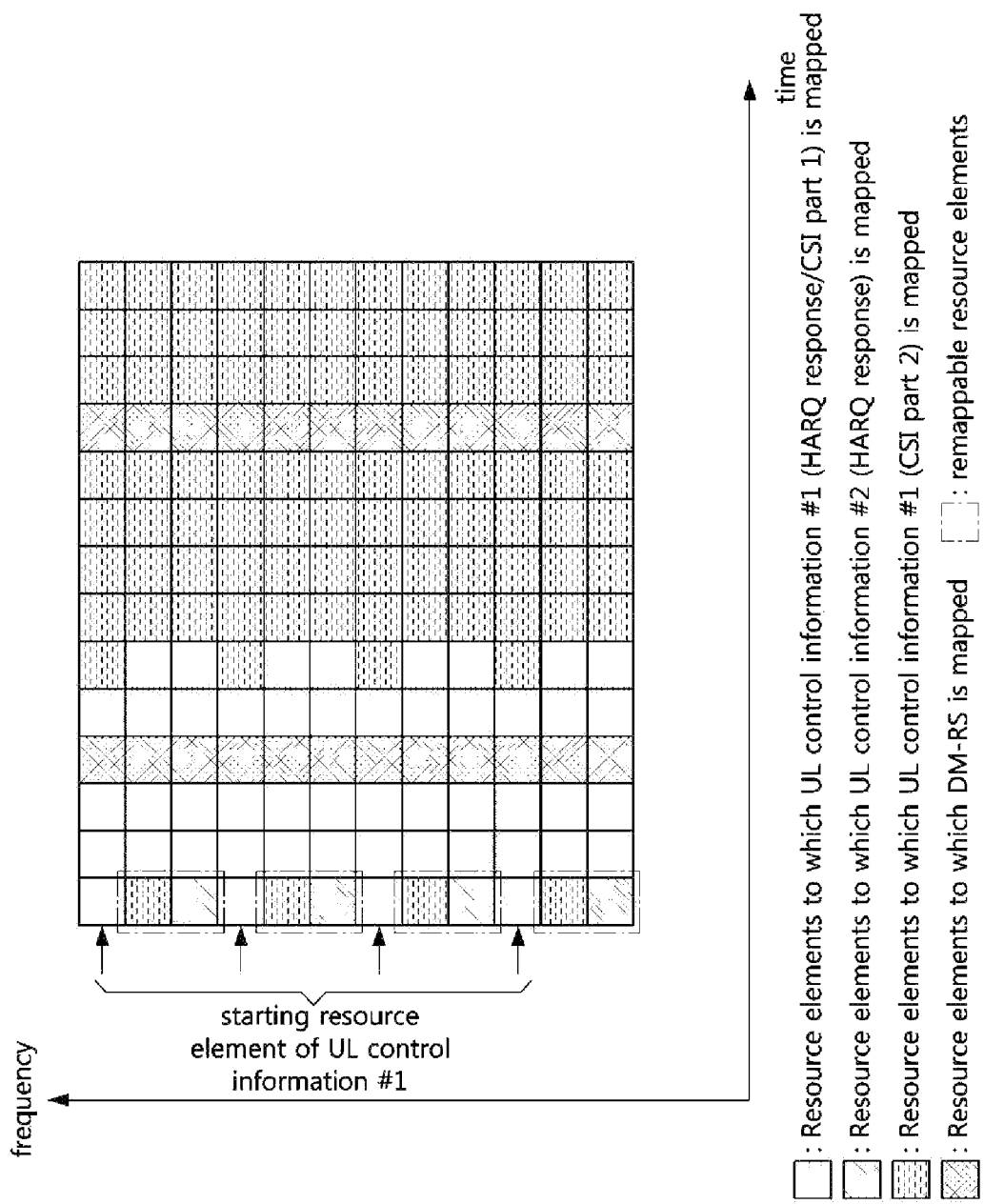
FIG. 19 is a conceptual diagram illustrating a fourth embodiment of a method of mapping UL control information in a communication system.

FIG. 19 is a conceptual diagram illustrating a fourth embodiment of a method of mapping UL control information in a communication system.

Referring to FIG. 19, remappable resource elements may be located in the first symbol of UL control channel #1. 2 remappable resource elements may be located consecutively in the frequency axis. The terminal may perform an encoding operation on the CSI part 1 and the HARQ response constituting the UL control information #1, and may map the coded HARQ response and CSI part 1 to remaining resource elements excluding the remappable resource elements among resource elements located in the first symbol of the UL control channel #1. The coded HARQ response and CSI part 1 may be mapped to the UL control channel #1 based on the spreading code scheme.

Also, the terminal may perform a coding operation on the CSI part 2 constituting the UL control information #1, and after the mapping of the coded HARQ response and CSI part 1 is completed, the terminal may map the coded CSI part 2 to the UL control channel #1. The coded CSI part 2 may be mapped to the UL control channel #1 based on the spreading code scheme and may also be mapped to the remappable resource elements.

After the mapping operation of the UL control information #1 is completed, the terminal may map the coded UL control information #2 to the remappable resource elements in the UL control channel #1. The coded UL control information #2 may be mapped to the UL control channel #1 based on the spreading code scheme. In this case, the UL control information #2 may be remapped to some of the remappable resource elements instead of the UL control information #1.

The mapping scheme of the UL control information #1 including the HARQ response may be different from the mapping scheme of the UL control information #1 including the HARQ response and the channel information. Since the channel information is periodically transmitted or transmitted at the request of the base station, the terminal may know a slot to which the channel information is mapped. The embodiment shown in FIG. 19 may be applied to a slot used for transmission of channel information. On the other hand, the embodiment shown in FIG. 19 may not be applied to a slot not used for transmission of channel information. Alternatively, the embodiment shown in FIG. 19 may be applied not only to a slot used for transmission of channel information but also to a slot not used for transmission of channel information.

Figure 20:
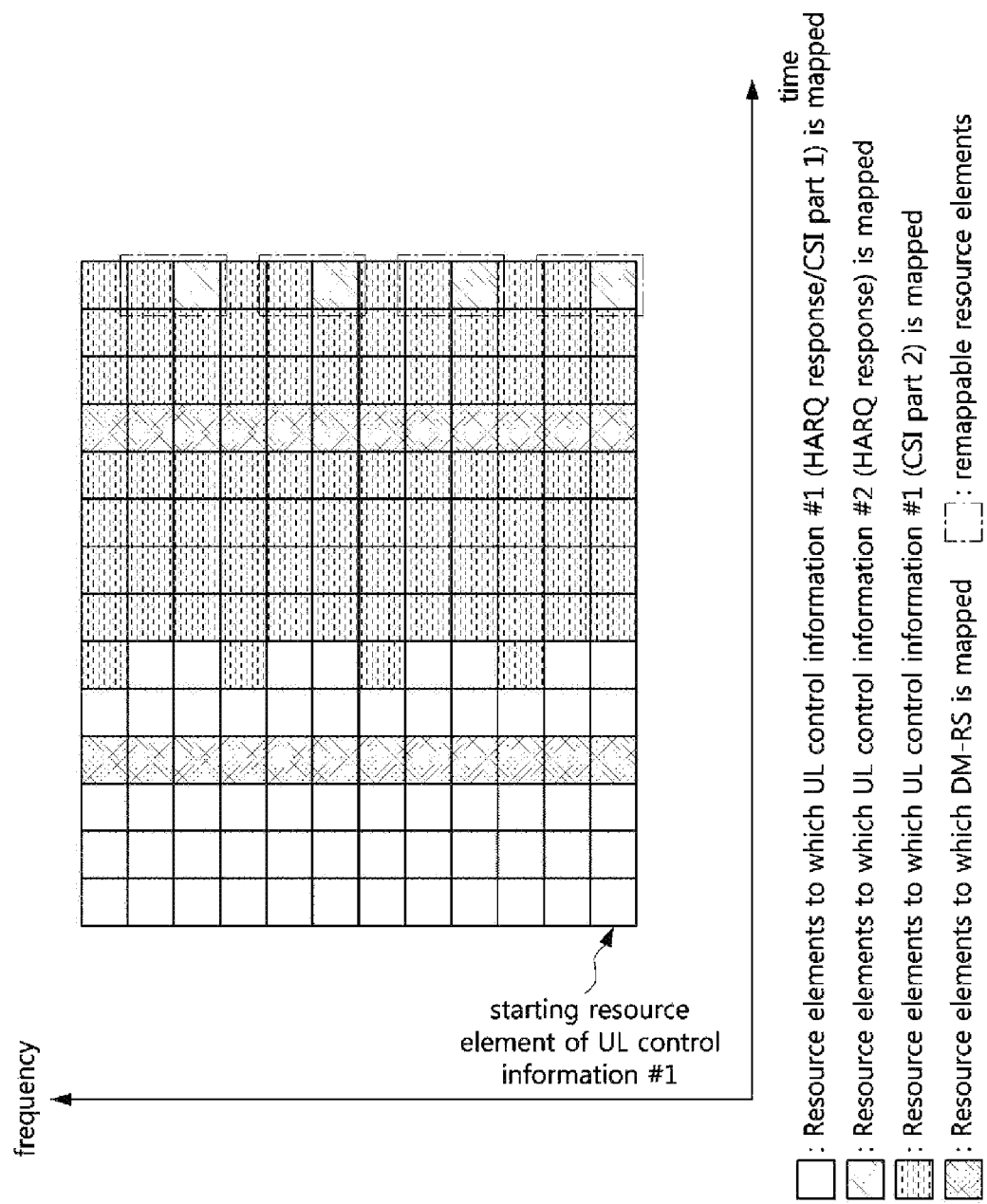
FIG. 20 is a conceptual diagram illustrating a fifth embodiment of a method of mapping UL control information in a communication system.

FIG. 20 is a conceptual diagram illustrating a fifth embodiment of a method of mapping UL control information in a communication system.

Referring to FIG. 20, remappable resource elements may be located in the last symbol of UL control channel #1. 2 remappable resource elements may be located consecutively in the frequency axis. The terminal may perform a coding operation on the CSI part 1 and the HARQ response constituting the UL control information #1, and may map the coded HARQ response and CSI part 1 from the first symbol of the UL control channel #1. The coded HARQ response and CSI part 1 may be mapped to the UL control channel #1 based on the spreading code scheme. The starting resource element of the coded HARQ response and CSI part 1 may be the resource element #0 in the first symbol in UL control channel #1. The mapping order of the coded HARQ response and CSI part 1 may not be changed.

Also, the terminal may perform a coding operation on the CSI part 2 constituting the UL control information #1, and after the mapping of the coded HARQ response and CSI part 1 is completed, the terminal may map the coded CSI part 2 to the UL control channel #1. The coded CSI part 2 may be mapped to the UL control channel #1 based on the spreading code scheme and may also be mapped to the remappable resource elements.

After the mapping operation of the UL control information #1 is completed, the terminal may map the coded UL control information #2 to the remappable resource elements in the UL control channel #1. The coded UL control information #2 may be mapped to the UL control channel #1 based on the spreading code scheme. In this case, the UL control information #2 may be remapped to some of the remappable resource elements instead of the UL control information #1.

■ UL Grant after DL Resource Allocation

The base station may transmit a UL grant after transmitting resource allocation information for a DL data channel. In this case, an HARQ response for the DL data channel may be transmitted through a UL data channel indicated by the UL grant. For example, UL transmission may be performed according to the embodiment shown in FIG. 21 below.

Figure 21:
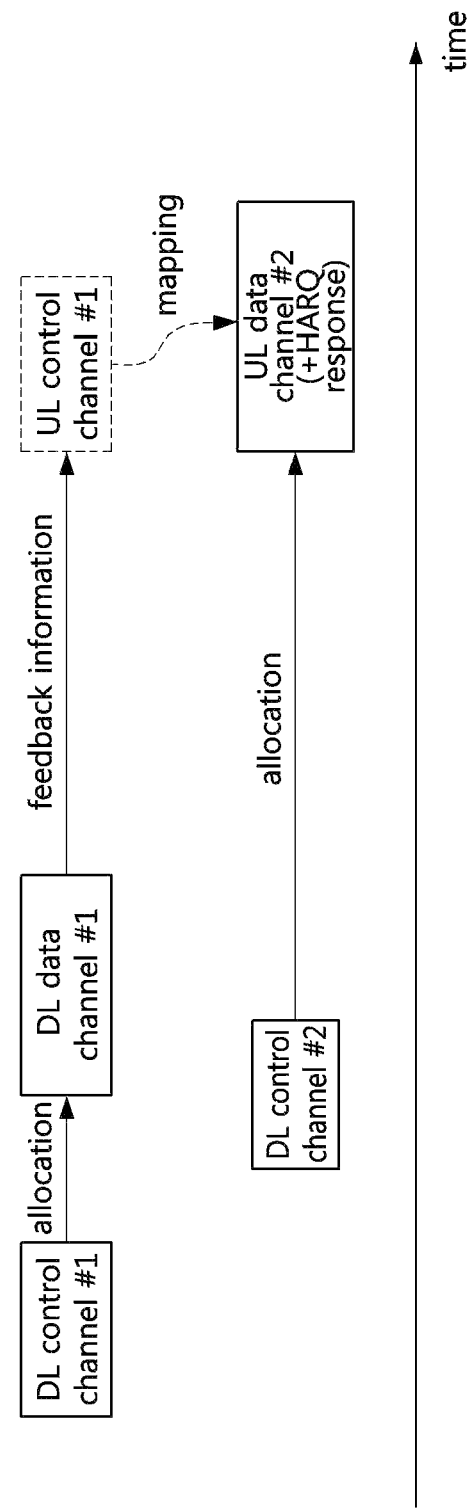
FIG. 21 is a conceptual diagram illustrating a ninth embodiment of a UL transmission method in a communication system.

FIG. 21 is a conceptual diagram illustrating a ninth embodiment of a UL transmission method in a communication system.

Referring to FIG. 21, the base station may sequentially transmit a DL control channel #1 and a DL control channel #2 to one terminal. The DL control channel #1 may include resource allocation information for a DL data channel #1, and the DL control channel #2 may include resource allocation information for a UL data channel #2. An HARQ response for the DL data channel #1 may be transmitted through the UL control channel #1, and the starting time resource (e.g., starting slot or starting symbol) of the UL control channel #1 may be the same as the starting time resource (e.g., starting slot or starting symbol) of the UL data channel #2. In this case, the terminal may transmit the HARQ response for the DL data channel #1 through the UL data channel #2 through the UL control channel #1. Therefore, a transport block (e.g., UL data) and the HARQ response may be mapped to the UL data channel #2.

The DL control channel #1 may include an indicator indicating the size of the UL control information #1 (e.g., the size of the UL control information #1 to be transmitted through the UL control channel #1). The terminal receiving the DL control channel #1 may identify the size of the UL control information #1 based on the indicator included in the DL control channel #1. Also, the terminal may receive the DL control channel #2 from the base station, and determine the size of resources to which the UL control information #1 is mapped in the UL data channel #2 indicated by the DL control channel #2.

In case that the terminal receives the DL control channel #2 before the DL control channel #1, it may not be easy for the UL control information #1, which is a response to the DL data channel #1, to be transmitted through the UL data channel #2. The reason is that the terminal does not know the size of the UL control information #1 and accordingly may not calculate the size of the resources occupied by the UL control information #1 in the UL data channel #2. However, the terminal may estimate the size of the UL control information #1 based on the following methods.

In a proposed method, the terminal may assume the size of the UL control information #1 to be a predetermined maximum size (e.g., 2 bits), and may calculate the size of resources occupied by the UL control information #1 having the maximum size in the UL data channel #2. The terminal may map the UL control information #1 to the UL data channel #2 based on the above method.

Figure 22:
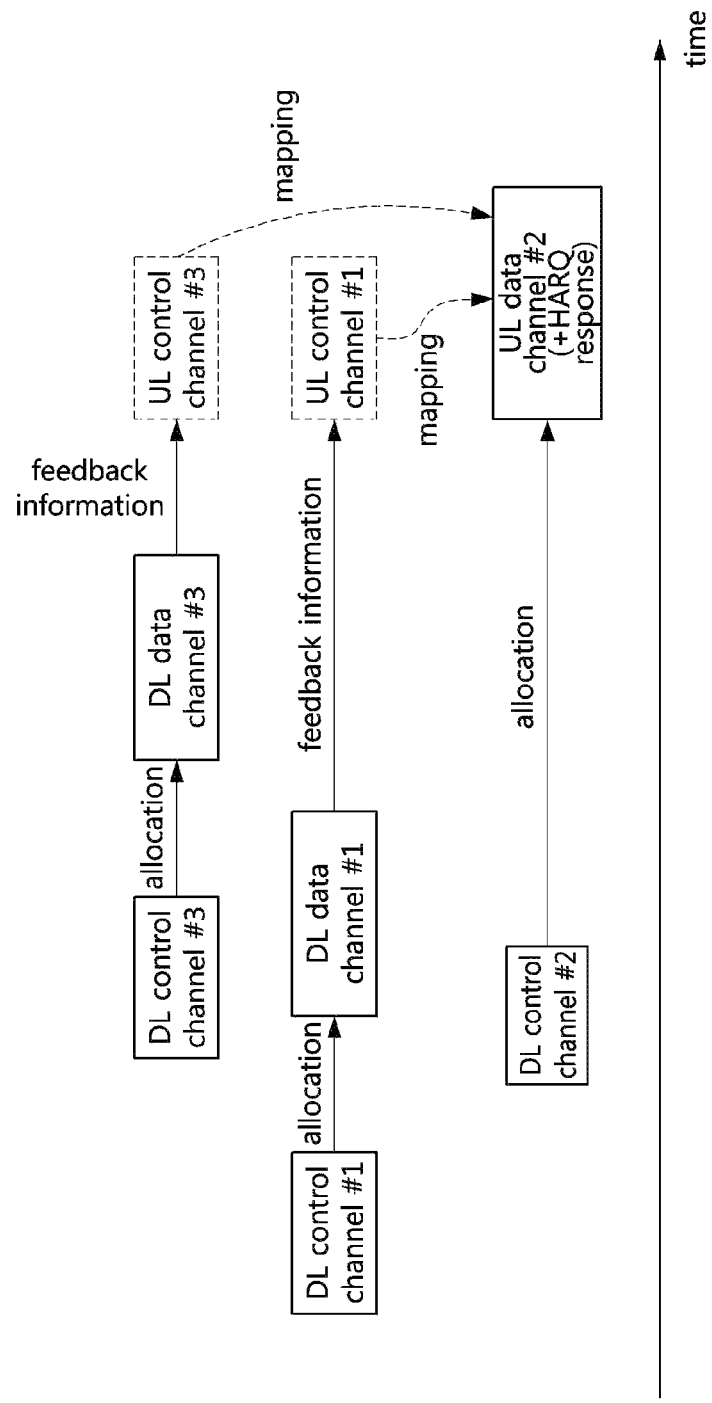
FIG. 22 is a conceptual diagram illustrating a tenth embodiment of a UL transmission method in a communication system.

FIG. 22 is a conceptual diagram illustrating a tenth embodiment of a UL transmission method in a communication system.

Referring to FIG. 22, the base station may transmit a DL control channel #1 including resource allocation information for a DL data channel #1, a DL control channel #2 including resource allocation information for a UL data channel #2, and a DL control channel #3 including resource allocation information for a DL control channel #3.

The base station may expect that UL control information #1 for the DL data channel #1 is included in the UL data channel #2. The UL data channel #2 may be configured considering the size of UL control information #1 and the size of a transport block (e.g., a transport block scheduled by the DL control channel #2), and the resource allocation information for the UL data channel #2 may be included in the DL control channel #2. The terminal may map the UL control information #1 to the UL data channel #2 in consideration of the type and size of the UL control information #1, and may map the transport block to remaining resource elements to which the UL control information #1 is not mapped among resource elements constituting the UL data channel #2.

The UL control information #1 may include various types of control information. For example, the UL control information #1 may include an HARQ response and/or channel information. In the NR communication system, the mapping procedure of the transport block and the channel information may vary according to the size of the HARQ response.

For example, when the size of the HARQ response is 1 bit or 2 bits, the terminal may calculate the number of resource elements to which the HARQ response is mapped among the resource elements constituting the UL data channel, and may map the channel information to remaining resource elements excluding the resource elements to which the HARQ response is mapped among the resource elements constituting the UL data channel. Thereafter, the terminal may map the transport block to resource elements to which channel information is not mapped among the resource elements constituting the UL data channel. Thereafter, the terminal may map the HARQ response to the UL data channel. In this case, the HARQ response may be remapped instead of the transport block to specific resource elements belonging to the UL data channel.

For example, when the size of the HARQ response is 3 bits, the terminal may map the HARQ response to the UL data channel, may map the channel information to remaining resource elements to which the HRAQ response is not mapped among the resource elements constituting the UL data channel, and may map the transport block to remaining resource elements to which the HARQ response and the channel information are not mapped among the resource elements constituting the UL data channel.

When the UL data channel #2 is transmitted based on a frequency hopping scheme, a part of the UL control information #1 (e.g., ½ of the UL control information #1) may be mapped to the UL data channel #2 corresponding to the first frequency hop, and the remainder of the UL control information #1 may be mapped to the UL data channel #2 corresponding to the second frequency hop.

However, when the DL control channel #3 is received after receiving the DL control channel #2, it may be necessary to change the mapping procedure of the UL data channel #2. The UL control information #3 for the DL data channel #3 may not be generated promptly when the processing capability of the terminal is insufficient. In this case, in the procedure of generating the UL data channel #2, it may be difficult to map both the UL control information #1 and the UL control information #3 to the UL data channel #2. In order to solve this problem, after the DL control channel #2 including the resource allocation information of the UL data channel #2 is transmitted, the DL control channel #3 including the resource allocation information of the DL data channel #3 may be defined not be transmitted.

In the proposed method, the size of the UL control information #3 may be limited to a specific size, and the terminal may change the location of resource elements to which the UL control information #1 is mapped in the mapping procedure of the UL data channel #2. The base station may transmit to the terminal a higher layer message including information instructing to perform the proposed method (e.g., mapping method of the UL data channel #2). The terminal may receive the higher layer message, and perform the method indicated by the higher layer message (e.g., mapping method of the UL data channel #2). Here, the proposed method (e.g., mapping method of the UL data channel #2) may be activated or deactivated by a higher layer message, a MAC CE, or a DCI.

In order to secure the reception quality of the UL control information #1, the UL control information #1 may be mapped to resource elements adjacent to the resource elements to which the reference signals are mapped. Also, the UL control information #3 may be mapped to resource elements adjacent to the resource elements to which the reference signals are mapped. In the proposed method, the location of the starting mapping resource (e.g., subcarrier or resource block) of the UL control information #1 may be changed. For example, the UL control information #1 may be mapped to resource elements to which the UL control information #3 is not mapped among the resource elements constituting DL data channel #2.

In order to apply the proposed method, the size of the UL control information included in the UL data channel #2 may be preferably 1 bit or 2 bits. The base station may limit the number of DL control channels (e.g., DL control channels including resource allocation information of DL data channels) to 1 or 2. When the number of DL control channels including resource allocation information of the DL data channel is 1, the base station may restrict the number of transport blocks transmitted through the corresponding DL data channel to 1 or 2.

Alternatively, if there is no limit on the number of DL control channels, the base station may configure HARQ bundling to the terminal using a higher layer signaling. In this case, the terminal may generate UL control information having a size of 1 bit by performing a logical AND operation on the HARQ responses.

When multiple antennas are used, the base station may transmit to the terminal a higher layer message including information instructing to perform reception operations of 2 transport blocks. The terminal may receive the higher layer message from the base station, and may operate based on the information included in the higher layer message. For example, the terminal may generate 1-bit UL control information for each space.

The base station may transmit to the terminal a higher layer message including information instructing to perform a CBG-based transport block reception operation and a CBG-based UL control channel generation operation. The terminal may receive the higher layer message from the base station, and may operate based on the information included in the higher layer message. For example, the terminal may generate an HARQ response having a size of 1 bit for each transport block instead of a CBG. Here, the terminal may perform a logical AND operation on HARQ responses for all CBGs belonging to one transport block, thereby generating an HARQ response of 1 bit size for each transport block.

In a proposed method, the terminal may assume that the size of the UL control information #3 by the DL data channel #3 is not 0 even before receiving the DL control channel #3. For example, the terminal may assume that the size of the UL control information #3 is 1 bit or 2 bits. The terminal may map the UL control information #1 and the transport block to the UL data channel #2 on the assumption that the UL control information #3 exists. Therefore, regardless of the existence of the actual UL control information #3, the terminal can map the UL control information #1 and the transport block to the UL data channel #2, so that the mapping operation of the UL data channel #2 can be performed regardless of completion of the decoding operation on the DL data channel #3.

The terminal may calculate the number of resource elements to which the corresponding UL control information #1 is mapped according to the type of the UL control information #1 (e.g., HARQ response, channel information). In order to apply the proposed method, a reference number $M_{SC}^{UCI}$ of resource elements per symbol may be redefined. For example, the number of resource elements to which UL control information #3 is mapped may be excluded from $M_{SC}^{UCI}$.

The number of resource elements to which the UL control information #3 is mapped may be determined based on a mathematical equation defined in the technical specification. The terminal may reuse P applied to the UL control information #3 and $\beta_{offset}$ applied to the HARQ response belonging to the UL control information #1. In order to apply a high coding rate to the UL control information #3, the terminal may use the value β configured by a higher layer signaling. The base station may not be able to notify $\beta_{offset}$ to the terminal through the DL control channel #2 because the base station does not the existence of the UL control information #3.

For example, p may be defined as a value relative to $\beta_{offset}$ applied to the HARQ response belonging to UL control information #1. In order to apply a coding rate higher than the coding rate of the HARQ response belonging to the UL control information #1 to the HARQ response belonging to the UL control information #3, β applied to the HARQ response belonging to the UL control information #3 may have a value greater than 1. However, in order to support a case where the priority of the UL control information is lower than the priority of the UL data channel, β may be set to be smaller than 1.

Alternatively, β may be expressed as a value relative to the transport block or CBG. β may be applied to a scenario in which the UL control information #1 does not exist but a transport block or CBG exists, or a scenario in which the UL control information #1 exists and the channel information is transmitted through the UL data channel #2.

Figure 23:
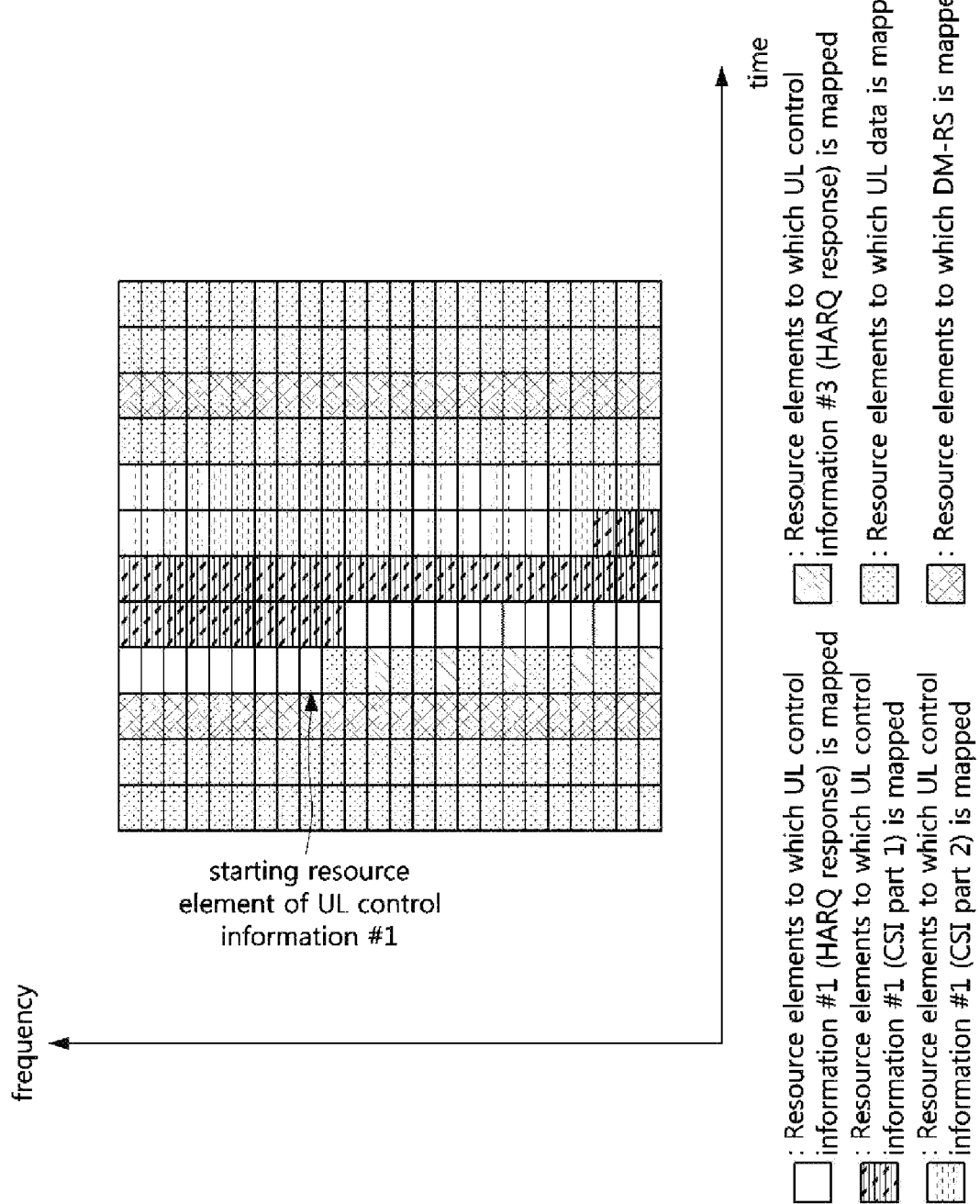
FIG. 23 is a conceptual diagram illustrating a first embodiment of a UL data channel #2 according to the UL transmission method shown in FIG. 22.
Figure 24:
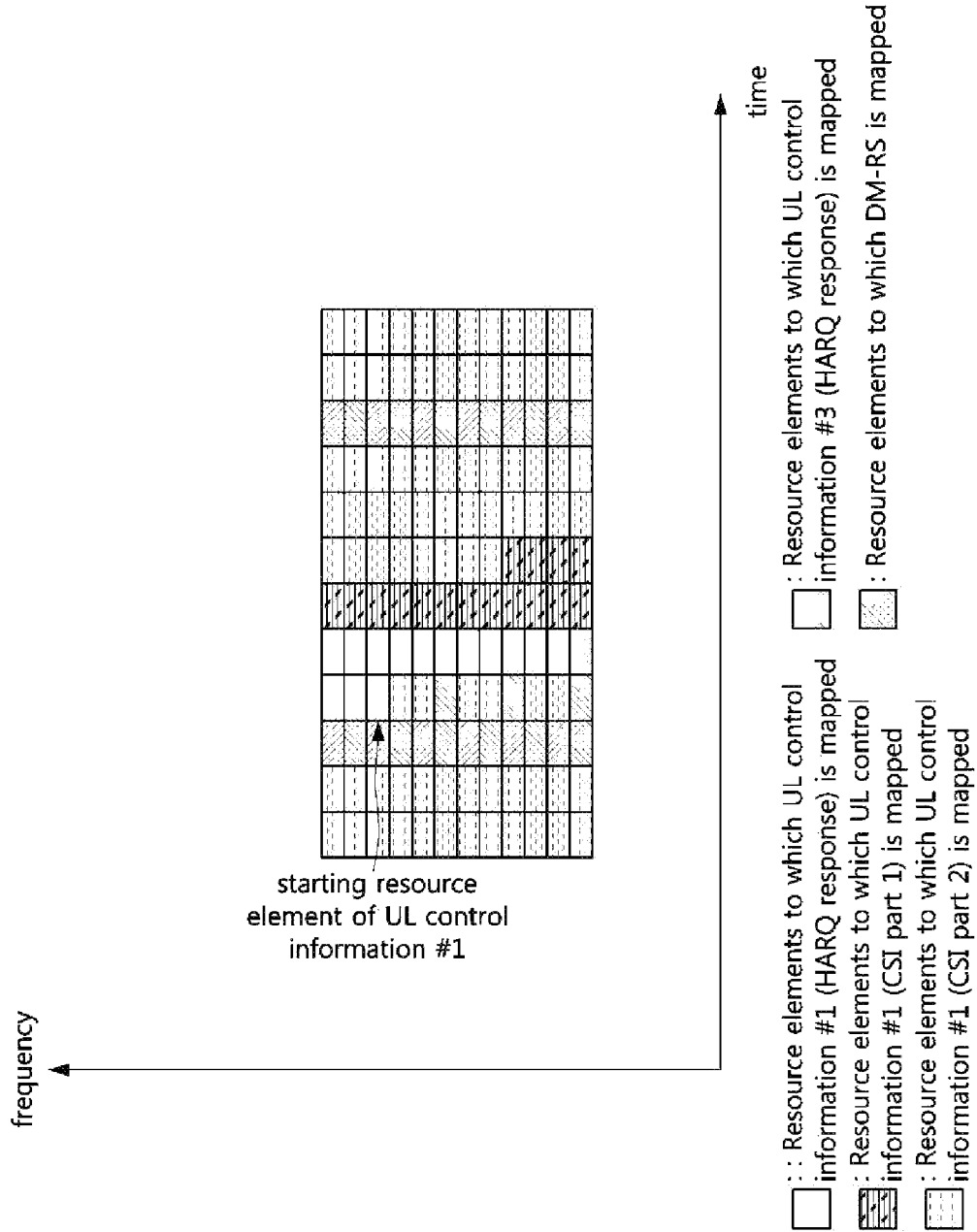
FIG. 24 is a conceptual diagram illustrating a second embodiment of a UL data channel #2 according to the UL transmission method shown in FIG. 22.

FIG. 23 is a conceptual diagram illustrating a first embodiment of a UL data channel #2 according to the UL transmission method shown in FIG. 22, and FIG. 24 is a conceptual diagram illustrating a second embodiment of a UL data channel #2 according to the UL transmission method shown in FIG. 22.

Referring to FIG. 23, the terminal may first map the UL control information #1 and the transport block (or CBG) to the UL data channel #2, and further map the UL control information #3 to the UL data channel #2. Here, the UL control information #1 may include the HARQ response and the channel information.

Referring to FIG. 24, the terminal may first map the UL control information #1 to the UL data channel #2, and further map the UL control information #3 to the UL data channel #2. Here, the UL control information #1 may include the HARQ response and the channel information, and the transport block (or CBG) may not be mapped to the UL data channel #2.

In the proposed method, the position of the starting resource element to which the UL control information #1 is mapped may be changed. In the following embodiment, a method of generating the UL data channel #2 will be described. The following embodiment may be applied to a scenario in which a transport block (e.g., UL data), UL control information #1, and UL control information #3 exist.

In a first step, the terminal may map the UL control information #1 to the UL data channel #2 based on the method defined in the technical specification. Here, the terminal may calculate the starting resource element of the UL control information #1, and may not map the UL control information #1 to the resource elements before the starting resource element.

In a second step, the terminal may map the transport block (or CBG) to the UL data channel #2. The transport block (or CBG) may be mapped to the remaining resource elements excluding resource elements to which the UL control information #1 and the reference signals are mapped among all the resource elements constituting the UL data channel #2. The transport block (or CBG) may be mapped based on the method defined in the technical specification. The transport block (or CBG) may be mapped from a resource element subsequent to the resource elements to which the UL control information #1 is mapped. The transport block (or CBG) may be mapped to also the resource elements whose mapping is held due to the presence of the UL control information #1 (e.g., 1 bit or 2 bits of HARQ response) or the UL control information #3.

In a third step, the terminal may map the UL control information #3 to the UL data channel #2. The UL control information #3 may be remapped to the resource elements (e.g., resource elements shown in FIG. 23) to which the transport block (or CBG) is mapped or the resource elements (e.g., resource elements shown in FIG. 24) to which the channel information belonging to the UL control information #1. In this case, the UL control information #3 may be mapped to specific resource elements instead of the transport block or the UL control information #1.

When no transport block or CBG is present, the second step may be omitted. When the UL control information #3 does not exist, the third step may be omitted. Therefore, if there are not the transport block (e.g., UL data) and the UL control information #3, the terminal may perform only the first step to generate the UL data channel #2. Alternatively, when the transport block (e.g., UL data) is not present, the terminal may perform the first and third steps to generate the UL data channel #2. Alternatively, when the UL control information #1 and the UL control information #3 do not exist, the terminal may perform only the second step to generate the UL data channel #2. Alternatively, when the UL control information #3 does not exist, the terminal may perform only the first step and the second step to generate the UL data channel #2.

The base station may configure frequency hopping for the UL data channel #2 to the terminal using a higher layer signaling. In this case, the terminal may transmit a part of the UL control information #1 in the UL data channel #2 corresponding to a first frequency hop, and transmit the remaining UL control information #1 in the UL data channel #2 corresponding to a second frequency hop.

For example, the UL control information #3 may be transmitted in the UL data channel #2 corresponding to the first frequency hop, and may not be transmitted in the UL data channel #2 corresponding to the second frequency hop. In this case, the base station can quickly acquire the UL control information #3. Alternatively, the UL control information #3 may be transmitted in the UL data channel #2 corresponding to the second frequency hop as well as the first frequency hop. In this case, an error rate of the UL control information #3 at the base station may be reduced by a frequency multiplexing gain.

√ PUCCH Repetition and PUSCH Bundling

The terminal may transmit UL control information and UL data using the same slot or different slots. The base station may transmit to the terminal a higher layer message including information indicating the number of repeated transmissions of the HARQ response for the DL data channel. The terminal may receive the higher layer message from the base station, and identify the number of repeated transmissions of the HARQ response for the DL data channel based on the information included in the higher layer message. The number of repeated transmissions of the HARQ response for the DL data channel may be an integer equal to or greater than 1.

In the following embodiments, a DL control channel #U may include resource allocation information for a UL data channel #U. A DL control channel #D may be classified into two types. For example, a DL control channel #D1 may indicate a DL control channel received before the DL control channel #U at the terminal, and a DL control channel #D2 may indicate a DL control channel received after the DL control channel #U at the terminal. Here, there may be one or more DL control channels #D1 and one or more DL control channels #D2.

Figure 25:
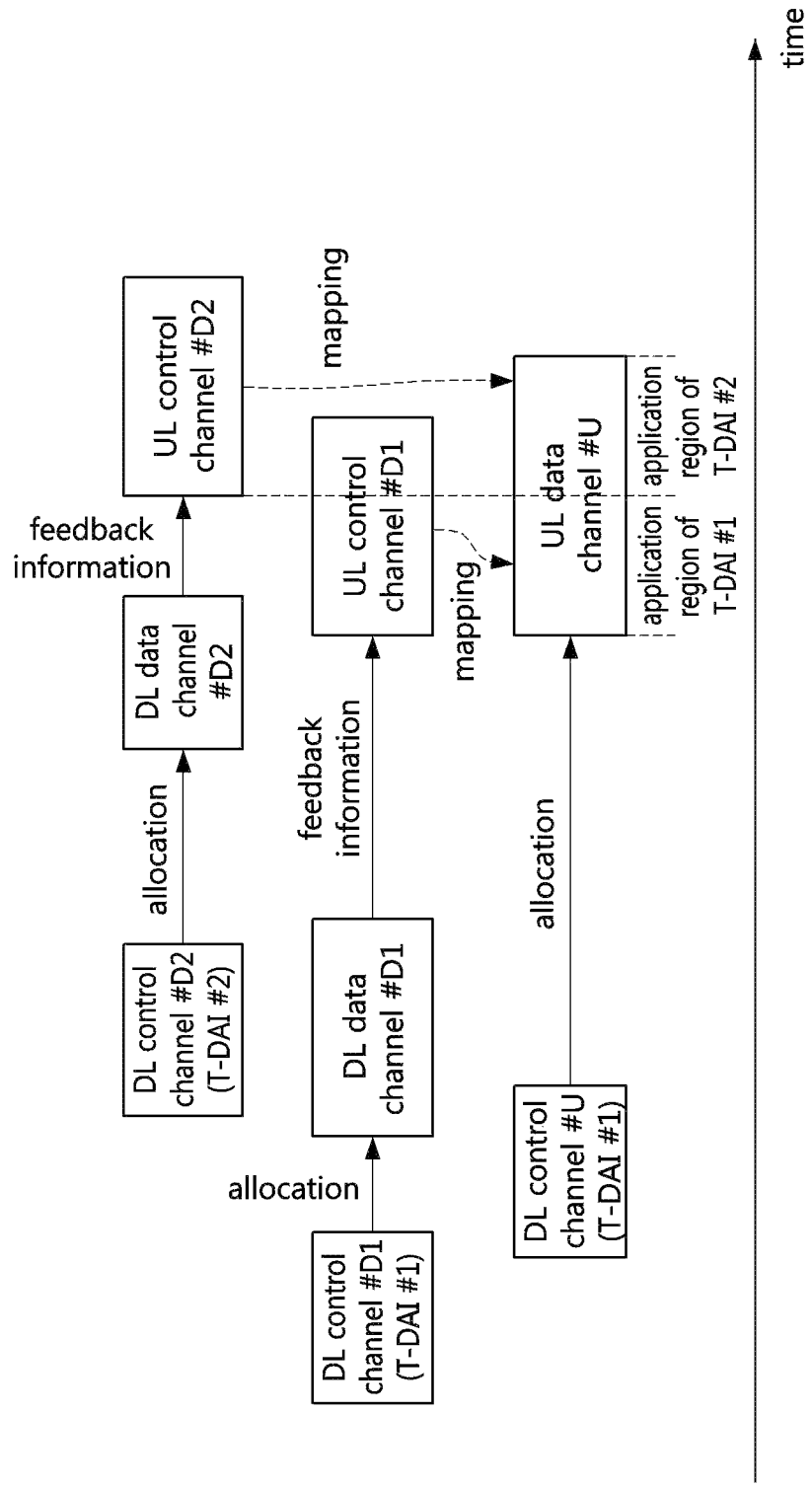
FIG. 25 is a conceptual diagram illustrating an eleventh embodiment of a UL transmission method in a communication system.

FIG. 25 is a conceptual diagram illustrating an eleventh embodiment of a UL transmission method in a communication system.

Referring to FIG. 25, the base station may transmit a DL control channel #D1 including resource allocation information of a DL data channel #D1 to the terminal, may transmit a DL control channel #U including resource allocation information of a UL data channel #U to the terminal, and may transmit a DL control channel #D2 including resource allocation information of a DL data channel #D2 to the terminal.

The base station may configure information used to dynamically determine the size of a HARQ response codebook (e.g., HARQ-ACK codebook) to the terminal using a higher layer signaling. Each of the DL control channel #D1, the DL control channel #U, and the DL control channel #D2 may include a calculation-downlink assignment index (C-DAI) and/or total-DAI (T-DAI). For example, a DCI format 0_0 may not include both C-DAI and T-DAI, a DCI format 01 may include T-DAI, a DCI format 1_0 may include C-DAI, and a DCI Format 1_1 may include both C-DAI and T-DAI.

Meanwhile, the UL data channel #U allocated by the DL control channel #U may be used for transmitting not only UL data but also HARQ responses (e.g., HARQ responses for the DL data channels #D1 and #D2). The base station may configure configuration information for operation of mapping UL control information to the UL data channel #U to the terminal using a higher layer signaling. In this case, the terminal may map the UL control information to the UL data channel #U based on the information configured by the higher layer signaling.

When the DL data channel #D1 allocated by the DL control channel #D1 is received, the terminal may generate UL control information #D1 for the DL data channel #D1. The size of the UL control information #D1 may be indicated by T-DAI #1 included in DL control channel #D1. The terminal may perform an operation of generating the UL control channel #D1 including UL control information #D1. Thereafter, the terminal may receive the DL control channel #U from the base station. The DL control channel #U may include T-DAI #1 indicating the size of the UL control information #D1. The terminal may perform an operation of generating the UL data channel #U. When the starting resource (e.g., starting symbol or starting slot) of the UL control channel #D1 is equal to the starting resource (e.g., starting symbol or starting slot) of the UL data channel #U, the terminal may map the UL control information #D1 to the UL data channel #U. Alternatively, the terminal may map the UL control information #D1 to the UL data channel #U according to a request from the base station request or an operation defined in the technical specification.

When the DL control channel #D2 is received after receiving the DL control channel #U, the terminal may not map the UL control information #D2 for the DL data channel #D2 allocated by the DL control channel #D2 to the UL data channel #U. Therefore, the terminal may generate the UL data channel #U by encoding the transport block based on T-DAI #1 included in the DL control channel #U.

On the other hand, in a proposed method, when DL control channel #D2 is received after receiving DL control channel #U, the terminal may map the UL control information #D2 for the DL data channel #D2 allocated by the DL control channel #D2 to the UL data channel #U.

In a first proposed method, the terminal may receive one or more DL control channels #D2, receive one or more transport blocks (e.g., DL data) through one or more DL data channels #D2 allocated by the one or more DL control channels #D2, and generate the UL control information #D2 for the one or more DL data channels #D2 by a limited amount.

Here, the size of the UL control information #D2 for the DL data channel #D2 may be limited to within a certain size. For example, the size of the UL control information #D2 may be limited to 1 bit or 2 bits. The maximum size of the UL control information #D2 may be defined in the technical standard known to the base station and the terminal. Alternatively, the base station may transmit a higher layer message including information indicating the maximum size of the UL control information #D2 to the terminal. The number of transmissions of the DL control channel #D2 (e.g., DL control channel transmitted after the DL control channel #U) may be limited to 1 or 2.

In addition, the base station may transmit a higher layer message including information required for bundling of the HARQ responses to the terminal. When the HARQ responses are bundled, the size of the UL control information may be compressed. Since the mapping operation of the UL data channel #U is performed based on T-DAI #1, the mapping operation of the UL data channel #U may not be affected by the DL control channel #D2.

In a second proposed method, the terminal may receive the DL control channel #D2 including T-DAI #2, and may generate the UL data channel #U by encoding the transport block on the basis of the last acquired T-DAI (e.g., T-DAI #2). The application time (e.g., symbol or slot) of T-DAI may vary depending on the processing capability of the terminal. The terminal may encode the transport block by applying a different T-DAI to each slot in which the UL data channel #U is transmitted, and map the encoded transport block to the UL data channel #U. The second proposed method may be performed as follows.

Figure 26:
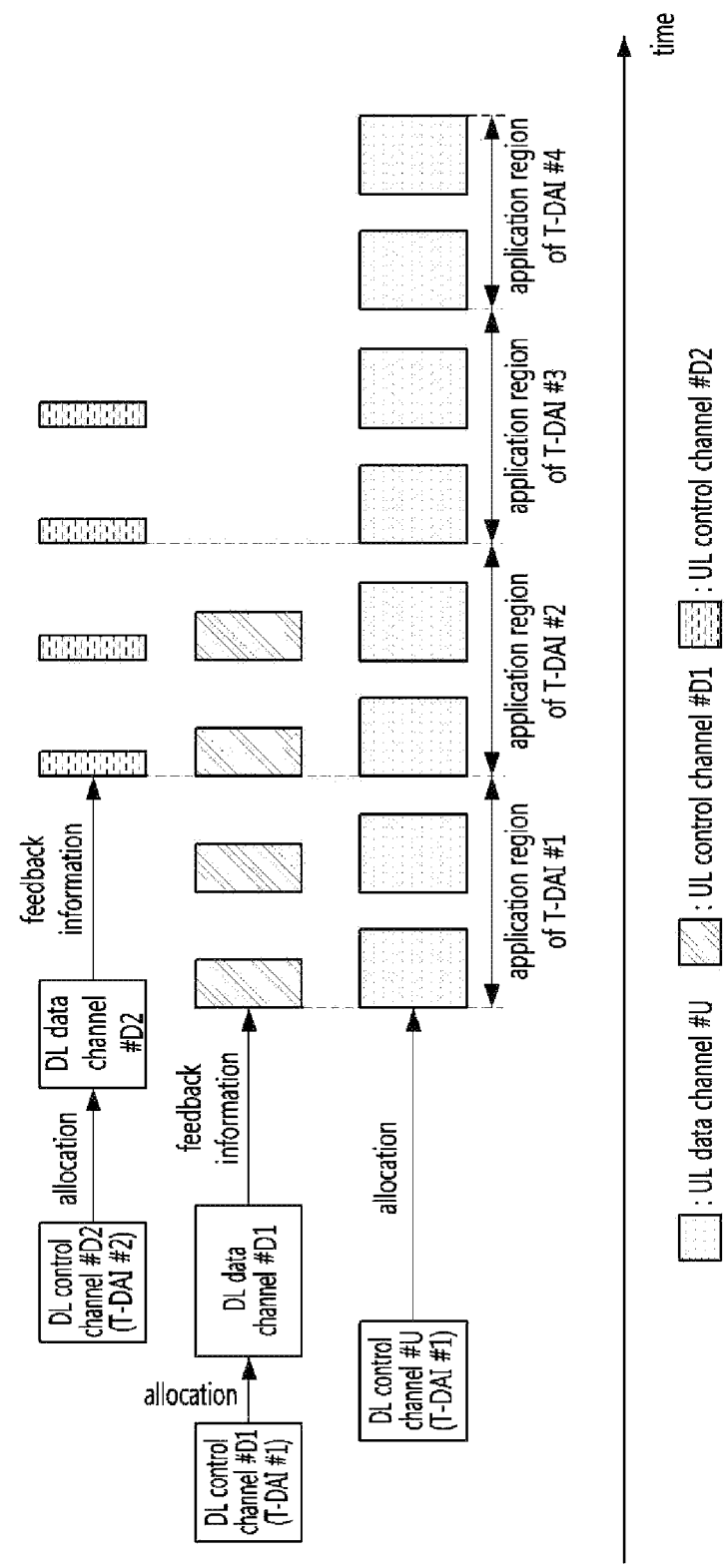
FIG. 26 is a conceptual diagram illustrating a twelfth embodiment of a UL transmission method in a communication system.

FIG. 26 is a conceptual diagram illustrating a twelfth embodiment of a UL transmission method in a communication system.

Referring to FIG. 26, each of the UL control channels #D1 and #D2 may be repeatedly transmitted four times, and the UL data channel #U may be repeatedly transmitted eight times. Each of the DL control channel #D1, the DL control channel #U, the DL control channel #D2, the DL data channel #D1 and the DL data channel #D2 shown in FIG. 26 may be the same as each of the DL control channel #U, the DL control channel #D2, the DL data channel #D1, and the DL data channel #D2.

A different T-DAI may be applied to each UL data channel #U. For example, T-DAI #1 may be applied to the first and second UL data channels #U. T-DAI #1 may be indicated by the DL control channel #D1 or the DL control channel #U. T-DAI #2 may be applied to the third and fourth UL data channels #U. T-DAI #2 may be indicated by the DL control channel #D2. T-DAI #2 may be represented by a value relative to T-DAI #1. Alternatively, T-DAI #2 may be a value indicating the size of all UL control information included in the UL data channel #U.

T-DAI #3 may be applied to the fifth and sixth UL data channels #U. T-DAI #3 may be configured by the DL control channel #D1. T-DAI #3 may indicate the size of the UL control information #D2 that is additionally generated by the DL control channel #D2. When T-DAI #2 is represented as a value relative to T-DAI #1, T-DAI #3 may be the same as T-DAI #2. When T-DAI #2 indicates the size of all UL control information included in UL data channel #U, T-DAI #3 may be a difference between T-DAI #1 and T-DAI #2.

T-DAI #4 may be applied to the seventh and eighth UL data channels #U. T-DAI #4 may indicate that UL control information does not exist. The terminal may derive T-DAI #4 by comparing the number of repeated transmissions of the UL control information and the number of repeated transmissions of the UL data channel.

Case without T-DAI

Some DCI formats may not include C-DAI and T-DAI. For example, the DCI format 0_0 may not include T-DAI. When a UL data channel is allocated by the DCI format 0_0, the terminal may obtain T-DAI from a DL control channel including resource allocation information of a DL data channel, and may perform an operation of mapping the UL data channel based on the obtained T-DAI.

The DCI format 1_0 and the DCI format 1_1 (e.g., DCI format 1_1 when carrier aggregation (CA) is not used) may include only C-DAI. All DCIs may include transmit power information (e.g., transmit power control (TPC)) of the UL control channel. For example, the DCI format 1_0 and the DCI format 1_1 may include a TPC having a size of 2 bits. In order to map the UL control information to the UL data channel, a specific field (e.g., TPC) included in the DCI format 1_0 and the DCI format 1_1 may be used for another purpose.

When the starting resource (e.g., symbol or slot) of the UL data channel is equal to the starting resource (e.g., symbol or slot) of the UL control channel, the terminal and the base station may determine that the HARQ response is mapped to the UL data channel instead of the UL control channel. Alternatively, when the UL data channel is repeatedly transmitted and a slot in which the UL data channel is transmitted overlaps with a slot in which the UL control channel is transmitted, the terminal and the base station may determine that the HARQ response is mapped to the UL data channel instead of the UL control channel.

In a proposed method, the TPC included in the DCI may indicate T-DAI instead of the transmit power. When the HARQ response is mapped to the UL data channel, the terminal may interpret a value indicated by the TPC included in the DCI as T-DAI. In order to apply the proposed method, when the DL control channel #D2 after the DL control channel #U includes C-DAI, the terminal may interpret C-DAI included in the DL control channel #D2 as T-DAI. In this case, after transmitting the DL control channel #U, the base station may generate C-DAI indicating the size of the UL control information to be additionally transmitted by the terminal. For example, when T-DAI #2 is expressed as a relative value for T-DAI #1, the base station may generate C-DAI indicating the size of UL control information to be further transmitted by the terminal.

When the DL control channel #U (e.g., DL control channel #U shown in FIG. 25 or 26) including the resource allocation information of the UL data channel #U is not received, since the terminal cannot transmit the UL data channel #U, the terminal may map the HARQ response to the UL control channel.

However, since the information indicated by T-DAI is different from the transmit power of the UL control channel, when the TPC is interpreted as indicating T-DAI instead of the transmit power, there may be a problem that the transmit power or T-DAI is misinterpreted.

For example, a TPC set to '00' may indicate −1 dB, a TPC set to '01' may indicate 0 dB, a TPC set to '10' may indicate +1 dB, and a TPC set to '11' may indicate +3 dB. C-DAI or T-DAI may express the size of Y (i.e., Y>=1) pieces of UL control information. A DAI set to '00' may indicate Y satisfying '(Y−1) mod 4+1=1', a DAI set to '01' may indicate Y satisfying '(Y−1) mod 4+1=2', a DAI set to '10' may indicate Y satisfying '(Y−1) mod 4+1=3', and a DAI set to '11' may indicate Y satisfying '(Y−1) mod 4+1=4'.

When a DL control channel including DAI is received, the DAI included in the corresponding DL control channel may be a value increased by 1 from the DAI included in the previous DL control channel. However, the TPC of the UL control channel may be set to a specific value among 4 values (e.g., '00', '01', '10', and '1').

For example, when the current TPC is equal to the previous TPC, when a difference between the current TPC and the previous TPC is less than or equal to −1, or when the previous TPC is set to '1' and the current TPC is set to a value other than '00', the terminal may determine that the TPC indicates the transmit power. On the other hand, when the difference between the current TPC and the previous TPC is +1, the terminal may interpret the TPC as indicating T-DAI. However, even when the difference between the value indicated by the current TPC and the value indicated by the previous TPC is +1, the terminal may misinterpret the TPC as indicating the transmit power.

In this case, since the terminal increases the transmit power of the UL control channel by 0 dB, +1 dB, or +3 dB, the reception performance of the UL control channel at the base station may be improved, and interference by the UL control channel at the neighboring base station may increase. However, since the increased transmit power is not large, the influence of the UL control channel transmitted with the increased transmit power on the communication system may not be large.

■ Sounding Reference Signal (SRS) Transmission Method

The terminal may transmit SRSs periodically or non-periodically. The SRS may be transmitted using UL symbol(s) included in a slot. Each of the symbols constituting the slot may be configured as a DL symbol, a flexible symbol, or a UL symbol. For example, the types of symbols (e.g., DL symbol, flexible symbol, or UL symbol) constituting slots may be configured by a higher layer signaling and may be dynamically changed by a DCI (e.g., DCI format 2_0) including an SFI. In this case, the SRS may be transmitted as follows.

Figure 27:
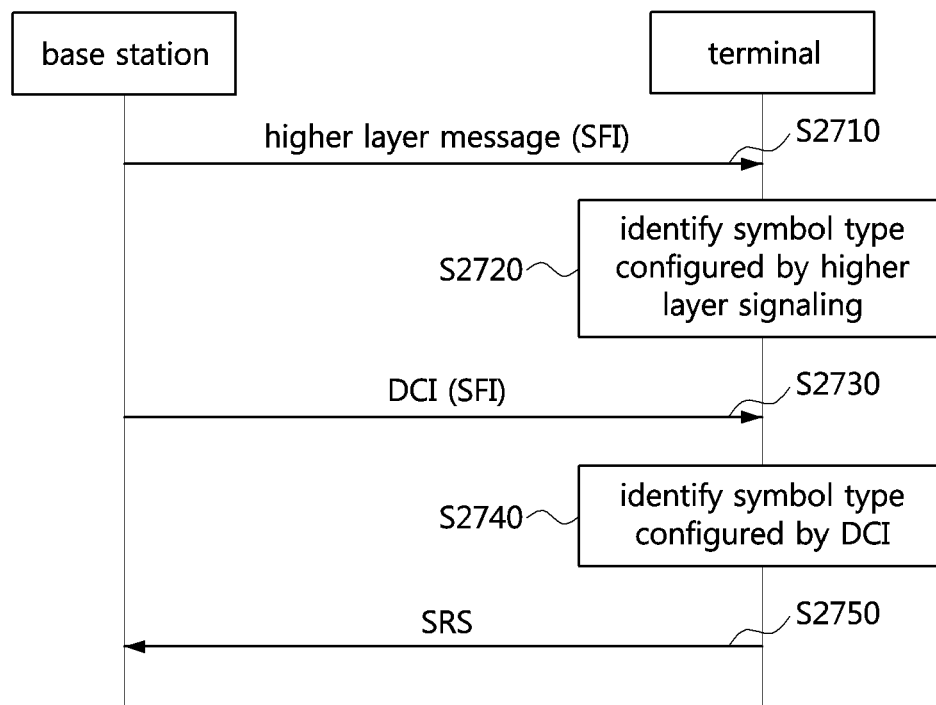
FIG. 27 is a sequence chart illustrating a first embodiment of an SRS transmission method in a communication system.

FIG. 27 is a sequence chart illustrating a first embodiment of an SRS transmission method in a communication system.

Referring to FIG. 27, a communication system may include a base station and a terminal. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. Each of the base station and the terminal may be configured to be the same as or similar to the communication node 200 shown in FIG. 2.

The base station may transmit a higher layer message (e.g., RRC message) including an SFI (e.g., SFI information) to the terminal (S2710). When a normal CP is used, the SFI included in the higher layer message may be classified into a pattern commonly applied to all terminals and a pattern applied only to a specific terminal.

The commonly-applied pattern (e.g., 'TDD-UL-DL-ConfigCommon') may include a slot pattern(s) (e.g., pattern 1) indicated by the base station to terminals through system information and a reference subcarrier spacing which is a reference of the slot pattern(s). The pattern configured in the terminal may be repeated according to a certain period P. For example, the period P may be 0.5 ms, 0.625 ms, 1 ms, 1.25 ms, 2 ms, 2.5 ms, 5 ms, or 10 ms. Depending on the subcarrier spacing, some of the periods P may not be applied.

The number S of slots belonging to one period P may differ depending on the subcarrier spacing. Consecutive DL slots may be located in a front region within a slot interval according to one period P, and consecutive UL slots may be located in a rear region within a slot interval according to one period P. The number of consecutive DL slots may be indicated by 'nrofDownlinkSlots' included in the higher layer message and the number of consecutive UL slots may be indicated by 'nrofUplinkSlots' included in the higher layer message.

Each slot belonging to a middle region of the slot interval according to one period P may include at least one of a DL symbol, a flexible (FL) symbol, and a UL symbol. For example, the order of symbols in each of the slots belonging to the middle region of the slot interval according to one period P may be 'DL symbol→Flexible (FL) symbol→UL symbol'. The base station may inform the terminal of the number of DL symbols, the number of flexible symbols, and the number of UL symbols included in the slot, respectively. Therefore, consecutive DL symbols may be located in the next slot of the DL slot. The consecutive DL symbols may be located from the starting symbol in the slot and the number of consecutive DL symbols may be indicated by 'nrofDownlink symbols' included in the higher layer message. Consecutive UL symbols may be located in the previous slot of the UL slot. The consecutive UL symbols may be located in the rear region of the slot, and the number of consecutive UL symbols may be indicated by 'nrofUplinkSymbols' included in the higher layer message. The terminal may regard symbols other than the DL symbol and the UL symbol among the symbols included in the slot as flexible (FL) symbols.

Meanwhile, when indicating the commonly-applied pattern, the base station may inform the terminal of 2 slot patterns (e.g., pattern1 and pattern2). Each of the patterns of the slots may have a different period. For example, the period of pattern1 may be P, and the period of pattern2 may be $P_2$. The number of DL slots, the number of UL slots, the number of DL symbols, and the number of UL symbols according to the slot pattern may be configured separately. However, one subcarrier spacing may be applied to the two slot patterns. The terminal may consider that two slot patterns occur consecutively and the period of the consecutive slot patterns may be assumed to be a sum of the periods of two slot patterns (e.g., $P+P_2$).

Therefore, for the number S of slots belonging to the first slot pattern, consecutive DL slots (e.g., 'nrofDownlinkSlots' for the first slot pattern), consecutive DL symbols (e.g., 'nrofDownlinkSymbols' for the first slot pattern), consecutive flexible symbols (e.g., symbols that are not configured as DL symbol or UL symbol according to the first slot pattern), consecutive UL symbols (e.g., 'nrofUplinkSymbols' for the first slot pattern), and consecutive UL slots (e.g., 'nrofUplinkSlots' for the first slot pattern) may occur in order.

For the number $S_2$ of slots belonging to the second slot pattern, consecutive DL slots (e.g., 'nrofDownlinkSlots' for the second slot pattern), consecutive DL symbols (e.g., 'nrofDownlinkSymbols' for the second slot pattern), consecutive flexible symbols (e.g., symbols that are not configured as DL symbol or UL symbol according to the second slot pattern), consecutive UL symbols (e.g., 'nrofUplinkSymbols' for the second slot pattern), and consecutive UL slots (e.g., 'nrofUplinkSlots' for the second slot pattern) may occur in order.

The base station may further configure a pattern (e.g., 'TDD-UL-DL-ConfigDedicated') applied only to a specific terminal through a higher layer signaling. The pattern further indicated to the terminal may be used to reconfigure the flexible (FL) symbol among the symbols configured by the commonly-applied pattern to a DL symbol, a flexible (FL) symbol, or a UL symbol. Among the symbols configured by the commonly-applied pattern, symbols other than the flexible (FL) symbols may be indicated by the pattern applied only to the specific terminal so as to be maintained as DL symbol or UL symbol. The base station may configure the terminal through a higher layer signaling, so that all symbols belonging to a specific slot are DL symbols or UL symbols. Also, the base station may configure the terminal through a higher layer signaling, so that a specific slot includes consecutive DL symbols, consecutive flexible symbols, and consecutive UL symbols.

The slot format may be indicated to the terminal by a higher layer message. In addition, the slot format may be indicated to the terminal by a dynamic signaling message as well as a higher layer message. The base station may configure the terminal by using a higher layer signaling to monitor a DCI in a specific format (e.g., DCI format 2_0). The terminal may monitor a DCI in a specific format (e.g., DCI format 2_0) according to the configuration of the higher layer signaling. The slot format configured by the higher layer message may not be changed by the DCI. The DCI may instruct to override the flexible (FL) symbol configured by the higher layer signaling to a DL symbol, a UL symbol, or a flexible (FL) symbol. In order to indicate the format of the slot(s) to the terminal(s), the base station may concatenate one or more pieces of information that the specific terminal should interpret to configure a payload of the DCI of a specific format (e.g., DCI format 2_0). The terminal may identify the format of the slot(s) using a value (e.g., 'slotFormatCombinationId') indicated in a specific location (e.g., 'positionInDCI') in the DCI. For example, the base station may use a higher layer signaling to configure the formats of the slot(s) to the terminal in a form of a sequence (e.g., 'slotFormatCombinations'). One element constituting the sequence may be identified by an index (e.g., 'slotFormatCombinationId'), and the index may comprise a sequence of formats (e.g., 'slotFormats') of one or more slots.

One slot format (e.g., 'slotFormats') may indicate one or more of the formats #0 to #55 described in Tables 1 to 3 below. In Tables 1 to 3, D may indicate a DL symbol, F may indicate a flexible symbol, and U may indicate a UL symbol.

TABLE 1

| Index | \multicolumn{14}{c}{Symbol index in Slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |

TABLE 1-continued

| Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 5 | D | D | D | D | D | D | D | D | D | D | D | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |

TABLE 2

| Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | F | F | U |
| 29 | D | D | D | D | D | D | D | D | D | D | F | F | F | U |
| 30 | D | D | D | D | D | D | D | D | D | F | F | F | F | U |
| 31 | D | D | D | D | D | D | D | D | D | D | F | F | U | U |
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |

TABLE 3

| Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | D | D | D | D | F | F | U | U |
| 50 | D | D | F | F | U | U | D | D | F | F | U | U | U | U |
| 51 | D | F | F | U | U | U | D | F | F | U | U | U | U | U |
| 52 | D | F | F | F | F | U | D | F | F | F | F | F | F | U |
| 53 | D | D | F | F | F | U | D | D | F | F | F | F | F | U |
| 54 | F | F | F | F | F | F | D | D | D | D | D | D | D | D |
| 55 | D | D | F | F | F | U | U | U | D | D | D | D | D | D |

In case that the symbol type configured by the higher layer signaling is dynamically changed by a DCI, the higher layer message may include information (e.g., CORESET-related information (e.g., time and frequency resources of CORESET), search space-related information (e.g., periodicity of search space), RNTI) required for receiving a DCI including SFI (e.g., DCI format 2_0). The information required for reception of a DCI including SFI (e.g., DCI format 2_0) may be transmitted through the higher layer message of the step S2710. Alternatively, the information required for reception of a DCI including SFI (e.g., DCI format 2_0) may be transmitted through a higher layer message different from the higher layer message in the step S2710.

The terminal may receive the higher layer message from the base station, and identify an SFI included in the higher layer message. Accordingly, the terminal may confirm the types of the symbols (e.g., DL symbol, flexible symbol, or UL symbol) constituting the slot based on the SFI configured by the higher layer signaling (S2720).

Further, when transmission of a DCI including SFI (e.g., DCI format 2_0) is configured by a higher layer signaling, the terminal may determine that a DCI including SFI (e.g., DCI format 2_0) is transmitted. For example, the terminal may identify the information required for receiving a DCI (e.g., DCI format 2_0) included in the higher layer message, and perform a decoding operation (e.g., blind decoding operation) for obtaining the DCI in the search space within the CORESET indicated by the identified information.

Meanwhile, the base station may transmit a DCI including SFI (e.g., DCI format 2_0) (S2730). For example, the base station may transmit a DCI including SFI (e.g., DCI format 2_0) in the search space within the CORESET configured by the higher layer signaling. The SFI included in the DCI (e.g., DCI format 2_0) may be set to one of the formats #0 to #55 described in Tables 1 to 3. Alternatively, the SFI included in the DCI (e.g., DCI format 2_0) may indicate the type (e.g., DL symbol, flexible symbol, or UL symbol) of the symbol(s) configured as a flexible symbol by the higher layer signaling. For example, when the higher layer message indicates that the first and second symbols in a specific slot are DL symbols and the remaining symbols are flexible symbols, the index included in the DCI (e.g., DCI format 2_0) may indicate the SFI of a plurality of slots including the corresponding slot, and may indicate the type of one or more symbols among symbols #2 to #13 in the corresponding slot.

The terminal may receive the DCI (e.g., DCI format 2_0) by performing a decoding operation in the search space within the CORESET configured by the higher layer signaling. The terminal may identify the type of symbols (e.g., DL symbol, flexible symbol, or UL symbol) that constitute the slot(s) based on the index included in the DCI (e.g., DCI format 2_0) (S2740). That is, the terminal may determine the types of symbols constituting the slots based on the format of the slot(s) included in the higher layer message and the index included in the DCI format 2_0. For example, the symbol type may be determined as follows.

Figure 28:
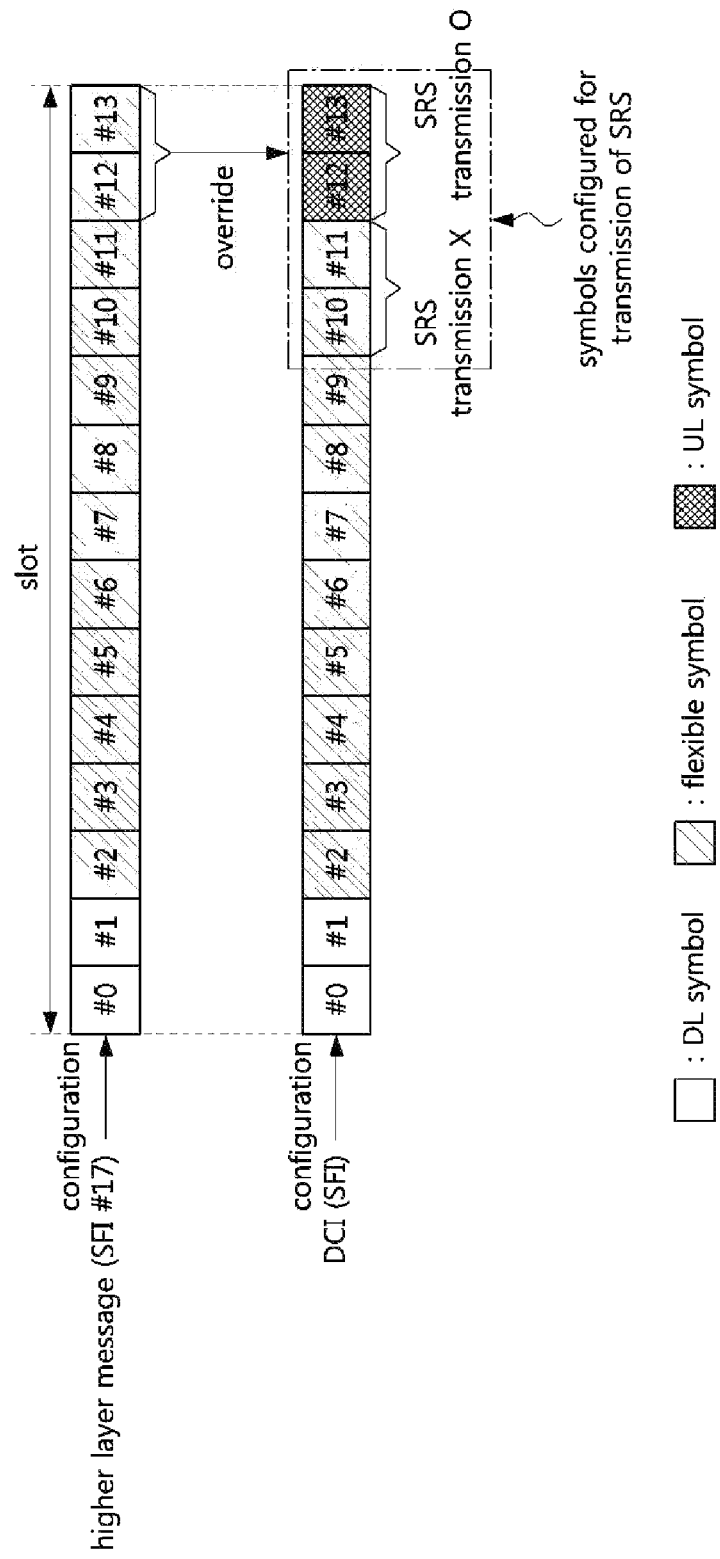
FIG. 28 is a conceptual diagram illustrating a first embodiment of a method of determining a symbol type in a communication system.

FIG. 28 is a conceptual diagram illustrating a first embodiment of a method of determining a symbol type in a communication system.

Referring to FIG. 27 and FIG. 28, in the step S2710, the terminal may receive first SFI information indicating n flexible symbol(s) from the base station. Here, when there are 14 symbols included in one slot, n may be a natural number from 1 to 14. In the embodiment shown in FIG. 28, the first SFI information (e.g., SFI #17) may indicate 12 flexible symbols (e.g., symbols #2 to #13). Specifically, in FIG. 28, the first SFI information (e.g., SFI #17) may be a higher layer parameter indicating that the first and second symbols (e.g., symbols #0 and #1) in the corresponding slot are DL symbols and the remaining symbols (e.g., symbols #2 to #13) are flexible symbols.

Referring back to FIG. 27 and FIG. 28, in the step S2730, the terminal may receive from the base station second SFI information that re-indicates or overrides m symbol(s) among the n flexible symbols as UL symbol(s). Here, m may be a natural number less than or equal to n. In the embodiment shown in FIG. 28, the second SFI information may re-indicate or override 2 symbols (e.g., symbols #12 and #13) among 12 flexible symbols (e.g., symbols #2 to #13) as UL symbols. Specifically, in FIG. 28, the second SFI information may be the SFI #17 indicating that the symbols #0 and #1 are DL symbols, the symbols #2 to #11 are flexible symbols, and the symbols #12 and #13 are UL symbols in the corresponding slot. The second SFI information (e.g., SFI #23) may be included in the DCI format 2_0 and transmitted to the terminal.

In the step S2730, the terminal may receive a DCI format 2_0 including an index indicating a format of the corresponding slot (e.g., SFI #23) or a DCI format 2_0 including an index including an SFI indicating the type of the symbols #2 to #13 of the corresponding slot (e.g., symbols configured as flexible symbols by the higher layer signaling). For example, when a DCI format 2_0 including an index indicating the SFI #23, which is the format of the corresponding slot, is received, the terminal may determine that the symbols #0 and #1 are DL symbols, and the symbols #2 to #11 are flexible symbols, and the symbols #12 and #13 are UL symbols. Accordingly, the symbols #0 and #1 configured as DL symbols by the higher layer signaling may be maintained as the DL symbols. The symbols #2 to #11 configured as flexible symbols by the higher layer signaling may be maintained as flexible symbols. The symbols #12 and #13 configured as flexible symbols by higher layer signaling may be overridden to be the UL symbols by the DCI format 2_0.

Alternatively, when the index included in the DCI format 2_0 indicates that the SFI applied to the corresponding slot uses the symbols #12 and #13 as UL symbols, the terminal may reconfigure the symbols #12 and #13 configured as flexible symbols by the higher layer signaling to UL symbols. In this case, the symbols #0 and #1 may be maintained as DL symbols according to the higher layer signaling, and the symbols #2 to #11 may be maintained as flexible symbols according to higher layer signaling.

Referring back to FIG. 27, the base station may transmit a higher layer message (e.g., an SRS configuration message) including configuration information of SRS. The SRS configuration message may be used for configuring SRS transmission. The configuration information of SRS may include at least one of information indicating a starting symbol among symbols used for SRS transmission, information indicating the number (e.g., 2 or 4) of symbols used for the SRS transmission, and information indicating a transmission periodicity of SRS. The configuration information of SRS may be transmitted through the higher layer message in the step S2710. Alternatively, the configuration information of SRS may be transmitted through a higher layer message different from the higher layer message in the step S2710.

The terminal may receive the higher layer message from the base station, and identify the SRS configuration information included in the higher layer message. The terminal may transmit SRS according to the SRS configuration information (S2750). The terminal may transmit the SRS using symbols configured as UL symbols among symbol(s) configured for SRS transmission, and may not transmit the SRS in symbols configured as flexible symbols among the symbol(s) configured for SRS transmission.

The SRS may be transmitted in one or more of the last six symbols (e.g., symbols #8 to #13) in the slot. For example, when the starting symbol used for SRS transmission is #10 and the number of symbols used for SRS transmission is 4, the symbols #10 to #13 in the slot may be used for SRS transmission. In case that the symbols #10 to #13 are configured as shown in FIG. 28, the terminal may not transmit the SRS in the flexible symbols #10 and #11 and may transmit the SRS in the symbols #12 and #13 re-indicated as UL symbols. That is, the terminal may transmit the SRS using some symbols among the entire symbols configured for the SRS transmission. Also, the terminal may not perform a DL reception operation and a UL transmission operation as well as the SRS transmission operation in the flexible symbols.

The base station may receive the SRS from the terminal in the symbol(s) configured for the SRS transmission. The base station may not expect to receive the SRS in the symbols configured as flexible symbols by the higher layer message and/or the DCI, and may expect to receive the SRS in the symbols configured as UL symbols by the higher layer message and/or the DCI. That is, the base station may receive the SRS from the terminal through the UL symbols, and may not perform the reception operation of the SRS in the flexible symbols.

■ UL Control Channel and UL Data Channel

The base station may configure information required for a frequency hopping operation to the terminal using a higher layer signaling. When the frequency hopping operation is configured by the higher layer signaling, the terminal may perform the frequency hopping operation based on the information configured by the higher layer signaling. In one slot, the frequency hopping may be performed once.

In a proposed method, if a resource region according to a frequency hopping pattern includes flexible symbols, the terminal may not transmit a UL control channel and/or a UL data channel in the resource region including the flexible symbols. When the resource region according to the frequency hopping pattern includes only UL symbols, the terminal may transmit a UL control channel and/or a UL data channel in the resource region including only UL symbols.

For example, if a resource region #1 according to the first frequency hop includes flexible symbols and a resource region #2 according to the second frequency hop includes only UL symbols, the terminal may transmit a UL control channel and/or a UL data channel in the resource region #2.

When the terminal transmits a UL control channel including periodic channel information in the resource region #1, the base station cannot perform a decoding operation on the UL control channel received in the resource region #1. Also, when a UL data channel including periodic UL data in the resource region #1, the base station cannot perform a decoding operation on the UL data channel received in resource region #1. However, when a UL control channel including a scheduling request (SR) is transmitted in the resource region #1, the base station can perform a decoding operation on the UL control channel received in the resource region #1.

■ Method for Transmitting PUSCH Including SR

For reporting buffer status information, the base station may allocate sufficient time for the terminal to pad the buffer status information to a UL data #1 (e.g., transport block). However, if a new UL data #2 is generated after the buffer status information is padded to the UL data #1, the terminal may not reflect the presence of the UL data #2 in the buffer status information. Also, since the corresponding UL data #1 is transmitted as it is in a retransmission procedure of the UL data #1, even though the UL data #2 is generated, the terminal may not map buffer status information reflecting the presence of the UL data #2 to the UL data channel to which the retransmitted UL data #1 is mapped.

In order to solve such the problem, a physical layer of the terminal (e.g., an entity performing a function of the physical layer) should be able to inform the base station of the presence of the UL data #2. The UL data channel #1 may include only the UL data #1, and the UL data #2 may not be mapped to the UL data channel #1. The base station may transmit to the terminal a DL control channel including resource allocation information for the UL data #2. The terminal may transmit the UL data #2 and the changed buffer status information through the UL data channel #2 indicated by the DL control channel.

Figure 29:
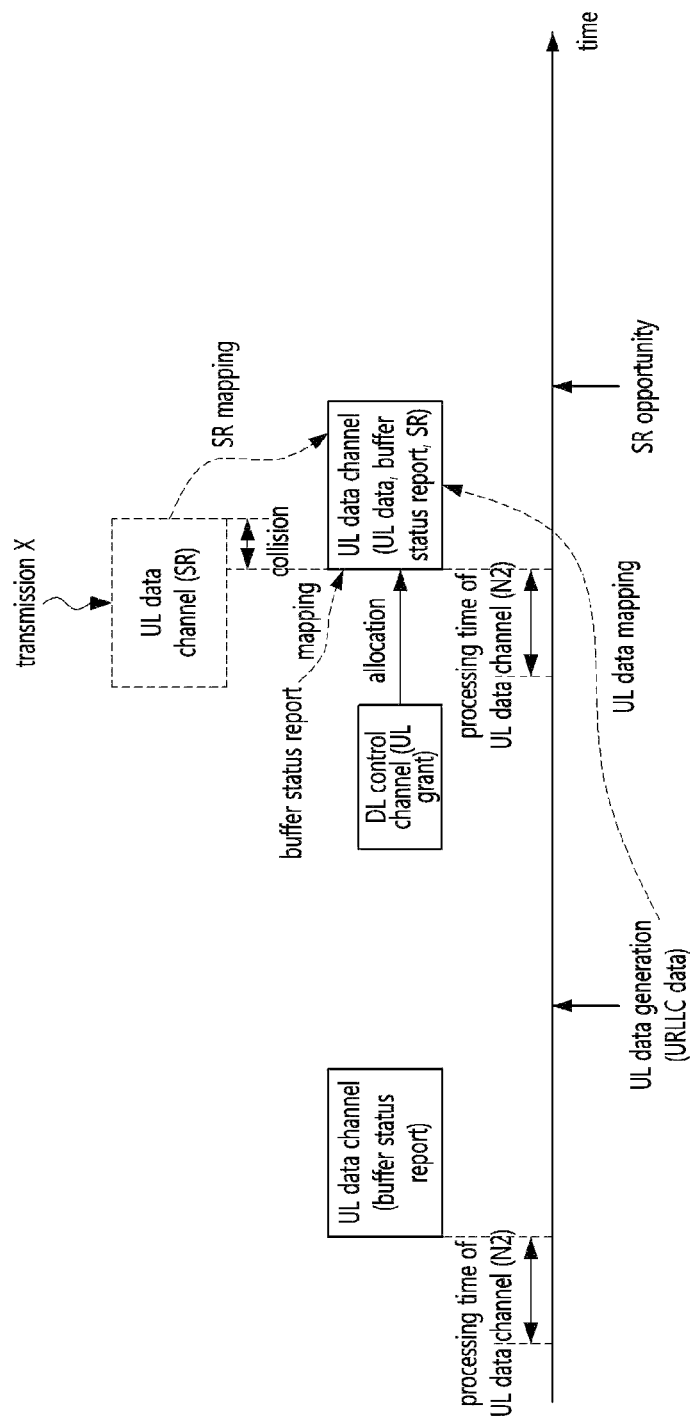
FIG. 29 is a conceptual diagram illustrating a thirteenth embodiment of a UL transmission method in a communication system.

FIG. 29 is a conceptual diagram illustrating a thirteenth embodiment of a UL transmission method in a communication system.

Referring to FIG. 29, a scheduling request (SR) and UL data may be transmitted through one UL data channel (e.g., PUSCH). The SR may be transmitted through the UL data channel because it may be regarded as one of UL control information. When time resources of the UL control channel including the SR overlap with time resources of the UL data channel, the SR may be mapped to the UL data channel instead of the UL control channel. For example, the SR may be included in a payload and the payload may be mapped to the UL data channel.

The base station may configure an SR corresponding to one logical channel group (LCG) to the terminal using a higher layer signaling. In this case, the terminal may map the specific SR configured by the higher layer signaling to the UL data channel. Alternatively, when each of K UL control channels corresponding to K SRs in the time axis overlaps with the UL data channel, without a separate higher layer signaling, the terminal may map an SR corresponding to the highest rank to the UL data channel. The index of the SR (positive SR) generated may be expressed by including the number $\lceil \log_2(K+1) \rceil$ of bits in the payload of the UL data channel. A bitmap consisting of only 0 may mean that all SRs among the K SRs do not occur (negative SR).

Alternatively, the terminal may map only L SRs of K or less corresponding to a part of the K SRs to the UL data channel. For example, $\lceil \log_2(L+1) \rceil$ corresponding to L may be included in the payload in the UL data channel. In this case, the base station may transmit a higher layer message including L to the terminal. The terminal may receive the higher layer message from the base station, and may identify L included in the higher layer message. Each of K and L may be an integer equal to or greater than 1.

√ Scheme #1 for Mapping SR to Resource Elements

The terminal may map the SR to resource elements in the same manner as the conventional UL control information. When the size of the UL control information including the SR (e.g., 1, L, or K SRs) and other information (e.g., HARQ response, CSI part 1, and/or CSI part 2) is 1 bit or 2 bits, the terminal may puncture the transport block in the UL data channel to map the UL control information to the UL data channel. When the size of the UL control information including the SR (e.g., 1, L, or K SRs) and other information (e.g., HARQ response, CSI part 1, and/or CSI part 2) is equal to or greater than 3 bits, the terminal may perform a rate matching operation on the transport block in the UL data channel to map the UL control information to the UL data channel.

√ Scheme #2 for Mapping SR to Resource Elements

When the size of other information (e.g., HARQ response, CSI part 1, and/or CSI part 2) excluding the SR (e.g., 1, L, or K SRs) is 1 bit or 2 bits, the terminal may puncture the transport block in the UL data channel to map the UL control information to the UL data channel. When the size of other information (e.g., HARQ response, CSI part 1, and/or CSI part 2) excluding the SR (e.g., 1, L, or K SRs) equal to or greater than 3 bits, the terminal may perform a rate matching operation on the transport block in the UL data channel to map the UL control information to the UL data channel.

The terminal may map the other information (e.g., HARQ response, CSI part 1, and/or CSI part 2) to the UL data channel regardless of the presence of the SR, and then map the transport block (e.g., UL data) to the UL data channel. Separate resource elements may be allocated for transmission of the SR. The number of resource elements for transmission of the SR may be determined based on the following methods.

Since the terminal cannot know whether the SR is transmitted before a predetermined time point, the number of bits representing the SR or the number of resource elements to which the SR is mapped may be determined before mapping the other UL control information or the transport block to the UL data channel. The terminal may then map the other UL control information or the transport block to the UL data channel by performing a rate matching operation.

The SR may be mapped to resource element(s) in symbols after symbols in which reference signals are located. The resource elements to which the SR is mapped may not be continuous in the frequency axis. The other UL control information and the transport block may not be mapped to the resource element(s) in the symbols after the symbols in which the reference signals are located. Alternatively, the transport block may be mapped to the resource element(s) in the symbols after the symbols in which the reference signals are located. In the following embodiments, methods for mapping the UL control information and the transport block will be described.

After the other information (e.g., HARQ response, CSI part 1, and/or CSI part 2) excluding the SR (e.g., 1, L, or K SRs) and the transport block are mapped to the UL data channel, the SR(s) may be mapped to the UL data channel. In this case, a method for mapping the SR(s) may vary depending on the number of resource elements occupied by the SR(s). For example, a mapping method for a case where the number of resource elements to which the SR(s) are mapped is equal to or less than a specific value may be different from a mapping method for a case where the number of resource elements to which the SR(s) exceeds the specific value.

When the number of resource elements to which the SR(s) are mapped is less than or equal to a specific value (e.g., 2 bits), the SR(s) may be mapped to the resource elements that the transport block occupies. When the number of resource elements to which the SR(s) are mapped exceeds the specific value (e.g., 2 bits), the SR(s) may be mapped to the resource elements that the transport block does not occupy. Here, the specific value may be configured to the terminal by a higher layer signaling. Alternatively, the base station may transmit a UL grant including the specific value to the terminal. Alternatively, the specific value may be predefined in the technical specifications known to the base station and the terminal.

A starting position at which the other information (e.g., HARQ response, CSI part 1, and/or CSI part 2) and the transport block are mapped may vary according to the specific value. When the other UL control information or the transport block is punctured to map the SR(s), a coding rate of the other UL control information or a coding rate of the transport block may not be changed. Since some resource elements are punctured to transmit the SR(s), a reception error rate at the base station may increase. In order to transmit the S (s), it may be preferable that the resource elements to which a retransmittable transport block is mapped are punctured.

Figure 30:
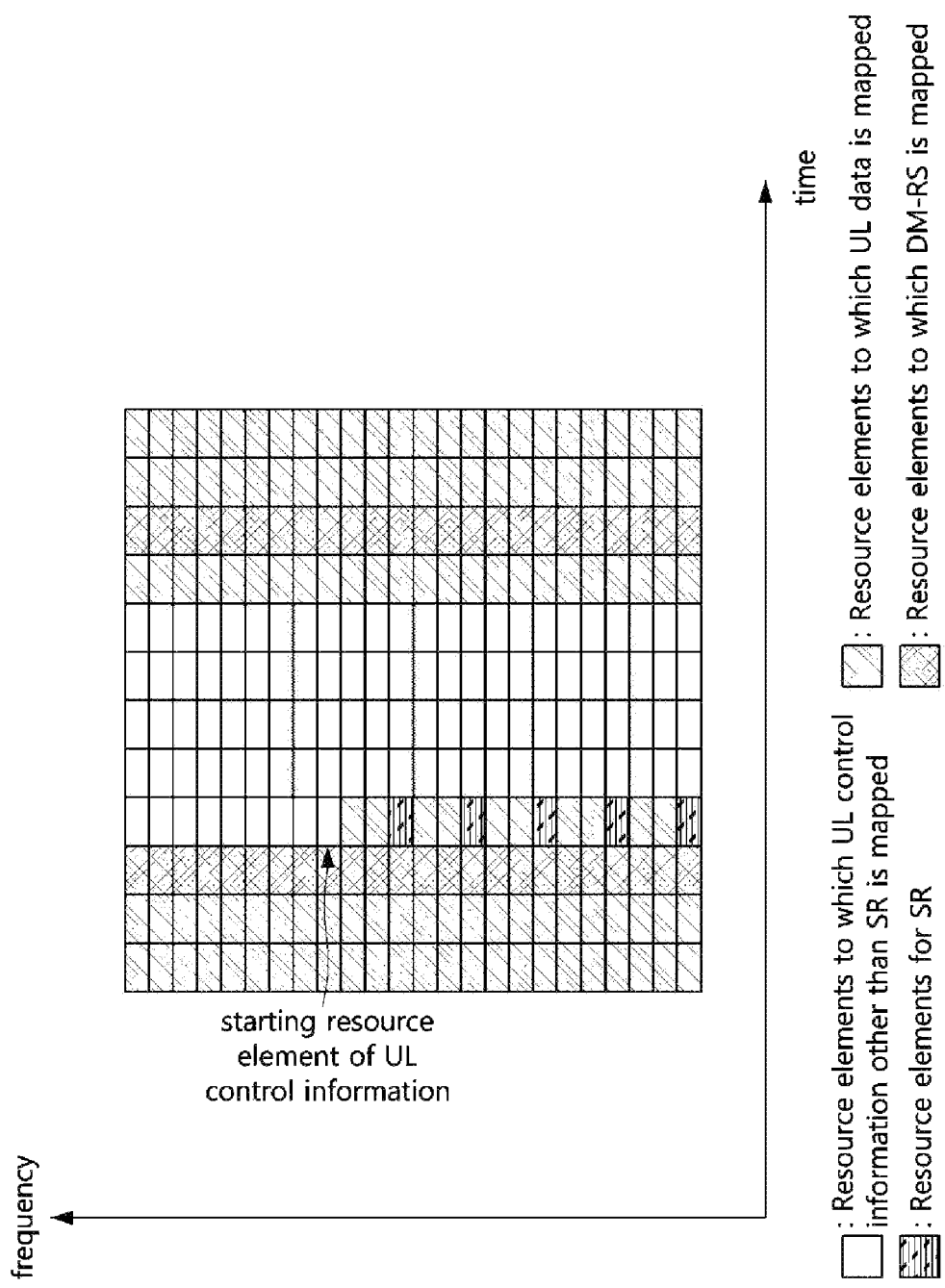
FIG. 30 is a conceptual diagram illustrating a sixth embodiment of a method of mapping UL control information in a communication system.

FIG. 30 is a conceptual diagram illustrating a sixth embodiment of a method of mapping UL control information in a communication system.

Referring to FIG. 30, the terminal may determine a starting resource element and may map the other information (e.g., HARQ response, CSI part 1, and/or CSI part 2) and the transport block from the staring resource element. The transport block may be mapped to resource elements used for transmission of the SR(s). Alternatively, the transport block may not be mapped to the resource elements used for transmission of the SR(s). The terminal may map coded SR(s) instead of the transport block to the resource elements used for transmission of the SR(s). The number of resource elements used for transmission of the SR(s) may be determined based on the number of SRs mapped to the UL data channel and the number of resource elements to which the SR(s) are mapped.

√ Method for Determining a Coding Rate of SR

In the procedure of mapping the UL control information to the UL data channel, the terminal may derive the number Q' of resource elements to encode the UL control information. The terminal may determine the coding rate of the UL control information based on Q'. Q' may be transmitted from the base station to the terminal through a DCI (e.g., UL grant) or a higher layer message. When the UL data channel includes the transport block (e.g., UL data), the terminal may calculate Q' based on Equations 6 to 8 below.

$$Q'_{ACK} = \min\left\{\left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil\right\}$$ [Equation 6]

$$Q'_{CSI-1} = \min\left\{\left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK}\right\}$$ [Equation 7]

-continued

[Equation 8]

$$Q'_{CSI-2} = \min\left\{\left\lceil\frac{(O_{CSI-2}+L_{CSI-2})\cdot\beta^{PUSCH}_{offset}\cdot\sum_{l=0}^{N^{PUSCH}_{symb,all}-1}M^{UCI}_{sc}(l)}{\sum_{r=0}^{C_{UL-SCH}-1}K_r}\right\rceil,\right.$$
$$\left.\left\lceil\alpha\cdot\sum_{l=0}^{N^{PUSCH}_{symb,all}-1}M^{UCI}_{sc}(l)\right\rceil - Q'_{ACK} - Q'_{CSI-1}\right\}$$

Q' may be defined differently depending on the type of UL control information. $Q'_{ACK}$ may indicate the number of resource elements to which an HARQ response is mapped. $Q'_{CSI-1}$ may indicate the number of resource elements to which a CSI part 1 is mapped. $Q'_{CSI-2}$ may indicate the number of resource elements to which a CSI part 2 is mapped.

When the UL data channel does not include a transport block (e.g., UL data), the terminal may calculate Q' based on Equations 9 to 12 below.

[Equation 9]

$$Q'_{ACK} = \min\left\{\left\lceil\frac{(O_{ACK}+L_{ACK})\cdot\beta^{PUSCH}_{offset}}{R\cdot Q_m}\right\rceil, \left\lceil\alpha\cdot\sum_{l=l_0}^{N^{PUSCH}_{symb,all}-1}M^{UCI}_{sc}(l)\right\rceil\right\}$$

[Equation 10]

$$Q'_{CSI-1} = \min$$
$$\left\{\left\lceil\frac{(O_{CSI-1}+L_{CSI-1})\cdot\beta^{PUSCH}_{offset}}{R\cdot Q_m}\right\rceil, \sum_{l=0}^{N^{PUSCH}_{symb,all}-1}M^{UCI}_{sc}(l)-Q'_{ACK}\right\}$$

[Equation 11]

$$Q'_{CSI-1} = \sum_{l=0}^{N^{PUSCH}_{symb,all}-1}M^{UCI}_{sc}(l)-Q'_{ACK}$$

[Equation 12]

$$Q'_{CSI-2} = \sum_{l=0}^{N^{PUSCH}_{symb,all}-1}M^{UCI}_{sc}(l)-Q'_{ACK}-Q'_{CSI-1}$$

The base station may transmit a higher layer message including a list indicating candidate Q's, and transmit a DCI (e.g., UL grant) including information indicating one Q' among the candidate Q's included in the list. The terminal may identify the list indicating the candidate Q's by receiving the higher layer message from the base station, and may receive the DCI (e.g., UL grant) indicating one Q' among the candidate Q's from the base station. Accordingly, the terminal may confirm the number Q' of resource elements to which the UL control information is mapped through the higher layer message and the DCI.

In the proposed method, the terminal may derive the number $Q'_{SR}$ of resource elements to which the SR is mapped. The terminal may determine the coding rate of the SR based on $Q'_{SR}$ and may encode the SR on the basis of the determined coding rate. In order to determine $Q'_{SR}$, the terminal may reuse the information indicated by the UL grant under assumption that the coding rate of the SR is equal to one of the coding rates of the other UL control information (e.g., HARQ response, CSI part 1, CSI part 2).

In order to map the SR and the other UL control information (e.g., HARQ response, CSI part 1, CSI part 2) to the UL data channel, the terminal may perform a puncturing operation or a rate matching operation on the UL data channel by applying the same ratio β as a ratio β of a predetermined one among the UL control information to the SR. In this case, the maximum value of resource elements to which the channel information (e.g., CSI part 1 and/or CSI part 2) is mapped may be changed, and the maximum value thereof may be calculated as a remainder value obtained by subtracting the number of resource elements to which the SR is mapped and the number of resource elements to which the HARQ response is mapped. For example, the remainder value may be calculated based on Equation 13 below.

$$\Sigma_{l=0}^{N_{symb,all}^{PUCCH}-1}M_{sc}^{UCI}(l)-Q'_{ACK}-Q'_{SR} \quad [\text{Equation 13}]$$

Meanwhile, one code block may include both the SR and the other UL control information (e.g., HARQ response, CSI part 1, CSI part 2). Alternatively, the code block including the SR may be different from the code block including the other UL control information (e.g., HARQ response, CSI part 1, CSI part 2). For example, the SR may be encoded with the HARQ response. Alternatively, the SR may be encoded with the HARQ response and the CSI part 1. Alternatively, the SR may be encoded independently of the HARQ response or the CSI part 1.

In a proposed method for determining $Q'_{SR}$, the ratio of the number of resource elements to which the SR is mapped may be configured to be different from the ratio of the number of resource elements to which other UL control information is mapped. For example, the other UL control information excluding the SR may be UL control information generated to support the eMBB service, and the SR may be UL control information generated to support the URLLC service. Therefore, the coding rate of the SR may be different from the coding rate of the other UL control information. A method may be required for the base station to inform the terminal of the coding rate of the SR. The SR may be encoded with other UL control information. In this case, the SR and the other UL control information may be included in the same code block. Alternatively, each of the SR and other UL control information may be independently coded, so that the code block including the SR may be different from the code block including other UL control information.

In a proposed method, the base station may derive the number of resource elements to which the SR is mapped using a ratio γ to the number of resource elements, which is configured by a higher layer signaling. The terminal can encode the SR using the ratio γ configured by the higher layer signaling, and may map the encoded SR to the resource elements. Here, the number of ratios configured by the base station to the terminal may be one or more. When two or more ratios are configured, one of two or more ratios may be indicated by a field included in the UL grant. When the UL grant does not include the field indicating one ratio γ, the terminal may use a preconfigured ratio.

Also, the terminal may encode other UL control information excluding the SR using the ratio β indicated by the UL grant or the ratio β configured by the higher layer signaling, and map the encoded other UL control information to the resource elements. When the UL data channel does not include other UL control information excluding than the SR, the terminal may encode the SR using the ratio γ configured by the higher layer signaling, and map the encoded SR to the resource elements.

In another proposed method, the base station may specify other UL control information excluding the SR to define the ratio of the number of the resource elements to which the SR is mapped, and may be define the ratio of the number of the resource elements to which the SR is mapped as a relative value δ of the ratio of the number of resource elements to which the other control information is mapped. The base station may transmit a higher layer message including δ to the terminal.

The terminal may identify δ by receiving the higher layer message from the base station, and add δ to β indicated by the UL grant to derive 'β+δ' as a ratio of the number of resource elements to which the SR is mapped. When the UL grant indicating p is not received, the terminal may derive 'β+δ' based on β and δ configured by the higher layer signaling, encoded the SR by using 'β+δ', and map the encoded SR to the resource elements. Here, the SR may be encoded together with other UL control information. In this case, the SR and the other UL control information may be included in the same code block. Alternatively, each of the SR and other UL control information may be independently encoded, so that the code block including the SR may be different from the code block including the other UL control information.

√ Coding Scheme Applied to SR

In case that the UL control channels corresponding to K SRs overlap with the UL data channel, the terminal may transmit either $\lceil\log_2(K+1)\rceil$ bits or $\lceil\log_2(L+1)\rceil$ bits. Here, K may be L or more. In this case, the number of available resource elements may be expressed as Q'. The SR may be represented using 1 bit or 2 bits. The SR may be spread according to a modulation rate, and a spreading code may be composed of only 1. For example, the spreading code may be '11111 . . . 11'.

■ Method for Triggering a HARQ Response Codebook

In order to support services (e.g., eMBB service, URLLC service) having different reliability requirements, the terminal may generate independent UL control information for each service. In particular, when the terminal supports the eMBB service and the URLLC service, the codebook for the eMBB service (e.g., the codebook used for multiplexing the HARQ response for the DL data channel) may be distinguished from the codebook for the URLLC service (e.g., the codebook used for multiplexing the HARQ response for the DL data channel).

In case that the terminal supports DL transmissions with different reliability requirements, the HARQ response codebook may be configured with a HARQ response for DL data of each service. Also, the priority of the codebook for the eMBB service may be different from the priority of the codebook for the URLLC service. The priority of the HARQ response codebook may be determined according to the priority of the DL data associated with the HARQ response. For example, the priority of the HARQ response codebook may be determined based on the transmission requirements of DL data (e.g., reliability, error rate, latency, etc.).

The base station may configure the priority of the HARQ response codebook (e.g., the priority of the DL data) to the terminal using a higher layer signaling. Alternatively, the priority of the HARQ response codebook (e.g., the priority of the DL data) may be defined in the technical specification known to the base station and the terminal. The terminal may multiplex the HARQ response codebooks according to the priorities, and map the multiplexed HARQ response codebooks to one UL channel (e.g., UL data channel or UL control channel). Alternatively, the terminal may select one HARQ response codebook (e.g., the HARQ response codebook with the highest priority) among the HARQ response codebooks according to the priorities, and map the selected HARQ response codebook to one UL channel (e.g., UL data channel or UL control channel).

The terminal may select one HARQ response codebook among the HARQ response codebooks using different criteria instead of the priorities of the DL data. Here, the terminal may confirm the type of the DL data received through the DL control channel. For example, the base station may transmit DL data #1 and #2 having different transmission requirements through different DL data channels #1 and #2.

The terminal may receive the DL data #1 through the DL data channel #1 and then receive the DL data #2 through the DL data channel #2. The terminal may determine the priorities based on the types of the DL data #1 and #2. For example, the terminal may determine that the priority of the DL data #2 is higher than the priority of the DL data #1. The terminal may select one of the HARQ response codebooks based on the priorities of the DL data #1 and #2.

In a proposed method, the terminal may determine the priorities of the HARQ response codebooks and select one of the HARQ response codebooks based on the determined priorities. The terminal may transmit the selected HARQ response codebook through one UL channel (e.g., UL data channel or UL control channel). The HARQ response codebook not selected by the terminal may not be transmitted through the UL channel.

When an HARQ response codebook for a HARQ process is received, the base station may perform a (re)transmission procedure based on the received HARQ response codebook. Alternatively, when no HARQ response codebook for a specific HARQ process is received, the base station may perform the methods proposed below.

In a proposed method, when an HARQ response codebook for a HARQ process ID #n is not received, the base station may assume that an HARQ response for the HARQ process ID #n is NACK or DTX. Therefore, the base station may perform the retransmission procedure for the HARQ process ID #n.

The above method may be applied when the size of the HARQ response codebook is small. When the communication between the base station and the terminal is performed based on a carrier aggregation (CA) scheme or a time division duplex (TDD) scheme, the size of the HARQ response codebook may be large and the number of HARQ processes may be large. In this case, a large amount of time and frequency resources (e.g., DL resources) may be required in the retransmission procedure. Therefore, since the HARQ response codebook is not received due to a poor quality radio channel, the base station may request retransmission of the HARQ response codebook to the terminal.

In another proposed method, the base station may transmit to the terminal information requesting transmission of the HARQ response codebook. The terminal may transmit the HARQ response codebook using a UL channel (e.g., UL control channel or UL data channel) according to the request from the base station. In this case, the HARQ response codebook may be transmitted dynamically.

When transmission of three different DL data #1 to #3 is supported, or when transmission of two different DL data #1 and #2 is supported and an HARQ response codebook for one DL data among the DL data #1 and #2 is required to be retransmitted, the number of HARQ response codebooks that the terminal should retransmit may be equal to or greater than 2.

In another proposed method, the base station may transmit to the terminal information requesting transmission of a specific HARQ response codebook. For example, the base station may transmit one or more indexes used to identify one or more HARQ response codebooks through a DL control channel. The terminal may receive the one or more indexes through the DL control channel, and may transmit the HARQ response codebook(s) indicated by the one or more indexes through a UL channel.

In case that the size of the HARQ response codebook is configured semi-statically, the size of the HARQ response codebooks retransmitted by the terminal (e.g., the total size of the HARQ responses) may be determined based on the index(es) received through a DL control channel. In case that the size of the HARQ response codebook is configured dynamically, the size of the HARQ response codebooks retransmitted by the terminal (e.g., the total size of the HARQ responses) may be uncertain. In the procedure for generating the HARQ response codebook, if the terminal mis-knows the size of the HARQ response codebook (e.g., if the terminal did not receive the last DL control channel), the size of the HARQ response codebooks may be uncertain.

In another proposed method, the base station may transmit information requesting transmission of all HARQ response codebooks to the terminal. In this case, all HARQ responses corresponding to the number of HARQ processes may be transmitted. This method may be applied even when the size of the HARQ response codebook is configured semi-statically or dynamically. Therefore, the problem in the demodulation and decoding procedure, which occurs because the size of the HARQ response codebook known to the terminal differs from the size of the HARQ response codebook known to the base station, may be solved.

Here, when a UL data channel is received as the UL channel, the base station may indicate an HARQ response in a specific field of a DL control channel (e.g., UL grant). For example, an existing field in the DL control channel (e.g., UL grant) may be utilized to indicate the HARQ response. Alternatively, a new field indicating the HARQ response may be introduced into the DL control channel (e.g., UL grant).

In an embodiment, a field (e.g., UL-SCH indicator) instructing to configure a UL data channel with only UL control information instead of a transport block among fields included in the UL grant may be used to indicate the HARQ response. When the corresponding field (e.g., UL-SCH indicator) included in the UL grant is set to a first value, the terminal may configure the UL data channel to include a transport block and UL control information (e.g., CSI, HARQ response, or CSI/HARQ response). On the other hand, when the corresponding field (e.g., UL-SCH indicator) included in the UL grant is set to a second value, the terminal may configure the UL data channel to include UL control information (e.g., CSI, HARQ response, or CSI/HARQ response) instead of a transport block. The corresponding field (e.g., UL-SCH indicator) included in the UL grant may be set to 0 or 1.

When a field for a CBG is configured in the terminal by a higher layer signaling, the terminal may interpret the indicators (e.g., CBGTI, CBGFI) for the CBG in the UL grant as an indicator for the HARQ response codebook. The indicator for the CBG may be composed of a bitmap, and one bit in the bitmap may indicate whether to transmit an HARQ codebook group (e.g., a group consisting of one or more HARQ response codebooks). The terminal may configure the UL data channel only with UL control information instead of a transport block and may transmit only a part of the HARQ codebook groups. Also, for transmission of the HARQ codebook groups, an existing field of the UL grant (e.g., transmission indicator of the CBG) may be reused.

In another embodiment, a field indicating that the HARQ response is included in the UL data channel may be newly introduced into the UL grant. When the new field included in the UL grant is set to a first value, the terminal may configure the UL data channel including the transport block and the HARQ response. On the other hand, when the new field included in the UL grant is set to a second value, the terminal may configure the UL data channel including the HARQ response instead of the transport block. For example, the field indicating whether the HARQ response is included in the UL data channel or not may be set to 0 or 1.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method performed in a terminal in a communication system, the operation method comprising:
receiving a higher layer message including a first information element (IE) indicating a size of a bitmap included in a first downlink control information (DCI), a second IE indicating time duration in which the first DCI is detected, and a third IE indicating a number of groups of symbols within the time duration from a base station;
receiving scheduling information for physical uplink shared channel (PUSCH) transmission from the base station;
receiving the first DCI including the bitmap from the base station, each bit included in the bitmap indicating whether or not the PUSCH transmission is canceled in one resource region mapped to the each bit;
identifying one or more resource regions in which the PUSCH transmission is canceled based on the bitmap; and
cancelling the PUSCH transmission scheduled by the scheduling information in overlapped resources between resources indicated by the scheduling information and the identified one or more resource regions.

2. The operation method of claim 1, wherein the one resource region includes one or more symbols in a time domain, and a number of the one or more symbols included in the one resource region is a value of a number of symbols belonging to the time duration divided by the number of groups.

3. The operation method of claim 1, wherein when the second IE is not presented in the higher layer message, monitoring periodicity of the first DCI configured by the base station is used as the time duration.

4. The operation method of claim 1, wherein the time duration includes one or more slots.

5. The operation method of claim 1, wherein the scheduling information is received through a second DCI or a radio resource control (RRC) message.

6. The operation method of claim 1, wherein the PUSCH transmission is partially performed using resources prior to the overlapped resources among the resources indicated by the scheduling information.

7. The operation method of claim 1, wherein the PUSCH transmission is totally cancelled although there is a non-overlapping resource between the resources indicated by the scheduling information and the identified one or more resource regions.

8. The operation method of claim 1, wherein the first DCI is applied to a normal uplink carrier and/or a supplementary uplink carrier.

9. The operation method of claim 1, wherein the bitmap includes a first bit string applied to a normal uplink carrier and a second bit string applied to a supplementary uplink carrier, and a location of each of the first bit string and the second bit string is configured by a higher layer message.

10. The operation method of claim 1, wherein when the scheduling information is received prior to reception of the first DCI, the first DCI is applied to the PUSCH transmission scheduled by the scheduling information.

11. The operation method of claim 1, wherein the PUSCH transmission is cancelled if the bitmap included in the first DCI is identified prior to a last symbol among all symbols scheduled for the PUSCH transmission.

12. The operation method of claim 1, wherein the first DCI used for cancelling the PUSCH transmission is different from a third DCI including a downlink preemption indication.

13. The operation method of claim 12, wherein an identifier used for receiving the first DCI is different from an identifier used for receiving the third DCI.

14. The operation method of claim 1, further comprising receiving a higher layer message including information indicating a number of candidates for the first DCI, the number of candidates being one or two.

15. An operation method performed in a base station in a communication system, the operation method comprising:
transmitting a higher layer message including a first information element (IE) indicating a size of a bitmap included in a first downlink control information (DCI), a second IE indicating time duration in which the first DCI is detected, and a third IE indicating a number of groups of symbols within the time duration to a terminal;
transmitting scheduling information for physical uplink shared channel (PUSCH) transmission to the terminal;
transmitting the first DCI including the bitmap to the terminal, each bit included in the bitmap indicating whether or not the PUSCH transmission is canceled in one resource region mapped to the each bit; and
identifying one or more resource regions in which the PUSCH transmission is canceled based on the bitmap,
wherein the PUSCH transmission scheduled by the scheduling information is not received in overlapped resources between resources indicated by the scheduling information and the identified one or more resource regions.

16. The operation method of claim 15, wherein the one resource region includes one or more symbols in a time domain, and a number of the one or more symbols included in the one resource region is a value of a number of symbols belonging to the time duration divided by the number of groups.

17. The operation method of claim 15, wherein when the second IE is not presented in the higher layer message, monitoring periodicity of the first DCI configured by the base station is used as the time duration.

18. The operation method of claim 15, wherein the bitmap includes a first bit string applied to a normal uplink carrier and a second bit string applied to a supplementary uplink carrier, and a location of each of the first bit string and the second bit string is configured by a higher layer message.

19. An operation method performed in a terminal in a communication system, the operation method comprising:
receiving scheduling information for physical uplink shared channel (PUSCH) transmission from a base station;
receiving a first downlink control information (DCI) including a bitmap from the base station, each bit included in the bitmap indicating whether or not the PUSCH transmission is canceled in one resource region mapped to the each bit;
identifying one or more resource regions in which the PUSCH transmission is canceled based on the bitmap; and
cancelling the PUSCH transmission scheduled by the scheduling information in overlapped resources between resources indicated by the scheduling information and the identified one or more resource regions,
wherein the bitmap includes a first bit string applied to a normal uplink carrier and a second bit string applied to a supplementary uplink carrier, and a location of each of the first bit string and the second bit string is configured by a higher layer message.

* * * * *